US012316875B2

(12) United States Patent
Deshpande

(10) Patent No.: US 12,316,875 B2
(45) Date of Patent: May 27, 2025

(54) SYSTEMS AND METHODS FOR SIGNALING PICTURE TIMING AND DECODING UNIT INFORMATION IN VIDEO CODING

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 255 days.

(21) Appl. No.: 17/781,163

(22) PCT Filed: Nov. 30, 2020

(86) PCT No.: PCT/JP2020/044507
§ 371 (c)(1),
(2) Date: May 31, 2022

(87) PCT Pub. No.: WO2021/112036
PCT Pub. Date: Jun. 10, 2021

(65) Prior Publication Data
US 2023/0016439 A1 Jan. 19, 2023

Related U.S. Application Data

(60) Provisional application No. 63/008,453, filed on Apr. 10, 2020, provisional application No. 63/002,127, filed on Mar. 30, 2020, provisional application No. 62/991,499, filed on Mar. 18, 2020, provisional application No. 62/976,846, filed on Feb. 14, 2020, provisional application No. 62/956,523, filed on Jan. 2, 2020, provisional application No. 62/951,987, filed
(Continued)

(51) Int. Cl.
H04N 19/70 (2014.01)
H04N 19/169 (2014.01)
H04N 19/423 (2014.01)
H04N 19/46 (2014.01)

(52) U.S. Cl.
CPC .......... *H04N 19/70* (2014.11); *H04N 19/188* (2014.11); *H04N 19/423* (2014.11); *H04N 19/46* (2014.11)

(58) Field of Classification Search
None
See application file for complete search history.

(56) References Cited

U.S. PATENT DOCUMENTS 9,479,774 B2* 10/2016 Wang ................... H04N 19/31

OTHER PUBLICATIONS

Bross et al., "Versatile Viodeo Coding (Draft 7)", Joint Video Experts Team (JVET) of ITU-T SG 16 WP 3 and ISO/IEC JTC 1/SC 29/ WG 11, 16th Meeting: Geneva, CH, Oct. 1-11, 2019, JVET-P2001-vE [Version 14].*

(Continued)

Primary Examiner — Edemio Navas, Jr.
(74) Attorney, Agent, or Firm — Keating & Bennett, LLP

(57) ABSTRACT

This disclosure relates to video coding and more particularly to techniques for signaling picture timing and decoding unit information for coded video. According to an aspect of an invention, a flag syntax element, specifying whether decoding unit level decoded picture buffer output delay parameters are present in a picture timing message, in a buffering period message is parsed and a first syntax element, used to compute a decoded picture buffer output time, in the picture timing message is parsed, in a case that a value of the flag syntax element is equal to one.

7 Claims, 6 Drawing Sheets

Related U.S. Application Data on Dec. 20, 2019, provisional application No. 62/944,206, filed on Dec. 5, 2019.

(56) References Cited

OTHER PUBLICATIONS

Deshpande, "On Decoding Unit Parameters Signalling", Joint Video Experts Team (JVET) of ITU-T SG 16 WP 3 and ISO/IEC JTC 1/SC 29/WG 11, JVET-Q0221-v1, Jan. 7-17, 2020, pp. 1-9.

Official Communication issued in International Patent Application No. PCT/JP2020/044507, mailed on Jan. 19, 2021.

Bross, "Versatile Video Coding (Draft 1)", Joint Video Experts Team (JVET) of ITU-T SG 16 WP 3 and ISO/IEC JTC 1/ SC 29/WG 11, JVET-J1001-v2, Apr. 10-20, 2018, 41 pages.

Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, JVET-H1002 (v6), Oct. 18-24, 2017, 27 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.

Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, 13 pages.

\* cited by examiner

[Fig. 5]

SYSTEMS AND METHODS FOR SIGNALING PICTURE TIMING AND DECODING UNIT INFORMATION IN VIDEO CODING

CROSS REFERENCE

This Nonprovisional application claims priority under 35 U.S.C. § 119 on provisional Application No. 62/944,206 on Dec. 5, 2019, No. 62/951,987 on Dec. 20, 2019, No. 62/956,523 on Jan. 2, 2020, No. 62/976,846 on Feb. 14, 2020, No. 62/991,499 on Mar. 18, 2020, No. 63/002,127 on Mar. 30, 2020, No. 63/008,453 on Apr. 10, 2020, the entire contents of which are hereby incorporated by reference.

TECHNICAL FIELD

This disclosure relates to video coding and more particularly to techniques for signaling picture timing and decoding unit information for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the $10^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 7)," 16th Meeting of ISO/IEC JTC1/SC29/WG11 1-11 Oct. 2019, Geneva, CH, document JVET-P2001-vE, which is incorporated by reference herein, and referred to as JVET-P2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of receiving a picture timing message, the method comprising: receiving a buffering period message; parsing a flag syntax element, specifying whether decoding unit level decoded picture buffer output delay parameters are present in the picture timing message, in the buffering period message; receiving the picture timing message; and parsing a first syntax element, used to compute a decoded picture buffer output time, in the picture timing message, in a case that a value of the flag syntax element is equal to one.

In one example, a device of receiving a picture timing message, the device comprising: a processor, and a memory associated with the processor; wherein the processor is configured to perform the following steps: receiving a buffering period message; parsing a flag syntax element, specifying whether decoding unit level decoded picture buffer output delay parameters are present in the picture timing message, in the buffering period message; receiving the picture timing message; and parsing a first syntax element, used to compute a decoded picture buffer output time, in the picture timing message, in a case that a value of the flag syntax element is equal to one.

In one example, a method of signaling a picture timing message, the method comprising: signaling a buffering period message including a flag syntax element specifying whether decoding unit level decoded picture buffer output delay parameters are present in the picture timing message; and signaling the picture timing message including a first syntax element used to compute a decoded picture buffer output time, in a case that a value of the flag syntax element is equal to one.

In one example, a device of signaling a picture timing message, the device comprising: a processor, and a memory associated with the processor; wherein the processor is configured to perform the following steps: signaling a buffering period message including a flag syntax element specifying whether decoding unit level decoded picture buffer output delay parameters are present in the picture timing message; and signaling the picture timing message including a first syntax element used to compute a decoded picture buffer output time, in a case that a value of the flag syntax element is equal to one.

DESCRIPTION OF EMBODIMENTS

Figure 1:
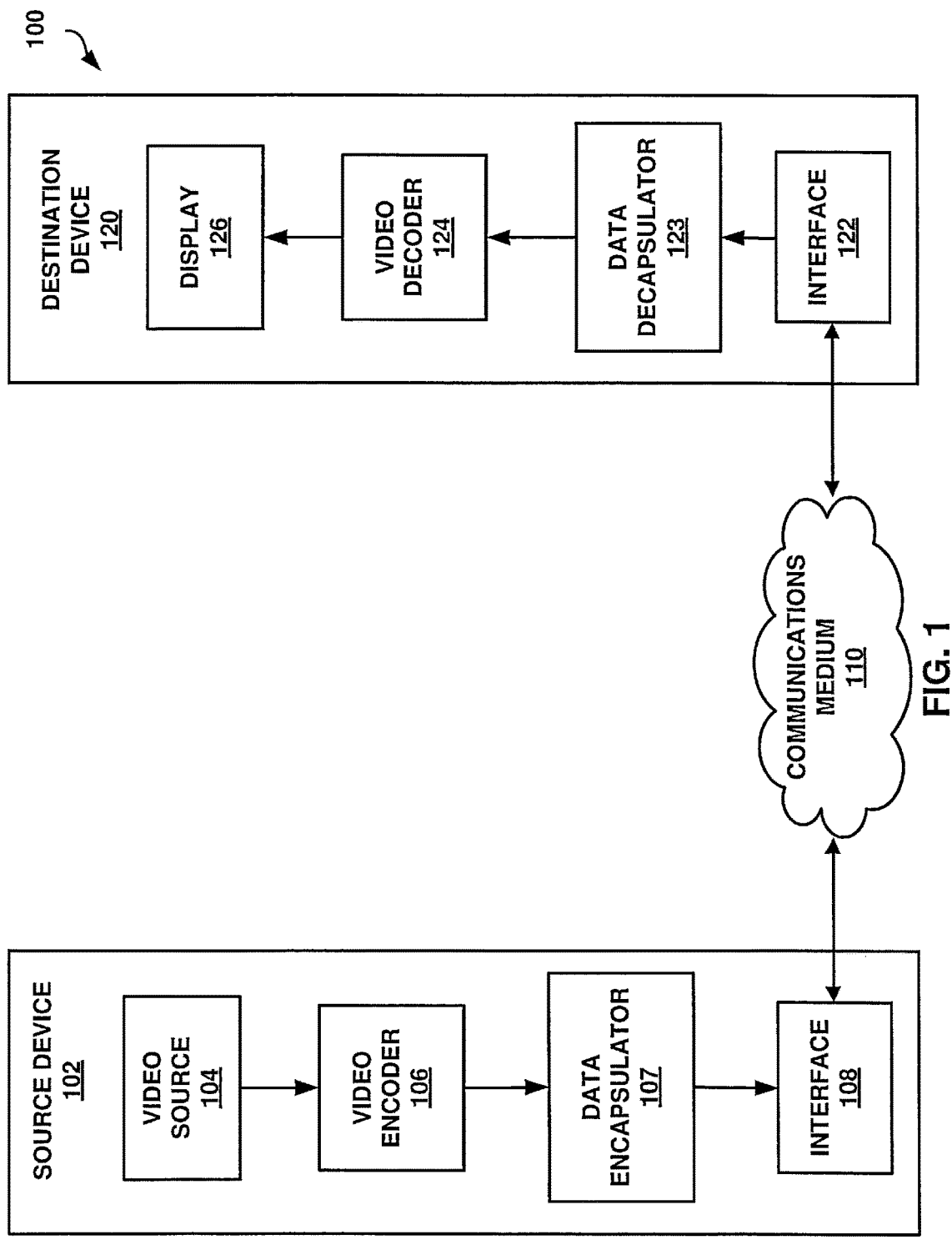
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling picture timing and decoding unit (DU) information for coded video data. It should be noted that although techniques of this disclosure are described with respect to ITU-T H.264, ITU-T H.265, JEM, and JVET-P2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-P2001. Thus, reference to ITU-T H.264, ITU-T H.265, JEM, and/or JVET-P2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling decoding unit parameters for video data, the method comprises signaling a syntax element indicating whether decoding unit parameters are included in a picture timing message and conditionally signaling decoding unit parameters in a picture timing message based on the value of the syntax element.

In one example, a device comprises one or more processors configured to signal a syntax element indicating whether decoding unit parameters are included in a picture timing message and conditionally signal decoding unit parameters in a picture timing message based on the value of the syntax element.

In one example, a non-transitory computer-readable storage medium comprises instructions stored thereon that, when executed, cause one or more processors of a device to signal a syntax element indicating whether decoding unit parameters are included in a picture timing message and conditionally signal decoding unit parameters in a picture timing message based on the value of the syntax element.

In one example, an apparatus comprises means for signaling a syntax element indicating whether decoding unit parameters are included in a picture timing message and means for conditionally signaling decoding unit parameters in a picture timing message based on the value of the syntax element.

In one example, a method of decoding video data comprises parsing a syntax element indicating whether decoding unit parameters are included in a picture timing message and conditionally parsing decoding unit parameters in a picture timing message based on the value of the syntax element.

In one example, a device comprises one or more processors configured to parse syntax element indicating whether decoding unit parameters are included in a picture timing message and conditionally parse decoding unit parameters in a picture timing message based on the value of the syntax element.

In one example, a non-transitory computer-readable storage medium comprises instructions stored thereon that, when executed, cause one or more processors of a device to parse syntax element indicating whether decoding unit parameters are included in a picture timing message and conditionally parse decoding unit parameters in a picture timing message based on the value of the syntax element.

In one example, an apparatus comprises means for parsing a syntax element indicating whether decoding unit parameters are included in a picture timing message and means for conditionally parsing decoding unit parameters in a picture timing message based on the value of the syntax element.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-P2001, CTUs are partitioned according a quadtree plus multi-type tree (QTMT or QT+MTT) structure. The QTMT in JVET-P2001 is similar to the QTBT in JEM. However, in JVET-P2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-P2001, slices are required to consist of an integer number of complete tiles or an integer number of consecutive complete CTU rows within a tile, instead of only being required to consist of an integer number of CTUs. It should be noted that in JVET-P2001, the slice design does not include slice segments (i.e., no independent/dependent slice segments). Thus, in JVET-P2001, a picture may include a single tile, where the single tile is contained within a single slice or a picture may include multiple tiles where the multiple tiles (or CTU rows thereof) may be contained within one or more slices. In JVET-P2001, the partitioning of a picture into tiles is specified by specifying respective heights for tile rows and respective widths for tile columns. Thus, in JVET-P2001 a tile is a rectangular region of CTUs within a particular tile row and a particular tile column position. Further, it should be noted that JVET-P2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
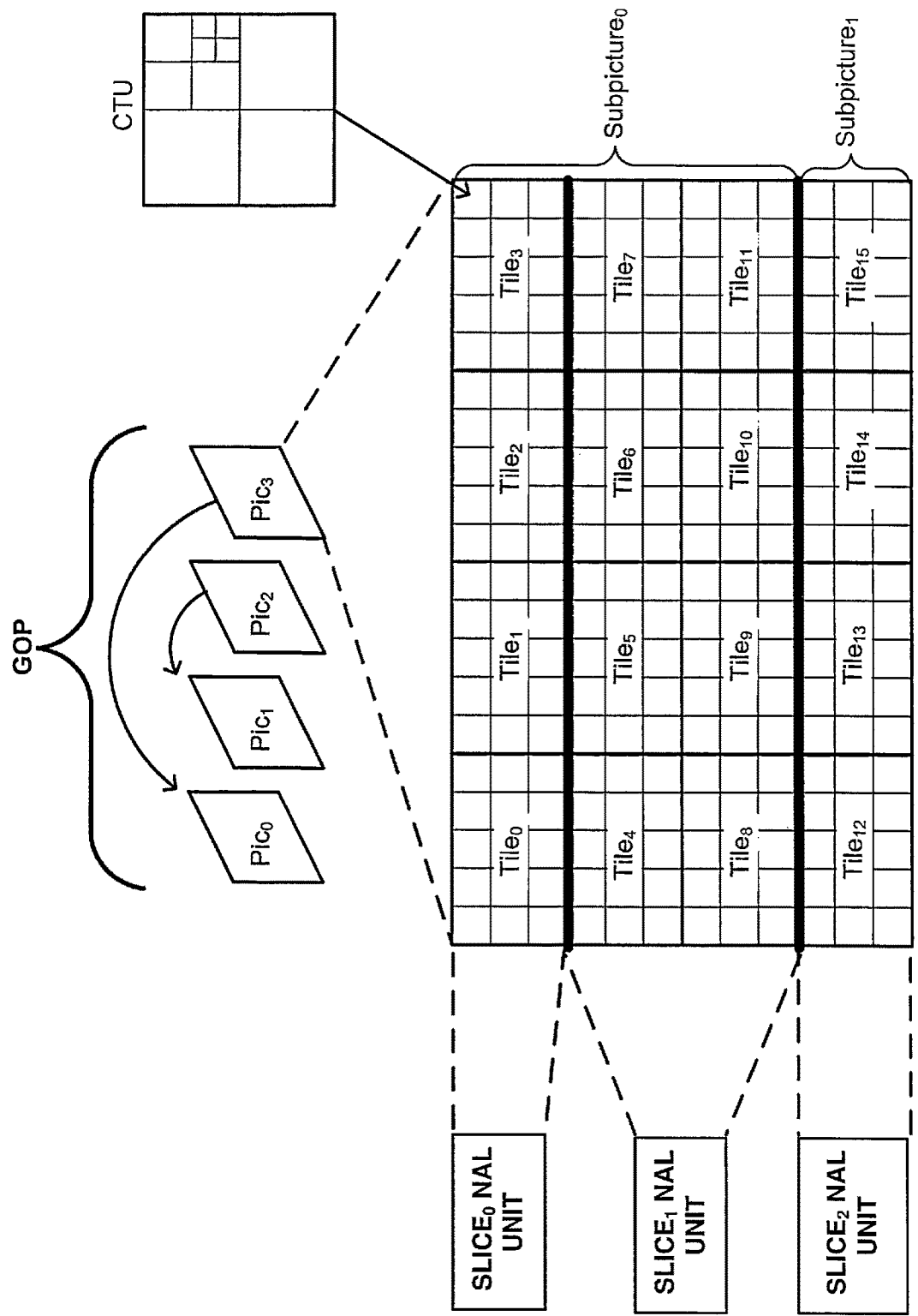
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, subdivisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-P2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$\frac{x}{y}$ Used to denote division in mathematical equations where no truncation or rounding is intended.

Further, the following mathematical functions may be used:
Log2(x) the base-2 logarithm of x;

$$\text{Min}(x, y) = \begin{cases} x; x <= y \\ y; x > y \end{cases};$$

$$\text{Max}(x, y) = \begin{cases} x; x >= y \\ y; x < y \end{cases}$$

Ceil(x) the smallest integer greater than or equal to x.

With respect to the example syntax used herein, the following definitions of logical operators may be applied:
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

Further, the following relational operators may be applied:
> Greater than
>= Greater than or equal to
< Less than
<= Less than or equal to
== Equal to
!= Not equal to Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the syntax element.
tu(v): truncated unary using up to maxVal bits with maxVal defined in the semantics of the syntax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.

As described above, video content includes video sequences comprised of a series of pictures and each picture may be divided into one or more regions. In JVET-P2001, a coded representation of a picture is referred to as a coded picture and all CTUs of the coded picture are encapsulated in one or more coded slice NAL units. That is, one or more corresponding coded slice NAL units encapsulate a coded representation of a picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-P2001, a NAL unit may be a VCL NAL unit or a non-VCL NAL unit. It should be noted that a VCL NAL unit includes slice header data, which provides information used for decoding the particular slice. Thus, in JVET-P2001, information used for decoding video data, which may be referred to as metadata in some cases, is not limited to being included in non-VCL NAL units. JVET-P2001 provides where a picture unit (PU) is a set of NAL units that contain all VCL NAL units of a coded picture and their associated non-VCL NAL units and where an access unit (AU) is a set of NAL units that are associated with each other according to a specified classification rule, are consecutive in decoding order, and contain exactly one coded picture for each present picture unit. A PU consists of one picture header NAL unit, one coded picture, which comprises of one or more VCL NAL units, and zero or more non-VCL NAL units. Thus, in JVET-P2001 an access unit includes one or more coded pictures. In some cases, an access unit may include pictures included in different layers of video. Layers of video are described in further detail below. Further, in JVET-P2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a picture unit for each layer in the CVS and the coded picture in each present picture unit is a coded layer video sequence start (CLVSS) picture. In JVET-P2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-P2001, a bitstream may be described as including a sequence of NAL units forming a CVS, where a CVS includes AUs and each AU may include respective pictures for each of a plurality of layers for coded video.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-P2001, each of a video sequence, a GOP, a picture, a slice, and CTU may be associated with metadata that describes video coding properties and some types of metadata an encapsulated in non-VCL NAL units. JVET-P2001 defines parameters sets that may be used to describe video data and/or video coding properties. In particular, JVET-P2001 includes the following five types of parameter sets: decoding parameter set (DPS), video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a DPS and a VPS may be optionally referenced by a SPS. A PPS applies to an individual coded picture that refers to it. In JVETP2001, parameter sets may be encapsulated as a non-VCL NAL unit and/or may be signaled as a message. JVET-P2001 also includes a picture header (PH) which is encapsulated as a non-VCL NAL unit. In JVET-P2001, a picture header applies to all slices of a coded picture. JVET-P2001 further enables supplemental enhancement information (SEI) messages to be signaled. In JVET-P2001, SEI messages assist in processes related to decoding, display or other purposes, however, SEI messages may not be required for constructing the luma or chroma samples according to a decoding process. In JVET-P2001, SEI messages may be signaled in a bitstream using non-VCL NAL units. Further, SEI messages may be conveyed by some mechanism other than by being present in the bitstream (i.e., signaled out-of-band).

Figure 3:
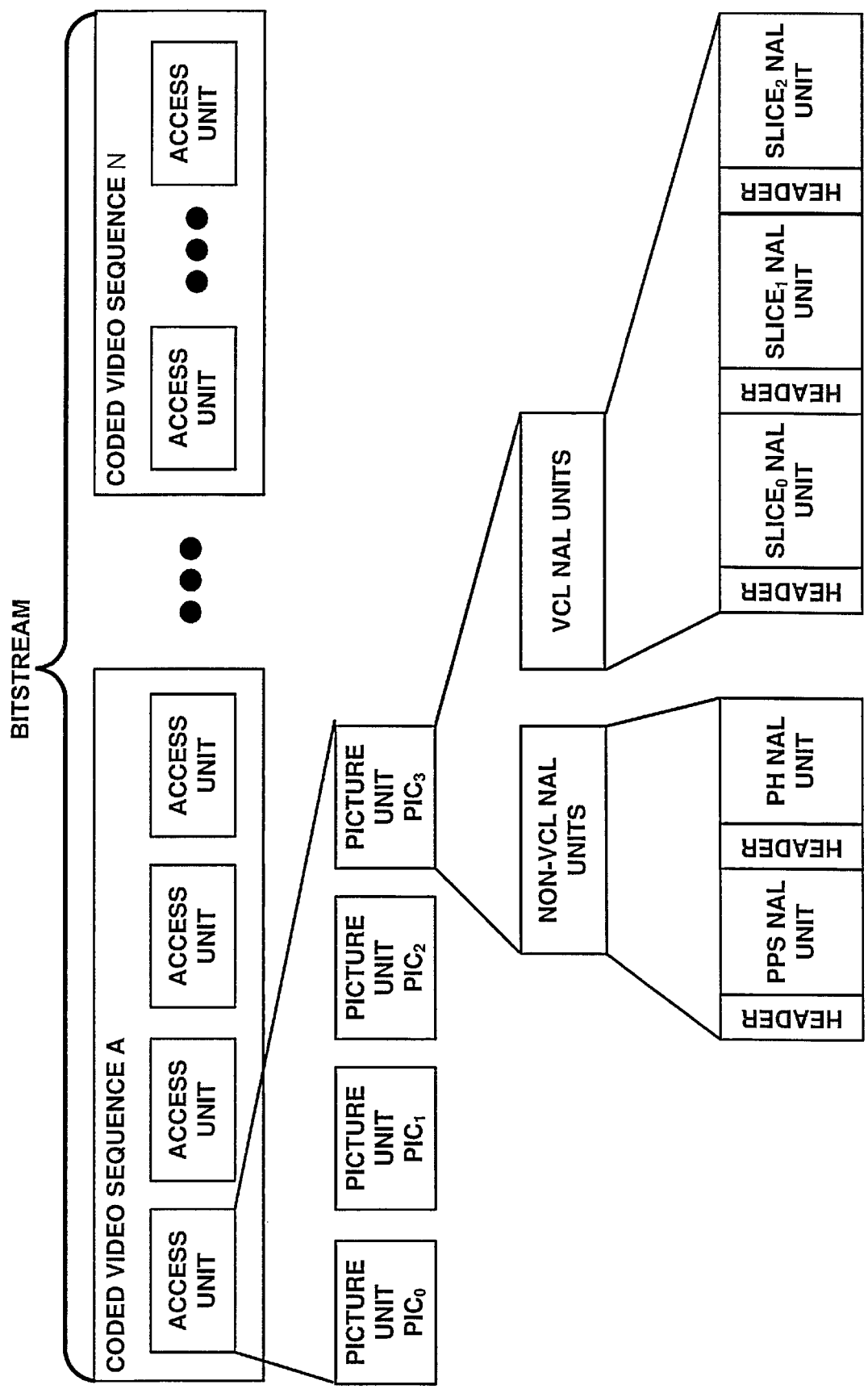
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. However, it should be noted that in JVETP2001, the picture header for each picture is required to be in the picture unit corresponding to the picture.

JVET-P2001 defines NAL unit header semantics that specify the type of Raw Byte Sequence Payload (RBSP) data structure included in the NAL unit. Table 1 illustrates the syntax of the NAL unit header provided in JVET-P2001.

TABLE 1

|  | Descriptor |
|---|---|
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

JVET-P2001 provides the following definitions for the respective syntax elements illustrated in Table 1.

forbidden_zero_bit shall be equal to 0.

nuh_reserved_zero_bit shall be equal to 0. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC.

The value of nuh_layer_id shall be the same for all VCL NAL units of a coded picture. The value of nuh_layer_id of a coded picture or a PU is the value of the nuh_layer_id of the VCL NAL units of the coded picture or the PU.

The value of nuh_layer_id for non-VCL NAL units is constrained as follows:
  If nal_unit_type is equal to PPS_NUT, PREFIX_APS_NUT, or SUFFIX_APS_NUT, nuh_layer_id shall be equal to the lowest nuh_layer_id value of the coded slice NAL units that refer to the NAL unit.
  Otherwise, if nal_unit_type is equal to SPS_NUT, nuh_layer_id shall be equal to the lowest nuh_layer_id value of the PPS NAL units that refer to the SPS NAL unit.
  Otherwise, if nal_unit_type is equal to AUD-NUT, nuh_layer_id shall be equal to vps_layer_id[0].
  Otherwise, when nal_unit_type is equal to PH_NUT, EOS_NUT, or FD_NUT, nuh_layer_id shall be equal to the nuh_layer_id of associated VCL NAL unit.

NOTE—The value of nuh_layer_id of DPS, VPS, and EOB NAL units is not constrained.

The value of nal_unit_type shall be the same for all pictures of a CVSS AU.

nuh_temporal_id_plus1 minus 1 specifies a temporal identifier for the NAL unit.

The value of nuh_temporal_id_plus1 shall not be equal to 0.

The variable TemporalId is derived as follows:

TemporalId=*nuh*_temporal_id_plus1−1

When nal_unit_type is in the range of IDR_W_RADL to RSV_IRAP_12, inclusive, TemporalId shall be equal to 0.

When nal_unit_type is equal to STSA_NUT, TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DPS_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 . . . UNSPEC_31 may be used as determined by the application. No decoding process for these values of nal_unit type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
| --- | --- | --- | --- |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4.. RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |

TABLE 2-continued

| nal_unit_type | Name of nal_unit_type | Content of NAL unit and RBSP syntax structure | NAL unit type class |
|---|---|---|---|
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28.. UNSPEC_31 | Unspecified non-VCL NAL unit types | non-VCL |

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

For VCL NAL units of any particular picture, the following applies:
  If mixed_nalu_types_in_pic_flag is equal to 0, the value of nal_unit_type shall be the same for all coded slice NAL units of a picture. A picture or a PU is referred to as having the same NAL unit type as the coded slice NAL units of the picture or PU.
  Otherwise (mixed_nalu_types_in_pic_flag equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

For a single-layer bitstream, the following constraints apply:
  Each picture, other than the first picture in the bitstream in decoding order, is considered to be associated with the previous IRAP picture in decoding order.
  When a picture is a leading picture of an IRAP picture, it shall be a RADL or RASL picture.
  When a picture is a trailing picture of an IRAP picture, it shall not be a RADL or RASL picture.
  No RASL pictures shall be present in the bitstream that are associated with an IDR picture.
  No RADL pictures shall be present in the bitstream that are associated with an IDR picture having nal_unit_type equal to IDR_N_LP.
  NOTE—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.
  Any picture that precedes an IRAP picture in decoding order shall precede the IRAP picture in output order and shall precede any RADL picture associated with the IRAP picture in output order.
  Any RASL picture associated with a CRA picture shall precede any RADL picture associated with the CRA picture in output order.
  Any RASL picture associated with a CRA picture shall follow, in output order, any IRAP picture that precedes the CRA picture in decoding order.
  If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

It should be noted that generally, an Intra Random Access Point (IRAP) picture is a picture that does not refer to any pictures other than itself for prediction in its decoding process. In JVET-P2001, an IRAP picture may be a clean random access (CRA) picture or an instantaneous decoder refresh (IDR) picture. In JVET-P2001, the first picture in the bitstream in decoding order must be an IRAP or a gradual decoding refresh (GDR) picture. JVET-P2001 describes the concept of a leading picture, which is a picture that precedes the associated IRAP picture in output order. JVET-P2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-P2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element receovery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

As provided in Table 2, a NAL unit may include a sequence parameter set syntax structure. Table 3 illustrates the syntax structure of the SPS provided in JVET-P2001.

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc == 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
|   bit_depth_minus8 | ue(v) |
|   min_qp_prime_ts_minus4 | ue(v) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( 0, sps_max_sublayers_minus1, sps_sublayer_dpb_params_flag ) | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |

TABLE 3-continued

| | Descriptor |
|---|---|
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| sps_max_luma_transform_size_64_flag | u(1) |
| sps_joint_cbcr_enabled_flag | u(1) |
| if( ChromaArrayType != 0 ) { | |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| if( sps_bdpcm_enabled_flag && chroma_format_idc == 3 ) | |
|   sps_bdpcm_chroma_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| if( chroma_format_idc == 3 ) { | |
|   sps_palette_enabled_flag | u(1) |
|   sps_act_enabled_flag | u(1) |
| } | |

TABLE 3-continued

| | Descriptor |
|---|---|
| sps_bcw_enabled_flag | u(1) |
| sps_ibc_enabled_flag | u(1) |
| sps_ciip_enabled_flag | u(1) |
| if( sps_mmvd_enabled_flag ) | |
|    sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|    sps_num_ladf_intervals_minus2 | u(2) |
|    sps_ladf_lowest_interval_qp_offset | se(v) |
|    for( i = 0; i < sps_num_ladf_intervals_minus2 + 1; i++ ) { | |
|      sps_ladf_qp_offset[ i ] | se(v) |
|      sps_ladf_delta_threshold_minus1[ i ] | ue(v) |
|    } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|    sps_num_ver_virtual_boundaries | u(2) |
|    for( i = 0; i < sps_num_ver_virtual_boundaries: i++ ) | |
|      sps_virtual_boundaries_pos_x[ i ] | u(13) |
|    sps_num_hor_virtual_boundaries | u(2) |
|    for( i = 0; i < sps_num_hor_virtual_boundaries; i++ ) | |
|      sps_virtual_boundaries_pos_y[ i ] | u(13) |
| } | |
| if( sps_ptl_dpb_hrd_params_present_flag ) { | |
|    sps_general_hrd_params_present_flag | u(1) |
|    if( sps_general_hrd_params_present_flag ) { | |
|      general_hrd_parameters( ) | |
|      if( sps_max_sublayers_minus1 > 0 ) | |
|        sps_sublayer_cpb_params_present_flag | u(1) |
|      firstSubLayer = sps_sublayer_cpb_params_present_flag ? 0 : | |
|        sps_max_sublayers_minus1 | |
|      ols_hrd_parameters( firstSubLayer, sps_max_sublayers_minus1 ) | |
|    } | |
| } | |
| field_seq_flag | u(1) |
| vui_parameters_present_flag | u(1) |
| if( vui_parameters_present_flag ) | |
|    vui_parameters( ) /* Specified_in_ITU-T H.SEI | ISO/IEC 23002-7 */ | |
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

With respect to Table 3, JVET-P2001 provides the following semantics:

An SPS RBSP shall be available to the decoding process prior to it being referenced, included in at least one AU with TemporalId equal to 0 or provided through external means.

All SPS NAL units with a particular value of sps_seq_parameter_set_id in a CVS shall have the same content.

sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS.

When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.
  The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these syntax structures is present in the SPS. The value of sps_ptl_dpb_hrd_params_present_flag shall be equal to vps_independent_layer_flag[nuh_layer_id].

If vps_independent_layer_flag[GeneralLayerIdx[nuh_layer_id]] is equal equal to 1, the variable MaxDecPicBuffMinus1 is set equal to max_dec_pic_buffering_minus1[sps_max_sublayers_minus1] in the dpb_parameters( ) syntax structure in the SPS. Otherwise, MaxDecPicBuffMinus1 is set equal to max_dec_pic_buffering_minus1[sps_max_sublayers_minus1] in the layer_nonoutput_dpb_params_idx[GeneralLayerIdx[nuh_layer_id] ]-th dpb_parameters( ) syntax structure in the VPS.

gdr_enabled_flag equal to 1 specifies that GDR pictures may be present in CLVSs referring to the SPS. gdr_enabled_flag equal to 0 specifies that GDR pictures are not present in CLVSs referring to the SPS.

sps_seqparameter_set_id provides an identifier for the SPS for reference by other syntax elements.

SPS NAL units, regardless of the nuh_layer_id values, share the same value space of sps_seq_parameter_set_id.

chroma_format_idc specifies the chroma sampling relative to the luma sampling as specified.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate-colour_plane_flag, the value of the variable ChromaArrayType is assigned as follows:

If separate_colour_plane_flag is equal to 0, ChromaArrayType is set equal to chroma format idc.

Otherwise (separate_colour_plane_flag is equal to 1), ChromaArrayType is set equal to 0.

ref_pic_resampling_enabled_flag equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring to the SPS.

pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).

sps_log2_ctu.size_minus5 plus 5 specifies the luma coding tree block size of each CTU. It is a requirement of bitstream conformance that the value of sps_log2_ctu_size_minus5 be less than or equal to 2.

The variables CtbLog2SizeY and CtbSizeY are derived as follows:

$$Ctb\ Log2SizeY = sps\_log2\_ctu\_size\_minus5 + 5$$

$$CtbSizeY = 1 << Ctb\ Log2SizeY$$

subpics_present_flag equal to 1 specifies that subpicture parameters are present in in the SPS RBSP syntax. subpics_present_flag equal to 0 specifies that subpicture parameters are not present in the SPS RBSP syntax.

NOTE—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

subpic_ctu_top_left_x[i] specifies horizontal position of top left CTU of i-th subpicture in unit of CtbSizeY. The length of the syntax element is Ceil(Log2(pic_width_max_in_luma_samples/CtbSizeY)) bits. When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log2(pic_height_max_in_luma_samples/CtbSizeY)) bits. When not present, the value of subpic_ctu_top_left_y[i] is inferred to be equal to 0.

subpic_width_minus1[i] plus 1 specifies the width of the i-th subpicture in units of CtbSizeY. The length of the syntax element is Ceil(Log2(pic_width_max_in_luma_samples/CtbSizeY)) bits. When not present, the value of subpic_width_minus1[i] is inferred to be equal to Ceil(pic_width_max_in_luma_samples/CtbSizeY)−1.

subpic_height_minus1[i] plus 1 specifies the height of the i-th subpicture in units of CtbSizeY. The length of the syntax element is Ceil(Log2(pic_height_max_in_luma_samples/CtbSizeY)) bits. When not present, the value of subpic_height_minus1[i] is inferred to be equal to Ceil(pic_height_max_in_luma_samples/CtbSizeY)−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1.

It is a requirement of bitstream conformance that the following constraints apply:

For any two subpictures subpicA and subpicB, when the subpicture index of subpicA is less than that of subpicB, any coded slice NAL unit of subPicA shall precede any coded slice NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

sps_subpic_id_present_flag equal to 1 specifies that subpicture ID mapping is present in the SPS. sps_subpic_id_present_flag equal to 0 specifies that subpicture ID mapping is not present in the SPS.

sps_subpic_id_signalling_present_flag equal to 1 specifies that subpicture ID mapping is signalled in the SPS. sps_subpic_id_signalling_present_flag equal to 0 specifies that subpicture ID mapping is not signalled in the SPS. When not present, the value of sps_subpic_id_signalling_present_flag is inferred to be equal to 0.

sps_subpic_id_len_minus1 plus 1 specifies the number of bits used to represent the syntax element sps_subpic_id[i]. The value of sps_subpic_id_len_minus1 shall be in the range of 0 to 15, inclusive.

sps_subpic_id[i] specifies subpicture ID of the i-th subpicture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive bit_depth_minus8 specifies the bit depth of the samples of the luma and chroma arrays, BitDepth, and the value of the luma and chroma quantization parameter range offset, QpBdOffset, as follows:

$$BitDepth=8+bit\_depth\_minus8$$

$$QpBdOffset=6*bit\_depth\_minus8$$

bit_depth_minus8 shall be in the range of 0 to 8, inclusive.

min_qp_prime_ts_minus4 specifies the minimum allowed quantization parameter for transform skip mode as follows:

$$QpPrimeTsMin=4+min\_qp\_prime\_ts\_minus4$$

The value of min_qp_prime_ts_minus4 shall be in the range of 0 to 48, inclusive.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

log2_max_pic_order_cnt_lsb_minus4 specifies the value of the variable MaxPicOrderCntLsb that is used in the decoding process for picture order count as follows:

$$MaxPicOrderCntLsb=2^{(log2\_max\_pic\_order\_cnt\_lsb\_minus4+1)}$$

The value of log2_max_pic_order_cnt_lsb_minus4 shall be in the range of 0 to 12, inclusive.

sps_poc_msb_flag equal to 1 specifies that the ph_poc_msb_cycle_present_flag syntax element is present in PHs referring to the SPS. sps_poc_msb_flag equal to 0 specifies that the ph_poc_msb_cycle_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32-log2_max_pic_order_cnt_lsb_minus4-5, inclusive.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS.

inter_layer_ref_pics_present_flag equal to 0 specifies that no ILRP is used for inter prediction of any coded picture in the CLVS. inter_layer_ref_pics_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag shall be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_ pic_list_struct(0, rplsIdx) for rplsIdx ranging from 0 to num_ref_pic_lists_in_sps[0]−1.

num_refpic_lists_in_sps[i] specifies the number of the ref pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of listIdx (equal to 0 or 1), a decoder should allocate memory for a total number of num_ref_pic_lists_in_sps[i]+1 ref_pic_list_struct (listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log2_min_luma_coding_block_size_minus2 plus 2 specifies the minimum luma coding block size. The value range of log2_min_luma_coding_block_size_minus2 shall be in the range of 0 to log2_ctu_size_minus5+3, inclusive.

The variables MinCbLog2SizeY, MinCbSizeY, IbcBufWidthY, IbcBufWidthC and Vsize are derived as follows:

Min$Cb$Log2Size$Y$=log2_min_luma_coding_block_size_minus2+2

Min$Cb$Size$Y$=1<<Min$Cb$ Log2Size$Y$ $Ibc$BufWidth$Y$=256*128/$Ctb$Size$Y$ $Ibc$BufWidth$C$=$Ibc$BufWidth$Y$/SubWidth$C$ $V$Size=Min(64,$Ctb$Size$Y$)

The value of MinCbSizeY shall less than or equal to VSize.

The variables CtbWidthC and CtbHeightC, which specify the width and height, respectively, of the array for each chroma CTB, are derived as follows:
  If chroma_format_idc is equal to 0 (monochrome) or separate_colour_plane_flag is equal to 1, CtbWidthC and CtbHeightC are both equal to 0.
  Otherwise, CtbWidthC and CtbHeightC are derived as follows:

$Ctb$Width$C$=$Ctb$Size$Y$/SubWidth$C$ $Ctb$Height$C$=$Ctb$Size$Y$/SubHeight$C$

For log2BlockWidth ranging from 0 to 4 and for log2BlockHeight ranging from 0 to 4, inclusive, the up-right diagonal and raster scan order array initialization process as specified is invoked with 1<<log2BlockWidth and 1<<log2BlockHeight as inputs, and the output is assigned to DiagScanOrder [log2BlockWidth][log2BlockHeight].

For log2BlockWidth ranging from 0 to 6 and for log2BlockHeight ranging from 0 to 6, inclusive, the horizontal and vertical traverse scan order array initialization process as specified is invoked with 1<<log2BlockWidth and 1<<log2BlockHeight as inputs, and the output is assigned to HorTravScanOrder [log2BlockWidth][log2BlockHeight] and VerTravScanOrder[log2BlockWidth][log2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by pic_log2_diff_min_qt_min_cb_luma present in PHs referring to the SPS. The value of sps_log2_diff_min_qt_min_cb_intra_slice_luma shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

Min$Qt$Log2SizeIntra$Y$=sps_log2_diff_min_$qt$_min_$cb$_intra_slice_luma+Min$Cb$ Log2Size$Y$ sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by pic_log2_diff_min_qt_min_cb_luma present in PHs referring to the SPS. The value of sps_log2_diff_min_qt_min_cb_inter_slice shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

Min$Qt$Log2SizeInter$Y$=sps_log2_diff_min_$qt$_min_$cb$_inter_slice+Min$Cb$ Log2Size$Y$ sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by pic_max_mtt_hierarchy_depth_inter_slice present in PHs referring to the SPS. The value of sps_max_mtt_hierarchy_depth_inter_slice shall be in the range of 0 to 2*(CtbLog2SizeY−MinCbLog2SizeY), inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by pic_max_mtt_hierarchy_depth_intra_slice_luma present in PHs referring to the SPS. The value of sps_max_mtt_hierarchy_depth_intra_slice_luma shall be in the range of 0 to 2*(CtbLog2SizeY−MinCbLog2SizeY), inclusive.

sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by pic_log2_diff_max_bt_min_qt_luma present in PHs referring to the SPS. The value of sps_log2_diff_max_bt_min_qt_intra_slice_luma shall be in the range of 0 to CtbLog2SizeY−MinQtLog2SizeIntraY, inclusive. When sps_log2_diff_max_bt_min_qt_intra_slice_luma is not present, the value of sps_log2_diff_max_bt_mint_intraslice_luma is inferred to be equal to 0.

sps_log2_diff_max_tt_minqt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by pic_log2_diff_max_tt_min_qt_luma present in PHs referring to the SPS. The value of sps_log2_diff_max_tt_min_qt_intra_slice_luma shall be in the range of 0 to CtbLog2SizeY−MinQtLog2SizeIntraY, inclusive. When sps_log2_diff_max_tt_min_qt_intra_slice_luma is not present, the value of sps_log2_diff_max_tt_min_qt_intra_slice_luma is inferred to be equal to 0.

sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by pic_log2_diff_max_bt_min_qt_luma present in PHs referring to the SPS. The value of sps_log2_diff_max_bt_min_qt_inter_slice shall be in the range of 0 to CtbLog2SizeY−MinQtLog2SizeInterY, inclusive. When sps_log2_diff_max_bt_minqt_inter_slice is not present, the value of sps_log2_diff_max_bt_min_qt_inter_slice is inferred to be equal to 0.

sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by pic_log2_diff_max_tt_min_qt_luma present in PHs referring to the SPS. The value of sps_log2_diff_max_tt_min_qt_inter_slice shall be in the range of 0 to CtbLog2SizeY−MinQtLog2SizeInterY, inclusive. When sps_log2_diff_max_tt_min_qt_inter_slice is not present, the value of sps_log2-diff_max_tt_min_qt_inter_slice is inferred to be equal to 0.

sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by pic_log2_diff_min_qt_min_cb_chroma present in PHs referring to the SPS. The value of sps_log2_diff_min_qt_min_cb_intra_slice_chroma shall be in the range of 0 to CtbLog2SizeY−MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

MinQt Log2SizeIntraC=sps_log2_diff_min_qt_min_cb_intra_slice_chroma+MinCb Log2SizeY sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by pic_max_mtt_hierarchy_depth_chroma present in PHs referring to the SPS. The value of sps_max_mtt_hierarchy_depth_intra_slice_chroma shall be in the range of 0 to 2*(CtbLog2SizeY−MinCbLog2SizeY), inclusive. When not present, the value of sps_max_mtt_hierarchy_depth_intra_slice_chroma is inferred to be equal to 0.

sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (D referring to the SPS. When partition_constraints_override_enabled_flag is equal to 1, the default difference can be overridden by pic_log2_diff_max_bt_min_qt_chroma present in PHs referring to the SPS. The value of sps_log2_diff_max_bt_min_qt_intra_slice_chroma shall be in the range of 0 to CtbLog2SizeY−

MinQtLog2SizeIntraC, inclusive. When sps_log2_diff_max_bt_min_qtintra_slice_chroma is not present, the value of sps_log2_diff_max_bt_min_qt_intra_slice_chroma is inferred to be equal to 0.

sps_log2_diff_max_tt_minqt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by pic_log2_diff_max_tt_min_qt_chroma present in PHs referring to the SPS. The value of sps_log2_diff_max_tt_min_qt_intra_slice_chroma shall be in the range of 0 to CtbLog2SizeY−MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog2SizeY, MaxTbLog2SizeY, MinTbSizeY, and MaxTbSizeY are derived as follows:

MinTb Log2SizeY=2

MaxTb Log2SizeY=sps_max_luma_transform_size_64_flag?6:5

MinTbSizeY=1<<MinTb Log2SizeY

MaxTbSizeY=1<<MaxTb Log2SizeY sps_joint_cbcr_enabled_flag equal to 0 specifies that the joint coding of chroma residuals is disabled. sps_joint_cbcr_enabled_flag equal to 1 specifies that the joint coding of chroma residuals is enabled.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26-QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = -gp_table_start_minus26[ i ] + 26
qpOutVal[ i ][ 0 ] = qpInVal[ i ][ 0 ]
for( j = 0; j <= num_points_in_qp_table_minus1[ i ] j++ ) {
  qpInVal[ i ][ j + 1 ] = qpInVal[ i ][ j ] + delta_qp_in_val_minus1[ i ][ j ] + 1
  qpOutVal[ i ][ j + 1 ] = qpOutVal[ i ][ j ] + ( delta_qp_in_val_minus1[ i ][ j ] A delta_qp_diff_val[ i ][ j ]
)
}
ChromaQp Table[ i ][ qpInVal[ i ][ 0 ] ] = qpOutVal[ i ] [ 0 ]
for( k = qpInVal[ i ] [ 0 ] - 1; k >= -QpBdOffset; k - - )
  ChromaQpTable i ][ k ] = Clip3( -QpBdOffset, 63, ChromaQpTable[ i ][ k + 1 ] - 1 )
for( j = 0; j <+ num_points_in_qp_table_minus1[ i ]; j++ ) {
  sh = ( delta_qp_in_val_minus1[ i ][j ] + 1 ) >> 1
  for( k = qpInVal[ i ][ j ] + 1, m = 1; k <= qpInval[ i ][ j + 1 ]; k++, m++ )
    ChromaQpTable[ i ] [ k ] = ChromaQpTable[ i ][ qpInVal[ i ] [ j ] ] +
      ( (qpOutVal[ i][j + 1] - qpOutVal[ i ][ j ] ) * m + sh ) /
( delta_qp_in_val_minus1[ i ][j] + 1 )
}
for( k = qpInVal[ i ][ num_points_in_gp_table_minus1[ i ] + 1 ] + 1; k <= 63; k++ )
  ChromaQpTable[ i ][ k ] = Clip3( -QpBdOffset, 63, ChromaQpTable[ i ][ k - 1 ] + 1)
```

When same_qp_table_for_chroma is equal to 1, ChromaQpTable[1][k] and ChromaQpTable[2][k] are set equal to ChromaQpTable[0][k] for k=−QpBd Offset . . . 63. It is a requirement of bitstream conformance that the values of qpInVal[i][j] and qpOutVal[i][j] shall be in the range of −QpBdOffset to 63, inclusive for i=0. numQpTables−1 and j=0 . . . num_points_in_qp_table_minus1[i]+1.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax sps_bdpcm_enabled_flag equal to 1 specifies that intra_bdpcm_luma_flag may be present in the coding unit syntax for intra coding units. sps_bdpcm_enabled_flag equal to 0 specifies that intra_bdpcm_luma_flag is not present in the coding unit syntax for intra coding units. When not present, the value of sps_bdpcm_enabled_flag is inferred to be equal to 0.

sps_bdpcm_chroma_enabled_flag equal to 1 specifies that intra_bdpcm_chroma_flag may be present in the coding unit syntax for intra coding units. sps_bdpcm_chroma_enabled_flag equal to 0 specifies that intra_bdpcm_chroma_flag is not present in the coding unit syntax for intra coding units. When not present, the value of sps_bdpcm_chroma_enabled_flag is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is less than or equal to (pic_width_in_luma_samples/MinCbSizeY−1), where pic_width_in_luma_samples is the value of pic_width_in_luma_samples in any PPS that refers to the SPS, the value of sps_ref_wraparound_enabled_flag shall be equal to 0.

sps_ref_wraparound_offset_minus1 plus 1 specifies the offset used for computing the horizontal wrap-around position in units of MinCbSizeY luma samples. The value of ref_wraparound_offset_minus1 shall be in the range of (CtbSizeY/MinCbSizeY)+1 to (pic_width_in_luma_samples/MinCbSizeY)−1, inclusive, where pic_width_in_luma_samples is the value of pic_width_in_luma_samples in any PPS that refers to the SPS.

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.

sps_sbtmvp_enabled_flag equal to 1 specifies that subblock-based temporal motion vector predictors may be used in decoding of pictures with all slices having slice_type not equal to 1 in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_bdof_pic_present_flag equal to 1 specifies that pic_disable_bdof_flag is present in PHs referring to the SPS. sps_bdof_pic_present_flag equal to 0 specifies that pic_disable_bdof_flag is not present in PHs referring to the SPS. When sps_bdof_pic_present_flag is not present, the value of sps_bdof_pic_present_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_dmvr_pic_present_flag equal to 1 specifies that pic_disable_dmvr_flag is present in PHs referring to the SPS. sps_dmvr_pic_present_flag equal to 0 specifies that pic_disable_dmvr_flag is not present in PHs referring to the SPS. When sps_dmvr_pic_present_flag is not present, the value of sps_dmvr_pic_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax.

spa_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0. sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.

sps_sbt_enabled_flag equal to 0 specifies that subblock transform for inter-predicted CUs is disabled. sps_sbt_enabled_flag equal to 1 specifies that subblock transform for inter-predicted CU is enabled.

sps_affine_enabled_flag specifies whether affine based motion compensation can be used for inter prediction. If sps_affine_enabled_flag is equal to 0, the syntax shall be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_prof_pic_present_flag equal to 1 specifies that pic_disable_prof_flag is present in PHs referring to the SPS. sps_prof_pic_present_flag equal to 0 specifies that pic_disable_prof_flag is not present in PHs referring to the SPS. When sps_prof_pic_present_flag is not present, the value of sps_prof_pic_present_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.

sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_triangle_enabled_flag specifies whether triangular shape based motion compensation can be used for inter prediction. sps_triangle_enabled_flag equal to 0 specifies that the syntax shall be constrained such that no triangular shape based motion compensation is used in the CLVS, and merge_triangle_split_dir, merge_triangle_idx0, and merge_triangle_idx1 are not present in coding unit syntax of the CLVS. sps_triangle_enabled_flag equal to 1 specifies that triangular shape based motion compensation can be used in the CLVS.

sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified. The value of sps_ladf_lowest_interval_qp_offset shall be in the range of −63 to 63, inclusive.

sps_adf_qp_offset[i] specifies the offset array used to derive the variable qP as specified. The value of sps_ladf_qp_offset[i] shall be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepth}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

$$SpsLadfIntervalLowerBound[i+1]=SpsLadfIntervalLowerBound[i]+sps\_ladf\_delta\_threshold\_minus1[i]+1$$

sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

sps_loop_filter_across_virtual_boundaries_disabled_present_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] is used to compute the value of VirtualBoundariesPosX[i], which specifies the location of the i-th vertical virtual boundary in units of luma samples. The value of sps_virtual_boundaries_pos_x[i] shall be in the range of 1 to Ceil(pic_width_in_luma_samples+8)−1, inclusive.

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

sps_virtual_boundaries_pos_y[i] is used to compute the value of VirtualBoundariesPosY[i], which specifies the location of the i-th horizontal virtual boundary in units of luma samples. The value of sps_virtual_boundaries_pos_y[i] shall be in the range of 1 to Ceil(pic_height_in_luma_samples+8)−1, inclusive.

sps_general_hrd_params_present_flag equal to 1 specifies that the syntax structure general_hrd_parameters( ) is present in the SPS RBSP syntax structure. sps_general_hrd_params_present_flag equal to 0 specifies that the syntax structure general_hrd_parameters( ) is not present in the SPS RBSP syntax structure.

sps_sublayer_cpb_params_present_flag equal to 1 specifies that the syntax structure old_hrd_parameters( ) in the SPS RBSP includes HRD parameters for sublayer representations with TemporalId in the range of 0 to sps_max_sublayers_minus1, inclusive. sps_sublayer_cpb_params_present_flag equal to 0 specifies that the syntax structure ols_hrd_parameters( ) in the SPS RBSP includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if (general_vcl_hrd_params_present_flag)" in the ols_hrd_parameters syntax structure.

field_seq_flag equal to 1 indicates that the CLVS conveys pictures that represent fields. field_seq_flag equal to 0 indicates that the CLVS conveys pictures that represent frames. When general_frame_only_constraint_flag is equal to 1, the value of field_seq_flag shall be equal to 0. When field_seq_flag is equal to 1, a frame-field information SEI message shall be present for every coded picture in the CLVS.

NOTE—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

As described above, in JVET-P2001 when sps_general_hrd_params_present_flag is equal to 1 the syntax structure general_hrd_parameters( ) is present in the SPS RBSP syntax structure. Table 4 illustrates the general_hrd_parameters( ) syntax structure provided in JVET-P2001.

TABLE 4

| | Descriptor |
|---|---|
| general_hrd_parameters( ) { | |
|   num_units_in_tick | u(32) |
|   time_scale | u(32) |
|   general_nal_hrd_params_present_flag | u(1) |
|   general_vcl_hrd_params_present_flag | u(1) |
|   general_decoding_unit_hrd_params_present_flag | u(1) |
|   if( general_decoding_unit_hrd_params_present_flag ) | |
|     tick_divisor_minus2 | u(8) |
|   bit_rate_scale | u(4) |
|   cpb_size_scale | u(4) |
|   if( general_decoding_unit_hrd_params_present_flag ) | |
|     cpb_size_du_scale | u(4) |
|   hrd_cpb_cnt_minus1 | ue(v) |
| } | |

With respect to Table 4, JVET-P2001 provides the following semantics:

The general_hrd_parameters( ) syntax structure provides HRD parameters used in the HRD operations.

It is a requirement of bitstream conformance that the content of the general_hrd_parameters( ) syntax structure present in any VPSs or SPSs in the bitstream shall be identical.

When included in a VPS, the general_hrd_parameters( ) syntax structure applies to all OLSs specified by the VPS. When included in an SPS, the general_hrd_parameters( ) syntax structure applies to the OLS that includes only the layer that is the lowest layer among the layers that refer to the SPS, and this lowest layer is an independent layer.

num_units_in_tick is the number of time units of a clock operating at the frequency time_scale Hz that corresponds to one increment (called a clock tick) of a clock tick counter. num_units_in_tick shall be greater than 0. A clock tick, in units of seconds, is equal to the quotient of num_units_in_tick divided by time_scale. For example, when the picture rate of a video signal is 25 Hz, time_scale may be equal to 27 000 000 and num_units_in_tick may be equal to 1 080 000, and consequently a clock tick may be equal to 0.04 seconds.

time_scale is the number of time units that pass in one second. For example, a time coordinate system that measures time using a 27 MHz clock has a time scale of 27 000 000. The value of time_scale shall be greater than 0.

general_nal_hrd_params_present_flag equal to 1 specifies that NAL HRD parameters (pertaining to Type II bitstream conformance point) are present in the general_hrd_parameters( ) syntax structure. general_nal_hrd_params_present_flag equal to 0 specifies that NAL HRD parameters are not present in the general_hrd_parameters( ) syntax structure.

NOTE—When general_nal_hrd_params_present_flag is equal to 0, the conformance of the bitstream cannot be verified without provision of the NAL HRD parameters and all BP SEI messages, and, when general_vcl_hrd_params_present_flag is also equal to 0, all PT and DU information SEI messages, by some means not specified in this Specification.

The variable NalHrdBpPresentFlag is derived as follows:
If one or more of the following conditions are true, the value of NalHrdBpPresentFlag is set equal to 1:
general_nal_hrd_params_present_flag is present in the bitstream and is equal to 1.
The need for presence of BPs for NAL HRD operation to be present in the bitstream in BP SEI messages is determined by the application, by some means not specified in this Specification.
Otherwise, the value of NalHrdBpPresentFlag is set equal to 0.

general_vcl_hrd_params_present_flag equal to 1 specifies that VCL HRD parameters (pertaining to Type I bitstream conformance point) are present in the general_hrd_parameters( ) syntax structure. general_vcl_hrd_params_present_flag equal to 0 specifies that VCL HRD parameters are not present in the general_hrd_parameters( ) syntax structure.

NOTE—When general_vcl_hrd_params_present_flag is equal to 0, the conformance of the bitstream cannot be verified without provision of the VCL HRD parameters and all BP SEI messages, and when general_nal_hrd_params_present_flag is also equal to 0, all PT and DU information SEI messages, by some means not specified in this Specification.

The variable VclHrdBpPresentFlag is derived as follows:
If one or more of the following conditions are true, the value of VclHrdBpPresentFlag is set equal to 1:
general_vcl_hrd_params_present_flag is present in the bitstream and is equal to 1.
The need for presence of BPs for VCL HRD operation to be present in the bitstream in BP SEI messages is determined by the application, by some means not specified in this Specification.
Otherwise, the value of VclHrdBpPresentFlag is set equal to 0.

The variable CpbDpbDelaysPresentFlag is derived as follows:
If one or more of the following conditions are true, the value of CpbDpbDelaysPresentFlag is set equal to 1:
general_nal_hrd_params_present_flag is present in the bitstream and is equal to 1.
general_vcl_hrd_params_present_flag is present in the bitstream and is equal to 1.
The need for presence of CPB and DPB output delays to be present in the bitstream in PT SEI messages is determined by the application, by some means not specified in this Specification.
Otherwise, the value of CpbDpbDelaysPresentFlag is set equal to 0.

It is a requirement of bitstream conformance that the values of general_nal_hrd_params_present_flag and general_vcl_hrd_params_present_flag in each general_hrd_parameters( ) syntax structure shall not be both equal to 0.

general_decoding_unit_hrd_params_present_flag equal to 1 specifies that DU level HRD parameters are present and the HRD may operate at AU level or DU level. general_decoding_unit_hrd_params_present_flag equal to 0 specifies that DU level HRD parameters are not present and the HRD operates at AU level. When general_decoding_unit_hrd_params_present_flag is not present, its value is inferred to be equal to 0.

tick_divisor_minus2 is used to specify the clock sub-tick. A clock sub-tick is the minimum interval of time that can be represented in the coded data when general_decoding_unit_hrd_params_present_flag is equal to 1.

bit_rate_scale (together with bit_rate_value_minus1[i][j]) specifies the maximum input bit rate of the j-th CPB when Htid is equal to i.

cpb_size_scale (together with cpb_size_value_minus1[i][j]) specifies the CPB size of the j-th CPB when Htid is equal to i and when the CPB operates at the AU level.

cpb_size_du_scale (together with cpb_size_du_value_minus1[i][j]) specifies the CPB size of the j-th CPB when Htid is equal to i and when the CPB operates at DU level.

hrd_cpb_cnt_minus1 plus 1 specifies the number of alternative CPB delivery schedules. The value of hrd_cpb_cnt_minus1 shall be in the range of 0 to 31, inclusive.

As described above, in JVET-P2001 when sps_sublayer_cpb_params_present_flag equal to 1 the syntax structure old_hrd_parameters( ) is present in the SPS RBSP syntax structure. Table 5 illustrates the ols_hrd_parameters( ) syntax structure provided in JVET-P2001.

TABLE 5

| | Descriptor |
|---|---|
| ols_hrd_parameters( firstSubLayer, maxSubLayers ) { | |
|   for( i = firstSubLayer; i <= maxSubLayers; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else if( hrd_cpb_cnt_minus1 == 0 ) | |
|       low_delay_hrd_flag[ i ] | u(1) |
|     if( general_nal_hrd_params_present_flag ) | |
|       sublayer_hrd_parameters( i ) | |
|     if( general_vcl_hrd_params_present_flag ) | |
|       sublayer_hrd_parameters( i ) | |
|   } | |
| } | |

With respect to Table 5, JVET-P2001 provides the following semantics:

When an ols_hrd_parameters( ) syntax structure is included in a VPS, the OLSs to which the ols_hrd_parameters( ) syntax structure applies are specified by the VPS. When an ols_hrd_parameters( ) syntax structure is included in an SPS, the ols_hrd_parameters( ) syntax structure applies to the OLS that includes only the layer that is the lowest layer among the layers that refer to the SPS, and this lowest layer is an independent layer.

fixed_pic_rate_general_flag[i] equal to 1 indicates that, when Htid is equal to i, the temporal distance between the HRD output times of consecutive pictures in output order is constrained as specified below. fixed_pic_rate_general_flag[i] equal to 0 indicates that this constraint may not apply.

When fixed_pic_rate_general_flag[i] is not present, it is inferred to be equal to 0.

fixed_pic_rate_within_cvs_flag[i] equal to 1 indicates that, when Htid is equal to i, the temporal distance between the HRD output times of consecutive pictures in output order is constrained as specified below. fixed_pic_rate_within_cvs_flag[i] equal to 0 indicates that this constraint may not apply.

When fixed_pic_rate_general_flag[i] is equal to 1, the value of fixed_pic_rate_within_cvs_flag[i] is inferred to be equal to 1.

elemental_duration_in_tc_minus1[i] plus 1 (when present) specifies, when Htid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

When Htid is equal to i and fixed_pic_rate_general_flag[i] is equal to 1 for a CVS containing picture n, and picture n is a picture that is output and is not the last picture in the bitstream (in output order) that is output, the value of the variable DpbOutputElementalInterval[n] is specified by:

$$DpbOutputElementalInterval[n]=DpbOutputInterval[n]+ElementalOutputPeriods$$

where DpbOutputInterval[n] is specified below and ElementalOutputPeriods is specified as follows:
If a frame-field information SEI message is present for picture n that contains a display_elemental_periods_minus1 syntax element, ElementalOutputPeriods is equal to the value of display_elemental_periods_minus1+1.
Otherwise, ElementalOutputPeriods is equal to 1.

When Htid is equal to i and fixed_pic_rate_general_flag[i] is equal to 1 for a CVS containing picture n, and picture n is a picture that is output and is not the last picture in the bitstream (in output order) that is output, the value computed for DpbOutputElementalInterval[n] shall be equal to ClockTick*(elemental_duration_in_tc_minus1[i]+1), wherein ClockTick is as specified as ClockTick=num_units_in_tick+time_scale (using the value of ClockTick for the CVS containing picture n) when one of the following conditions is true for the following picture in output order nextPicInOutputOrder that is specified as provided below:
picture nextPicInOutputOrder is in the same CVS as picture n.
picture nextPicInOutputOrder is in a different CVS and fixed_pic_rate_general_flag[i] is equal to 1 in the CVS containing picture nextPicInOutputOrder, the value of ClockTick is the same for both CVSs, and the value of elemental_duration_in_tc_minus1[i] is the same for both CVSs.

When picture n is a picture that is output and is not the last picture of the bitstream that is output, the value of the variable DpbOutputInterval[n] is derived as follows:

$$DpbOutputInterval[n]=DpbOutputTime[nextPicInOutputOrder]-DpbOutputTime[n]$$

where nextPicInOutputOrder is the picture that follows picture n in output order and has PictureOutputFlag equal to 1.

When Htid is equal to i and fixed_pic_rate_within_cvs_flag[i] is equal to 1 for a CVS containing picture n, and picture n is a picture that is output and is not the last picture in the CVS (in output order) that is output, the value computed for DpbOutputElementalInterval[n]

shall be equal to ClockTick*(elemental_duration_in_tecminus1[i]+1), wherein ClockTick is as specified provided above (using the value of ClockTick for the CVS containing picture n) when the following picture in output order nextPicInOutputOrder that is specified for use in the equation specified above is in the same CVS as picture n.

low_delay_hrd_flag[i] specifies the HRD operational mode, when Htid is equal to i, as specified. When not present, the value of low_delay_hrd_flag[i] is inferred to be equal to 0.

NOTE—When low_delay_hrd_flag[i] is equal to 1, "big pictures" that violate the nominal CPB removal times due to the number of bits used by an AU are permitted. It is expected, but not required, that such "big pictures" occur only occasionally.

As described above, in JVET-P2001 when sublayer_hrd_parameters( ) may be present in the ols_hrd_parameters( ) syntax structure. Table 6 illustrates the sub_layer_hrd_parameters( ) syntax structure provided in JVET-P2001.

particular value of i, bit_rate_value_minus1[i][j] shall be greater than bit_rate_value_minus1[i][j−1].

When DecodingUnitHrdFlag is equal to 0, the following applies:

The bit rate in bits per second is given by:

$$BitRate[i][j]=(bit\_rate\_value\_minus1[i][j]+1)*2^{(6+bit\_rate\_scale)}$$

When the bit_rate_value_minus1[i][j] syntax element is not present, it is inferred as follows:

If general_hrd_params_present_flag is equal to 1, bit_rate_value_minus1[i][j] is inferred to be equal to bit_rate_value_minus1[sps_max_sublayers_minus1][j].

Otherwise (general_hrd_params_present_flag is equal to 0), the value of BitRate[i][j] is inferred to be equal to CpbBrVclFactor*MaxBR for VCL HRD parameters and to be equal to CpbBrNalFactor*MaxBR for NAL HRD parameters, where MaxBR, CpbBrVclFactor and CpbBrNalFactor are specified for example as provided in Tables 7A-7C.

TABLE 7A

| Level | Max luma picture size MaxLumaPs (samples) | Max CPB size MaxCPB (CpbVclFactor or CpbNalFactor bits) | | Max slices per picture MaxSlicePerPicture | Max # of tile rows MaxTileRows | Max # of tile columns MaxTileCols |
|---|---|---|---|---|---|---|
| | | Main Tier | High Tier | | | |
| 1 | 36864 | 350 | — | 16 | 1 | 1 |
| 2 | 122880 | 1500 | — | 16 | 1 | 1 |
| 2.1 | 245760 | 3000 | — | 20 | 1 | 1 |
| 3 | 552960 | 6000 | — | 30 | 2 | 2 |
| 3.1 | 983040 | 10000 | — | 40 | 3 | 3 |
| 4 | 2228224 | 12000 | 30000 | 75 | 5 | 5 |
| 4.1 | 2228224 | 20000 | 50000 | 75 | 5 | 5 |
| 5 | 8912896 | 25000 | 100000 | 200 | 11 | 10 |
| 5.1 | 8912896 | 40000 | 160000 | 200 | 11 | 10 |
| 5.2 | 8912896 | 60000 | 240000 | 200 | 11 | 10 |
| 6 | 35651584 | 60000 | 240000 | 600 | 22 | 20 |
| 6.1 | 35651584 | 120000 | 480000 | 600 | 22 | 20 |
| 6.2 | 35651584 | 240000 | 800000 | 600 | 22 | 20 |

TABLE 6

| | Descriptor |
|---|---|
| sublayer_hrd_parameters( subLayerId ) { | |
|   for( j = 0; j <= hrd_cpb_cnt_minus1; j++ ) { | |
|     bit_rate_value_minus1[ subLayerId ][ j ] | ue(v) |
|     cpb_size_value_minus1[ subLayerId ][ j ] | ue(v) |
|     if( general_decoding_unit_hrd_params_present_flag ) { | |
|       cpb_size_du_value_minus1[ subLayerId ][ j ] | ue(v) |
|       bit_rate_du_value_minus1[ subLayerId ][ j ] | ue(v) |
|     } | |
|     cbr_flag[ subLayerId ][ j ] | u(1) |
|   } | |
| } | |

With respect to Table 6, JVET-P2001 provides the following semantics:

bit_rate_value_minus1[i][j] (together with bit_rate_scale) specifies the maximum input bit rate for the j-th CPB with Htid equal to i when the CPB operates at the AU level. bit_rate_value_minus1[i][j] shall be in the range of 0 to $2^{32}$−2, inclusive. For any j greater than 0 and any

TABLE 7B

| Level | Max luma sample rate MaxLumaSr (samples/sec) | Max bit rate MaxBR (BrVclFactor or BrNalFactor bits/s) | | Min compression ratio MinCrBase | |
|---|---|---|---|---|---|
| | | Main tier | High tier | Main tier | High tier |
| 1 | 552960 | 128 | — | 2 | 2 |
| 2 | 3686400 | 1500 | — | 2 | 2 |
| 2.1 | 7372800 | 3000 | — | 2 | 2 |
| 3 | 16588800 | 6000 | — | 2 | 2 |
| 3.1 | 33177600 | 10000 | — | 2 | 2 |
| 4 | 66846720 | 12000 | 30000 | 4 | 4 |
| 4.1 | 133693440 | 20000 | 50000 | 4 | 4 |
| 5 | 267386880 | 25000 | 100000 | 6 | 4 |
| 5.1 | 534773760 | 40000 | 160000 | 8 | 4 |
| 5.2 | 1069547520 | 60000 | 240000 | 8 | 4 |
| 6 | 1069547520 | 60000 | 240000 | 8 | 4 |
| 6.1 | 2139095040 | 120000 | 480000 | 8 | 4 |
| 6.2 | 4278190080 | 240000 | 800000 | 6 | 4 |

TABLE 7C

| Profile | CpbVclFactor | CpbNalFactor | FormatCapabilityFactor | MinCrScaleFactor |
|---|---|---|---|---|
| Main 10 | 1 000 | 1 100 | 1.875 | 1.0 |
| Main 4:4:4 10 | 2 500 | 2 750 | 3.750 | 0.5 | cpb_size_value_minus1[i][j] is used together with cpb_size_scale to specify the j-th CPB size with Htid equal to i when the CPB operates at the AU level. cpb_size_value_minus1[i][j] shall be in the range of 0 to $2^{32}-2$, inclusive. For any j greater than 0 and any particular value of i, cpb_size_value_minus1[i][j] shall be less than or equal to cpb_size_value_minus1[i][j−1].
When DecodingUnitHrdFlag is equal to 0, the following applies:
The CPB size in bits is given by:

$CpbSize[i][j]=(cpb\_size\_value\_minus1[i][j]+1)*2^{(4+cpb\_size\_scale)}$

When the cpb_size_value_minus1[i][j] syntax element is not present, it is inferred as follows:
  If general_hrd_params_present_flag is equal to 1, cpb_size_value_minus1[i][j] is inferred to be equal to cpb_size_value_minus1[sps_max_sublayers_minus1][j].
  Otherwise (general_hrd_params_present_flag is equal to 0), the value of CpbSize[i][j] is inferred to be equal to CpbBrVclFactor*MaxCPB for VCL HRD parameters and to be equal to CpbBrNalFactor*MaxCPB for NAL HRD parameters, where MaxCPB, CpbBrVclFactor and CpbBrNalFactor are specified above.
cpb_size_du_value_minus1[i][j] is used together with cpb_size_du_scale to specify the i-th CPB size with Htid equal to i when the CPB operates at DU level. cpb_size_du_value_minus1[i][j] shall be in the range of 0 to $2^{32}-2$, inclusive. For any j greater than 0 and any particular value of i, cpb_size_du_value_minus1[i][j] shall be less than or equal to cpb_size_du_value_minus1[i][j−1].
When DecodingUnitHrdFlag is equal to 1, the following applies:
The CPB size in bits is given by:

$CpbSize[i][j]=(cpb\_size\_du\_value\_minus1[i][j]+1)*2^{(4+cpb\_size\_du\_scale)}$ When the cpb_size_du_value_minus1[i][j] syntax element is not present, it is inferred as follows:
  If general_hrd_params_present_flag is equal to 1, cpb_size_du_value_minus1[i][j] is inferred to be equal to cpb_size_du_value_minus1[sps_max_sublayers_minus1][j].
  Otherwise (general_hrd_params_present_flag is equal to 0), the value of CpbSize[i][j] is inferred to be equal to CpbVclFactor*MaxCPB for VCL HRD parameters and to be equal to CpbNalFactor*MaxCPB for NAL HRD parameters, where MaxCPB, CpbVclFactor and CpbNalFactor are specified above.
bit_rate_du_value_minus1[i][j] (together with bit_rate_scale) specifies the maximum input bit rate for the j-th CPB with Htid equal to i when the CPB operates at the DU level. bit_rate_du_value_minus1[i][j] shall be in the range of 0 to $2^{32}-2$, inclusive. For any j greater than 0 and any particular value of i, bit_rate_du_value_minus1[i][j] shall be greater than bit_rate_du_value_minus1[i][j−1].
When DecodingUnitHrdFlag is equal to 1, the following applies:
The bit rate in bits per second is given by:

$BitRate[i][j]=(bit\_rate\_du\_value\_minus1[i][j]+1)*2^{(6+bit\_rate\_scale)}$

When the bit_rate_du_value_minus1[i][j] syntax element is not present, it is inferred as follows:
  If general_hrd_params_present_flag is equal to 1, bit_rate_du_value_minus1[i][j] is inferred to be equal to bit_rate_du_value_minus1[sps_max_sublayers_minus1][j].
  Otherwise (general_hrd_params_present_flag is equal to 0), the value of BitRate[i][j] is inferred to be equal to BrVclFactor*MaxBR for VCL HRD parameters and to be equal to BrNalFactor*MaxBR for NAL HRD parameters, where MaxBR, BrVclFactor and BrNalFactor are specified above.
cbr_flag[i][j] equal to 0 specifies that to decode this bitstream by the HRD using the j-th CPB specification, the hypothetical stream scheduler (HSS) operates in an intermittent bit rate mode. cbr_flag[i][j] equal to 1 specifies that the HSS operates in a constant bit rate (CBR) mode.
When not present, the value of cbr_flag[i][j] it is inferred as follows:
  When the cbr_flag[i][j] syntax element is not present, it is inferred as follows:
    If general_hrd_params_present_flag is equal to 1, cbr_flag[i][j] is inferred to be equal to cbr_flag[sps_max_sublayers_minus1][j].
    Otherwise (general_hrd_params_present_flag is equal to 0), the value of cbr_flag[i][j] is inferred to be equal to 0.
As described above, JVET-P2001 enables SEI messages to be signaled which assist in processes related to decoding, display or other purposes. Further, a type of SEI message for VCL HRD operations includes buffering period SEI messages. Table 8 illustrates the buffering_period( ) syntax structure provided in JVET-P2001.

TABLE 8

| | Descriptor |
|---|---|
| buffering_period( payloadSize ) { | |
|   bp_nal_hrd_params_present_flag | u(1) |
|   bp_vcl_hrd_params_present_flag | u(1) |
|   initial_cpb_removal_delay_length_minus1 | u(5) |
|   cpb_removal_delay_length_minus1 | u(5) |

TABLE 8-continued

| | Descriptor |
|---|---|
| dpb_output_delay_length_minus1 | u(5) |
| alt_cpb_params_present_flag | u(1) |
| bp_decoding_unit_hrd_params_present_flag | u(1) |
| if( bp_decoding_unit_hrd_params_present_flag ) { | |
|   du_cpb_removal_delay_increment_length_minus1 | u(5) |
|   dpb_output_delay_du_length_minus1 | u(5) |
|   decoding_unit_cpb_params_in_pic_timing_sei_flag | u(1) |
| } | |
| concatenation_flag | u(1) |
| additional_concatenation_info_present_flag | u(1) |
| if( additional_concatenation_info_present_flag ) | |
|   max_initial_removal_delay_for_concatination | u(v) |
| cpb_removal_delay_delta_minus1 | u(v) |
| cpb_removal_delay_deltas_present_flag | u(1) |
| if( cpb_removal_delay_deltas_present_flag ) { | |
|   num_cpb_removal_delay_deltas_minus1 | ue(v) |
|   for( i = 0; i <= num_cpb_removal_delay_deltas_minus1; i++ ) | |
|     cpb_removal_delay_delta[ i ] | u(v) |
| } | |
| bp_max_sublayers_minus1 | u(3) |
| bp_cpb_cnt_minus1 | ue(v) |
| sublayer_initial_cpb_removal_delay_present_flag | u(1) |
| for( i = ( sublayer_initial_cpb_removal_delay_present_flag ? | |
|     0 : bp_max_sublayers_minus1 ); i <= bp_max_sublayers_minus1; i++ ) { | |
|   if( bp_nal_hrd_params_present_flag ) | |
|     for( j = 0; j < bp_cpb_cnt_minus1 + 1; j++ ) { | |
|       nal_initial_cpb_removal_delay[ i ][ j ] | u(v) |
|       nal_initial_cpb_removal_offset[ i ][ j ] | u(v) |
|       if( bp_decoding_unit_hrd_params_present_flag) { | |
|         nal_initial_alt_cpb_removal_delay[ i ][ j ] | u(v) |
|         nal_initial_alt_cpb_removal_offset[ i ][ j ] | u(v) |
|       } | |
|     } | |
|   if( bp_vcl_hrd_params_present_flag ) | |
|     for( j = 0; j < bp_cpb_cnt_minus1 + 1; j++ ) { | |
|       vcl_initial_cpb_removal_delay[ i ][ j ] | u(v) |
|       vcl_initial_cpb_removal_offset[ i ][ j ] | u(v) |
|       if( bp_decoding_unit_hrd_params_present_flag ) { | |
|         vcl_initial_alt_cpb_removal_delay[ i ][ j ] | u(v) |
|         vcl_initial_alt_cpb_removal_offset[ i ][ j ] | u(v) |
|       } | |
|     } | |
| } | |
| if( alt_cpb_params_present_flag ) | |
|   use_alt_cpb_params_flag | u(1) |
| } | |

With respect to Table 8, JVET-P2001 provides the following semantics:

A BP SEI message provides initial CPB removal delay and initial CPB removal delay offset information for initialization of the HRD at the position of the associated AU in decoding order. When the BP SET message is present, a picture is said to be a notDiscardablePic picture when the picture has TemporalId equal to 0 and is not a RASL or RADL picture.

When the current picture is not the first picture in the bitstream in decoding order, let prevNonDiscardablePic be the preceding picture in decoding order with TemporalId equal to 0 that is not a RASL or RADL picture.

The presence of BP SEI messages is specified as follows:
  If NalHrdBpPresentFlag is equal to 1 or VclHrdBpPresentFlag is equal to 1, the following applies for each AU in the CVS:
    If the AU is an TRAP or GDR AU, a BP SET message applicable to the operation point shall be associated with the AU.
    Otherwise, if the AU contains a notDiscardablePic, a BP SET message applicable to the operation point may or may not be associated with the AU.
    Otherwise, the AU shall not be associated with a BP SET message applicable to the operation point.
  Otherwise (NalHrdBpPresentFlag and VclHrdBpPresentFlag are both equal to 0), no AU in the CVS shall be associated with a BP SEI message.
  NOTE—For some applications, frequent presence of BP SET messages may be desirable (e.g., for random access at an IRAP picture or a non-IRAP picture or for bitstream splicing).

bp_nal_hrd_params_present_flag equal to 1 specifies that a list of syntax element pairs nal_initial_cpb_removal_delay[i][j] and nal_initial_cpb_removal_offset[i][j] are present in the BP SET message. bp_nal_hrd_params_present_flag equal to 0 specifies that no syntax element pairs nal_initial_cpb_removal_delay[i][j] and nal_initial_cpb_removal_offset[i][j] are present in the BP SET message.

The value of bp_nal_hrd_params_present_flag shall be equal to general_nal_hrd_params_present_flag.

bp_vcl_hrd_params_present_flag equal to 1 specifies that a list of syntax element pairs vcl_initial_cpb_removal_delay[i][j] and vcl_initial_cpb_removal_offset[i][j] are present in the BP SET message. bp_vcl_hrd_params_present_flag equal to 0 specifies that no syntax element pairs vcl_initial_cpb_removal_delay[i][j] and vcl_initial_cpb_removal_offset[i][j] are present in the BP SEI message.

The value of bp_vcl_hrd_params_present_flag shall be equal to general_vcl_hrd_params_present_flag.

bp_vcl_hrd_params_present_flag and bp_nal_hrd_params_present_flag in a BP SET message shall not be both equal to 0.

initial_cpb_removal_delay_length_minus1 plus 1 specifies the length, in bits, of the syntax elements nal_initial_cpb_removal_delay[i][j], nal_initial_cpb_removal_offset[i][j], vcl_initial_cpb_removal_delay[i][j], and vcl_initial_cpb_removal_offset[i][j] of the BP SEI messages in the current buffering period. When not present, the value of initial_cpb_removal_delay_length_minus1 is inferred to be equal to 23.

cpb_removal_delay_length_minus1 plus 1 specifies the length, in bits, of the syntax elements cpb_removal_delay_delta_minus1 and cpb_removal_delay_delta[i] in the BP SET message and the syntax element cpb_removal_delay_minus1[i] in the PT SEI messages in the current buffering period. When not present, the value of cpb_removal_delay_length_minus1 is inferred to be equal to 23.

dpb_output_delay_length_minus1 plus 1 specifies the length, in bits, of the syntax element dpb_output_delay in the PT SET messages in the current buffering period. When not present, the value of dpb_output_delay_length_minus1 is inferred to be equal to 23.

alt_cpb_params_present_flag equal to 1 specifies the presence of the syntax element use_alt_cpb_params_flag in the BP SET message and the presence of the alternative timing information in the PT SEI messages in the current buffering period. When not present, the value of bp_alt_cpb_params_present_flag is inferred to be equal to 0. When the associated picture is neither a CRA picture nor an IDR picture, the value of bp_alt_cpb_params_present_flag shall be equal to 0.

bp_decoding_unit_hrd_params_present_flag equal to 1 specifies that DU level HRD parameters are present and the HRD may operate at AU level or DU level. bp_decoding_unit_hrd_params_present_flag equal to 0 specifies that DU level HRD parameters are not present and the HRD operates at AU level. When bp_decoding_unit_hrd_params_present_flag is not present, its value is inferred to be equal to 0. The value of bp_decoding_unit_hrd_params_present_flag shall be equal to general_decoding_unit_hrd_params_present_flag.

du_cpb_removal_delay_increment_length_minus1 plus 1 specifies the length, in bits, of the du_cpb_removal_delay_increment_minus1[ ][ ] and du_common_cpb_removal_delay_increment_minus1[ ] syntax elements of the PT SEI messages in the current buffering period and the du_spt_cpb_removal_delay_increment[ ] syntax element in the DU information SEI messages in the current buffering period. When not present, the value of du_cpb_removal_delay_increment_length_minus1 is inferred to be equal to 23.

dpb_output_delay_du_length_minus1 plus 1 specifies the length, in bits, of the pic_dpb_output_du_delay syntax element in the PT SEI messages in the current buffering period and the pic_spt_dpb_output_du_delay syntax element in the DU information SEI messages in the current buffering period. When not present, the value of dpb_output_delay_du_length_minus1 is inferred to be equal to 23.

decoding_unit_cpb_params_in_pic_timing_sei_flag equal to 1 specifies that DU level CPB removal delay parameters are present in PT SEI messages and no DU information SEI message is available (in the CVS or provided through external means not specified in this Specification). decoding_unit_cpb_params_in_pic_timing_sei_flag equal to 0 specifies that DU level CPB removal delay parameters are present in DU information SEI messages and PT SEI messages do not include DU level CPB removal delay parameters. When the decoding_unit_cpb_params_in_pic_timing_sei_flag syntax element is not present, it is inferred to be equal to 0.

concatenation_flag indicates, when the current picture is not the first picture in the bitstream in decoding order, whether the nominal CPB removal time of the current picture is determined relative to the nominal CPB removal time of the preceding picture with a BP SEI message or relative to the nominal CPB removal time of the picture prevNonDiscardablePic.

additional_concatenation_info_present_flag equal to 1 specifies that the syntax element max_initial_removal_delay_for_concatination is present in the BP SEI message and the syntax element delay_for_concatenation_ensured_flag is present in the PT SEI messages. additional_concatenation_info_present_flag equal to 0 specifies that the syntax element max_initial_removal_delay_for_concatination is not present in the BP SEI message and the syntax element delay_for_concatenation_ensured_flag is not present in the PT SEI messages.

max_initial_removal_delay_for_concatination may be used together with delay_for_concatenation_ensured_flag in a PT SEI message to identify whether the nominal removal time from the CPB of the first AU of a following BP computed with cpb_removal_delay_delta_minus1 applies. The length of max_initial_removal_delay_for_concatination is initial_cpb_removal_delay_length_minus1+1 bits.

cpb_removal_delay_delta_minus1 plus 1, when the current picture is not the first picture in the bitstream in decoding order, specifies a CPB removal delay increment value relative to the nominal CPB removal time of the picture prevNonDiscardablePic. The length of this syntax element is cpb_removal_delay_length_minus1+1 bits.

When the current picture contains a BP SEI message and concatenation_flag is equal to 0 and the current picture is not the first picture in the bitstream in decoding order, it is a requirement of bitstream conformance that the following constraint applies:

If the picture prevNonDiscardablePic is not associated with a BP SEI message, the cpb_removal_delay_minus1 of the current picture shall be equal to the cpb_removal_delay_minus1 of prevNonDiscardablePic plus cpb_removal_delay_delta_minus1+1.

Otherwise, cpb_removal_delay_minus1 shall be equal to cpb_removal_delay_delta_minus1.

NOTE—When the current picture contains a BP SEI message and concatenation_flag is equal to 1, the cpb_removal_delay_minus1 for the current picture is not used. The above-specified constraint can, under some circumstances, make it possible to splice bitstreams (that use suitably-designed referencing structures) by simply changing the value of concatenation flag from 0 to 1 in the BP SEI message for an IRAP or GDR picture at the splicing point. When concatenation_flag is equal to 0, the above-specified constraint enables the decoder to check whether the constraint is satisfied as a way to detect the loss of the picture prevNonDiscardablePic.

cpb_removal_delay_deltas_present_flag equal to 1 specifies that the BP SEI message contains CPB removal delay deltas. cpb_removal_delay_deltas_present_flag equal to 0 specifies that no CPB removal delay deltas are present in the BP SEI message.

num_cpb_removal_delay_deltas_minus1 plus 1 specifies the number of syntax elements cpb_removal_delay_delta[i] in the BP SEI message. The value of num_cpb_removal_offsets_minus1 shall be in the range of 0 to 15, inclusive.

cpb_removal_delay_delta[i] specifies the i-th CPB removal delay delta. The length of this syntax element is cpb_removal_delay_length_minus1+1 bits.

bp_max_sublayers_minus1 plus 1 specifies the maximum number of temporal sublayers for which CPB removal delay and CPB removal offset are indicated in the BP SEI message. The value of bp_max_sublayers_minus1 shall be in the range of 0 to vps_max_sublayers_minus1, inclusive.

bp_cpb_cnt_minus1 plus 1 specifies the number of syntax element pairs nal_initial_cpb_removal_delay[i][j] and nal_initial_cpb_removal_offset[i][j] of the i-th temporal sublayer when bp_nal_hrd_params_present_flag is equal to 1, and the number of syntax element pairs vcl_initial_cpb_removal_delay[i][j] and vcl_initial_cpb_removal_offset[i][j] of the i-th temporal sublayer when bp_vcl_hrd_params_present_flag is equal to 1. The value of bp_cpb_cnt_minus1 shall be in the range of 0 to 31, inclusive.

The value of bp_cpb_cnt_minus1 shall be equal to the value of hrd_cpb_cnt_minus1.

sublayer_initial_cpb_removal_delay_present_flag equal to 1 specifies that initial CPB removal delay related syntax elements are present for temporal sublayer representation(s) in the range of 0 to bp_max_sublayers_minus1, inclusive. sublayer_initial_cpb_removal_delay_present_flag equal to 0 specifies that initial CPB removal delay related syntax elements are present for the bp_max_sublayers_minus1-th temporal sublayer representation.

nal_initial_cpb_removal_delay[i][j] and nal_initial_alt_cpb_removal_delay[i][j] specify the j-th default and alternative initial CPB removal delay for the NAL HRD in units of a 90 kHz clock of the i-th temporal sublayer. The length of nal_initial_cpb_removal_delay[i][j] and nal_initial_alt_cpb_removal_delay[i][j] is initial_cpb_removal_delay_length_minus1+1 bits. The value of nal_initial_cpb_removal_delay[i][j] and nal_initial_alt_cpb_removal_delay[i][j] shall not be equal to 0 and shall be less than or equal to 90000*(CpbSize[i][j]+BitRate[i][j]), the time-equivalent of the CPB size in 90 kHz clock units. When not present, the values of nal_initial_cpb_removal_delay[i][j] and nal_initial_alt_cpb_removal_delay[i][j] are inferred to be equal to 90000*(CpbSize[i][j] BitRate[i][j]).

nal_initial_cpb_removal_offset[i][j] and nal_initial_alt_cpb_removal_offset[i][j] specify the j-th default and alternative initial CPB removal offset of the i-th temporal sublayer for the NAL HRD in units of a 90 kHz clock. The length of nal_initial_cpb_removal_offset[i][j] and nal_initial_alt_cpb_removal_offset[i][j] is initial_cpb_removal_delay_length_minus1+1 bits. When not present, the values of nal_initial_cpb_removal_offset[i][j] and nal_initial_alt_cpb_removal_offset[i][j] are inferred to be equal to 0.

Over the entire CVS, for each value pair of i and j, the sum of nal_initial_cpb_removal_delay[i][j] and nal_initial_cpb_removal_offset[i][j] shall be constant, and the sum of nal_initial_alt_cpb_removal_delay[i][j] and nal_initial_alt_cpb_removal_offset[i][j] shall be constant.

vcl_initial_cpb_removal_delay[i][j] and vcl_initial_alt_cpb_removal_delay[i][j] specify the j-th default and alternative initial CPB removal delay of the i-th temporal sublayer for the VCL HRD in units of a 90 kHz clock. The length of vcl_initial_cpb_removal_delay[i][j] and vcl_initial_alt_cpb_removal_delay[i][j] is initial_cpb_removal_delay_length_minus1+1 bits. The value of vcl_initial_cpb_removal_delay[i][j] and vcl_initial_alt_cpb_removal_delay[i][j] shall not be equal to 0 and shall be less than or equal to 90000*(CpbSize[i][j]+BitRate[i][j]), the time-equivalent of the CPB size in 90 kHz clock units. When not present, the values of vcl_initial_cpb_removal_delay[i][j] and vcl_initial_alt_cpb_removal_delay[i][j] are inferred to be equal to 90000*(CpbSize[i][j]+BitRate[i][j]).

vcl_initial_cpb_removal_offset[i][j] and vcl_initial_alt_cpb_removal_offset[i][j] specify the j-th default and alternative initial CPB removal offset of the i-th temporal sublayer for the VCL HRD in units of a 90 kHz clock. The length of vcl_initial_cpb_removal_offset[i] and vcl_initial_alt_cpb_removal_offset[i][j] is initial_cpb_removal_delay_length_minus1+1 bits. When not present, the values of vcl_initial_cpb_removal_offset[i][j] and vcl_initial_alt_cpb_removal_offset[i][j] are inferred to be equal to 0.

Over the entire CVS, for each value pair of i and j the sum of vcl_initial_cpb_removal_delay[i][j] and vcl_initial_cpb_removal_offset[i][j] shall be constant, and the sum of vcl_initial_alt_cpb_removal_delay[i][j] and vcl_initial_alt_cpb_removal_offset[i][j] shall be constant.

use_alt_cpb_params_flag may be used to derive the value of UseAltCpbParamsFlag. When use_alt_cpb_params_flag is not present, it is inferred to be equal to 0.

When one or more of the following conditions apply, UseAltCpbParamsFlag is set to 1:
  use_alt_cpb_params_flag is equal to 1.
  When some external means not specified in this Specification is available to set UseAltCpbParamsFlag and the value of UseAltCpbParamsFlag is set equal to 1 by the external means.

As described above, JVET-P2001 enables SEI messages to be signaled which assist in processes related to decoding, display or other purposes. Further, a type of SEI message for VCL HRD operations includes picture timing SEI messages. Table 9 illustrates the pic_timing( ) syntax structure provided in JVET-P2001.

TABLE 9

|  | Descriptor |
|---|---|
| pic_timing( payloadSize ) { | |
|   cpb_removal_delay_minus1[ bp_max_sublayers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       for( i = 0; i < bp_cpb_cnt_minus1 + 1; i++ ) { | |
|         cpb_alt_initial_cpb_removal_delay_delta[ i ] | u(v) |
|         cpb_alt_initial_cpb_removal_offset_delta[ i ] | u(v) |
|       } | |
|       cpb_delay_offset | u(v) |
|       dpb_delay_offset | u(v) |
|     } | |
|   } | |
|   for( i = TemporalId; i < bp_max_sublayers_minus1; i++ ) { | |
|     pt_sublayer_delays_present_flag[ i ] | u(1) |
|     if( pt_sublayer_delays_present_flag[ i ] ) { | |
|       if( cpb_removal_delay_deltas_present_flag ) | |
|         cpb_removal_delay_delta_enabled_flag[ i ] | u(1) |
|       if( cpb_removal_delay_delta_enabled_flag[ i ] ) | |
|         cpb_removal_delay_delta_idx[ i ] | u(v) |
|       else | |
|         cpb_removal_delay_minus1[ i ] | u(v) |
|     } | |
|   } | |
|   dpb_output_delay | u(v) |
|   if( bp_decoding_unit_hrd_params_present_flag ) | |
|     pic_dpb_output_du_delay | u(v) |
|   if( bp_decoding_unit_hrd_params_present_flag && | |
|     decoding_unit_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|       for( i = TemporalId; i <= bp_max_sublayers_minus1; i++ ) | |
|         if( pt_sublayer_delays_present_flag[ i ] ) | |
|           du_common_cpb_removal_delay_increment_minus1[ i ] | u(v) |
|     for( i = 0; i <= num_decoding_units_minus1; i++ ) { | |
|       num_nalus_in_du_minus1[ i ] | ue(v) |
|       if( !du_common_cpb_removal_delay_flag && i < num_decoding_units_minus1 ) | |
|         for( j = TemporalId; j <= bp_max_sublayers_minus1; j++ ) | |
|           if( pt_sublayer_delays_present_flag[ j ] ) | |
|             du_cpb_removal_delay_increment_minus1[ i ][ j ] | u(v) |
|     } | |
|   } | |
|   if( additional_concatenation_info_present_flag ) | |
|     delay_for_concatenation_ensured_flag | u(1) |
| } | |

With respect to Table 9, JVET-P2001 provides the following semantics:

The PT SEI message provides CPB removal delay and DPB output delay information for the AU associated with the SET message.

If bp_nal_hrd_params_present_flag or bp_vcl_hrd_params_present_flag of the BP SEI message applicable for the current AU is equal to 1, the variable CpbDpbDelaysPresentFlag is set equal to 1. Otherwise, CpbDpbDelaysPresentFlag is set equal to 0.

The presence of PT SET messages is specified as follows:
  If CpbDpbDelaysPresentFlag is equal to 1, a PT SEI message shall be associated with the current AU.
  Otherwise (CpbDpbDelaysPresentFlag is equal to 0), there shall not be a PT SEI message associated with the current AU.

The TemporalId in the PT SEI message syntax is the TemporalId of the SEI NAL unit containing the PT SET message.

cpb_removal_delay_minus1[i] plus 1 is used to calculate the number of clock ticks between the nominal CPB removal times of the AU associated with the PT SET message and the preceding AU in decoding order that contains a BP SEI message when Htid is equal to i. This value is also used to calculate an earliest possible time of arrival of AU data into the CPB for the HSS. The length of cpb_removal_delay_minus1[i] is cpb_removal_delay_length_minus1+1 bits.

cpb_alt_timing_info_present_flag equal to 1 specifies the presence of the syntax elements cpb_alt_initial_cpb_removal_delay_delta[i], cpb_delay_offset, and dpb_delay_offset. When the associated picture is a RASL picture, the value of cpb_alt_timing_info_present_flag shall be equal to 0.
  NOTE—The value of cpb_alt_timing_info_present_flag might be equal to 1 for more than one AU following an IRAP picture in decoding order. However, the alternative timing is only applied to the first AU that has cpb_alt_timing_info_present_flag equal to 1 and follows the IRAP picture in decoding order.

cpb_alt_initial_cpb_removal_delay_delta[i] specifies the alternative initial CPB removal delay delta for the i-th CPB. The length of cpb_alt_initial_cpb_removal_delay_delta[i] is initial_cpb_removal_delay_length_minus1+1 bits.

cpb_alt_initial_cpb_removal_offset_delta[i] specifies the alternative initial CPB removal offset delta for the i-th CPB. The length of cpb_alt_initial_cpb_removal_offset_delta[i] is initial_cpb_removal_delay_length_minus1+1 bits.

cpb_delay_offset specifies an offset to be used in the derivation of the nominal CPB removal times of the AU associated with the PT SEI message and of the AUs following in decoding order, when the AU associated with the PT SEI message directly follows in decoding order the AU associated with the BP SEI message. The length of cpb_delay_offset is au_cpb_removal_delay_length_minus1+1 bits. When not present, the value of cpb_delay_offset is inferred to be equal to 0.

dpb_delay_offset specifies an offset to be used in the derivation of the DPB output times of the IRAP AU associated with the BP SET message when the AU associated with the PT SEI message directly follows in decoding order the IRAP AU associated with the BP SEI message. The length of dpb_delay_offset is dpb_output_delay_length_minus1+1 bits. When not present, the value of dpb_delay_offset is inferred to be equal to 0.

The variable BpResetFlag of the current picture is derived as follows:
  If the current picture is associated with a BP SEI message, BpResetFlag is set equal to 1.
  Otherwise, BpResetFlag is set equal to 0.

pt_sublayer_delays_present_flag[i] equal to 1 specifies that cpb_removal_delay_delta_idx[i] or cpb_removal_delay_minus1[i], and that du_common_cpb_removal_delay_increment_minus1[i] or du_cpb_removal_delay_increment_minus1[ ][ ] are present for the sublayer with TemporalId equal to i. sublayer_delays_present_flag[i] equal to 0 specifies that neither cpb_removal_delay_delta_idx[i] nor cpb_removal_delay_minus1[i] and that neither du_common_cpb_removal_delay_increment_minus1[i] nor du_cpb_removal_delay_increment_minus1[ ] [ ] are present for the sublayer with TemporalId equal to i. The value of pt_sublayer_delays_present_flag[bp_max_sublayers_minus1] is inferred to be equal to 1. When not present, the value of pt_sublayer_delays_present_flag[i] for any i in the range of 0 to bp_max_sublayers_minus1−1, inclusive, is inferred to be equal to 0.

cpb_removal_delay_delta_enabled_flag[i] equal to 1 specifies that cpb_removal_delay_delta_idx[i] is present in the PT SEI message. cpb_removal_delay_delta_enabled_flag[i] equal to 0 specifies that cpb_removal_delay_delta_idx[i] is not present in the PT SET message. When not present, the value of cpb_removal_delay_delta_enabled_flag[i] is inferred to be equal to 0.

cpb_removal_delay_delta_idx[i] specifies the index of the CPB removal delta that applies to Htid equal to i in the list of cpb_removal_delay_delta[j] for j ranging from 0 to num_cpb_removal_delay_deltas_minus1, inclusive. The length of cpb_removal_delay_delta_idx[i] is Ceil(Log2(num_cpb_removal_delay_deltas_minus1+1)) bits.

The variables CpbRemovalDelayMsb[i] and CpbRemovalDelayVal[i] of the current picture are derived as follows:
  If the current AU is the AU that initializes the HRD, CpbRemovalDelayMsb[i] and CpbRemovalDelayVal[i] are both set equal to 0, and the value of cpbRemovalDelayValTmp[i] is set equal to cpb_removal_delay_minus1[i]+1.

Otherwise, let the picture prevNonDiscardablePic be the previous picture in decoding order that has TemporalId equal to 0 that is not a RASL or RADL, let prevCpbRemovalDelayMinus1[i], prevCpbRemovalDelayMsb[i], and prevBpResetFlag be set equal to the values of cpbRemovalDelayValTmp[i]−1, CpbRemovalDelayMsb[i], and BpResetFlag, respectively, for the picture prevNonDiscardablePic, and the following applies:

- CpbRemovalDelayMsb[ i ] is derived as follows:
    cpbRemovalDelayValTmp[ i ] = cpb_removal_delay_delta_enabled_flag[ i ] ?
        cpb_removal_delay_minus1[ sps max sublayers minus1 ] + 1 +
        cpb_removal_delay_delta[ cpb_removal_delay_delta_idx[ i ] ] :
        cpb_removal_delay_minus1[ i ] + 1
    if( prevBpResetFlag )
        CpbRemovalDelayMsb[ i ] = 0
    else if( cpbRemovalDelayValTmp[ i ] < prevCpbRemovalDelayMinus1[ i ] )
        CpbRemovalDelayMsb[ i ] = prevCpbRemovalDelayMsb[ i ] +
        $2^{cpb\_removal\_delay\_length\_minus1 + 1}$
    else
        CpbRemovalDelayMsb[ i ] = prevCpbRemovalDelayMsb[ i ]
- CpbRemovalDelayVal is derived as follows:
    CpbRemovalDelayVal[ i ] = CpbRemovalDelayMsb[ i ] +
    cpbRemovalDelayValTmp[ i ]

The value of CpbRemovalDelayVal[i] shall be in the range of 1 to $2^{32}$, inclusive.

The variable picDpbOutputDelta[i] is derived as follows:
  If pt_sublayer_delays_present_flag[i] is equal to 0, picDpbOutputDelta[i] is set equal to 0.
  Otherwise (pt_sublayer_delays_present_flag[i] is equal to 1), picDpbOutputDelta[i] is set equal to CpbRemovalDelayVal[i]−(cpb_removal_delay_minus1[sps_max_sublayers_minus1]+1).

dpb_output_delay is used to compute the DPB output time of the picture. It specifies how many clock ticks to wait after removal of an AU from the CPB before the decoded picture is output from the DPB.
  NOTE—A picture is not removed from the DPB at its output time when it is still marked as "used for short-term reference" or "used for long-term reference".

The length of dpb_output_delay is dpb_output_delay_length_minus1+1 bits. When max_dec_pic_buffering_minus1[Htid] is equal to 0, the value of pic_dpb_output_delay shall be equal to 0.

The output time derived from the dpb_output_delay of any picture that is output from an output timing conforming decoder shall precede the output time derived from the dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from dpb_output_delay shall be increasing with increasing value of PicOrderCntVal relative to all pictures within the same CVS.

pic_dpb_output_du_delay is used to compute the DPB output time of the picture when DecodingUnitHrdFlag is equal to 1. It specifies how many sub clock ticks to wait after removal of the last DU in an AU from the CPB before the decoded picture is output from the DPB.

The length of the syntax element pic_dpb_output_du_delay is given in bits by dpb_output_delay_du_length_minus1+1.

The output time derived from the pic_dpb_output_du_delay of any picture that is output from an output timing conforming decoder shall precede the output time derived from the pic_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

num_decoding_units_minus1 plus 1 specifies the number of DUs in the AU the PT SEI message is associated with. The value of num_decoding_units_minus1 shall be in the range of 0 to PicSizeInCtbsY−1, inclusive.

du_common_cpb_removal_delay_flag equal to 1 specifies that the syntax elements du_common_cpb_removal_delay_increment_minus1[i] are present. du_common_cpb_removal_delay_flag equal to 0 specifies that the syntax elements du_common_cpb_removal_delay_increment_minus1[i] are not present.

du_common_cpb_removal_delay_increment_minus1[i] plus 1 specifies the duration, in units of clock sub-ticks, between the nominal CPB removal times of any two consecutive DUs in decoding order in the AU associated with the PT SEI message when Htid is equal to i. This value is also used to calculate an earliest possible time of arrival of DU data into the CPB for the HSS, as specified. The length of this syntax element is du_cpb_removal_delay_increment_length_minus1+1 bits.

When du_common_cpb_removal_delay_increment_minus1[i] is not present for any value of i less than bp_max_sublayers_minus1, its value is inferred to be equal to du_common_cpb_removal_delay_increment_minus1[bp_max_sublayers_minus1].

num_nalus_in_du_minus1[i] plus 1 specifies the number of NAL units in the i-th DU of the AU the PT SEI message is associated with. The value of num_nalus_in_du_minus1[i] shall be in the range of 0 to PicSizeInCtbsY−1, inclusive.

The first DU of the AU consists of the first num_nalus_in_du_minus1[0]+1 consecutive NAL units in decoding order in the AU. The i-th (with i greater than 0) DU of the AU consists of the num_nalus_in_du_minus1[i]+1 consecutive NAL units immediately following the last NAL unit in the previous DU of the AU, in decoding order. There shall be at least one VCL NAL unit in each DU. All non-VCL NAL units associated with a VCL NAL unit shall be included in the same DU as the VCL NAL unit.

du_cpb_removal_delay_increment_minus1[i][j] plus 1 specifies the duration, in units of clock sub-ticks, between the nominal CPB removal times of the (i+1)-th DU and the i-th DU, in decoding order, in the AU associated with the PT SEI message when Htid is equal to j. This value is also used to calculate an earliest possible time of arrival of DU data into the CPB for the HSS, as specified. The length of this syntax element is du_cpb_removal_delay_increment_length_minus1+1 bits.

When du_cpb_removal_delay_increment_minus1[i][j] is not present for any value of j less than bp_max_sublayers_minus1, its value is inferred to be equal to du_cpb_removal_delay_increment_minus1[i][bp_max_sublayers_minus1].

delay_for_concatenation_ensured_flag equal to 1 specifies that the difference between the final arrival time and the CPB removal time of the AU associated with the PT SEI message is such that when followed by an AU with a BP SEI message with concatenation flag equal to 1 and InitCpbRemovalDelay[ ][ ] less than or equal to the value of max_initial_removal_delay_for_concatination, the nominal removal time of the following AU from the CPB computed with cpb_removal_delay_delta_minus1 applies. delay_for_concatenation_ensured_flag equal to 0 specifies that the difference between the final arrival time and the CPB removal time of the AU associated with the PT SEI message may or may not exceed the value of max_val_initial_removal_delay_for_splicing.

As described above, JVET-P2001 enables SEI messages to be signaled which assist in processes related to decoding, display or other purposes. Further, a type of SEI message for VCL HRD operations includes decoding unit information SEI messages. Table 10 illustrates the decoding_unit_info( ) syntax structure provided in JVET-P2001.

TABLE 10

|  | Descriptor |
|---|---|
| decoding_unit_info( payloadSize ) { | |
|   decoding_unit_idx | ue(v) |
|   if( | |
|   !decoding_unit_cpb_params_in_pic_timing_sei_flag ) | |
|     for( i = TemporalId; i <= | |
|   bp_max_sublayers_minus1; i++ ) { | |
|     dui_sublayer_delays_present_flag[ i ] | u(1) |
|     if( dui_sublayer_delays_present_flag[ i ] ) | |
|       du_spt_cpb_removal_delay_increment[ i ] | u(v) |
|   } | |
|   dpb_output_du_delay_present_flag | u(1) |
|   if( dpb_output_du_delay_present_flag ) | |
|     pic_spt_dpb_output_du_delay | u(v) |
| } | |

With respect to Table 10, JVET-P2001 provides the following semantics:

The DU information SET message provides CPB removal delay information for the DU associated with the SEI message.

The following applies for the DU information SEI message syntax and semantics:
  The syntax elements bp_decoding_unit_hrd_params_present_flag, decoding_unit_cpb_params_in_pic_timing_sei_flag and dpb_output_delay_du_length_minus1 are found in the BP SEI message that is applicable to at least one of the operation points to which the DU information SEI message applies.

The bitstream (or a part thereof) refers to the bitstream subset (or a part thereof) associated with any of the operation points to which the DU information SEI message applies.

The presence of DU information SET messages for an operation point is specified as follows:

If CpbDpbDelaysPresentFlag is equal to 1, bp_decoding_unit_hrd_params_present_flag is equal to 1 and decoding_unit_cpb_params_in_pic_timing_sei_flag is equal to 0, one or more DU information SET messages applicable to the operation point shall be associated with each DU in the CVS.

Otherwise, if CpbDpbDelaysPresentFlag is equal to 1, bp_decoding_unit_hrd_params_present_flag is equal to 1 and decoding_unit_cpb_params_in_pic_timing_sei_flag is equal to 1, one or more DU information SET messages applicable to the operation point may or may not be associated with each DU in the CVS.

Otherwise (CpbDpbDelaysPresentFlag is equal to 0 or bp_decoding_unit_hrd_params_present_flag is equal to 0), in the CVS there shall be no DU that is associated with a DU information SET message applicable to the operation point.

The set of NAL units associated with a DU information SET message consists, in decoding order, of the SET NAL unit containing the DU information SET message and all subsequent NAL units in the AU up to but not including any subsequent SET NAL unit containing a DU information SET message with a different value of decoding_unit_idx. Each DU shall include at least one VCL NAL unit. All non-VCL NAL units associated with a VCL NAL unit shall be included in the DU containing the VCL NAL unit.

The TemporalId in the DU information SET message syntax is the TemporalId of the SET NAL unit containing the DU information SET message.

decoding_unit_idx specifies the index, starting from 0, to the list of DUs in the current AU, of the DU associated with the DU information SET message. The value of decoding_unit_idx shall be in the range of 0 to PicSizeInCtbsY−1, inclusive.

A DU identified by a particular value of duIdx includes and only includes all NAL units associated with all DU information SET messages that have decoding_unit_idx equal to duIdx. Such a DU is also referred to as associated with the DU information SET messages having decoding_unit_idx equal to duIdx.

For any two DUs duA and duB in one AU with decoding_unit_idx equal to duIdxA and duIdxB, respectively, where duIdxA is less than duIdxB, duA shall precede duB in decoding order.

A NAL unit of one DU shall not be present, in decoding order, between any two NAL units of another DU.

dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When not present, the value of dui_sublayer_delays_present_flag[i] is inferred to be equal to 0.

du_spt_cpb_removal_delay_increment[i] specifies the duration, in units of clock sub-ticks, between the nominal CPB times of the last DU in decoding order in the current AU and the DU associated with the DU information SEI message when Htid is equal to i. This value is also used to calculate an earliest possible time of arrival of DU data into the CPB for the HSS, as specified in Annex C. The length of this syntax element is du_cpb_removal_delay_increment_length_minus1+1. When the DU associated with the DU information SEI message is the last DU in the current AU, the value of du_spt_cpb_removal_delay_increment[i] shall be equal to 0. When du_spt_cpb_removal_delay_increment[i] is not present for any value of i less than bp_max_sublayers_minus1, its value is inferred to be equal to du_spt_cpb_removal_delay_increment[bp_max_sublayers_minus1].

dpb_output_du_delay_present_flag equal to 1 specifies the presence of the pic_spt_dpb_output_du_delay syntax element in the DU information SEI message. dpb_output_du_delay_present_flag equal to 0 specifies the absence of the pic_spt_dpb_output_du_delay syntax element in the DU information SEI message. pic_spt_dpb_output_du_delay is used to compute the DPB output time of the picture when DecodingUnitHrdFlag is equal to 1. It specifies how many sub clock ticks to wait after removal of the last DU in an AU from the CPB before the decoded picture is output from the DPB. When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.

It is a requirement of bitstream conformance that all DU information SEI messages that are associated with the same AU, apply to the same operation point, and have dpb_output_du_delay_present_flag equal to 1 shall have the same value of pic_spt_dpb_output_du_delay.

The output time derived from the pic_spt_dpb_output_du_delay of any picture that is output from an output timing conforming decoder shall precede the output time derived from the pic_spt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_spt_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

Further, JVET-P2001, provides the following for picture output for a decoding picture buffer:

The processes specified in this clause happen instantaneously at the CPB removal time of AU n, CpbRemovalTime[n].

When picture n has PictureOutputFlag equal to 1, its DPB output time DpbOutputTime[n] is derived as follows, where the variable firstPicInBufferingPeriodFlag is equal to 1 if AU n is the first AU of a BP and 0 otherwise:

```
if( !DecodingUnitHrdFlag ) {
  DpbOutputTime[ n ] = CpbRemovalTime[ n ] + ClockTick *
    (picDpbOutputDelay -
        picDpbOutputDelta )
  if( firstPicInBufferingPeriodFlag )
    DpbOutputTime[ n ] -= ClockTick * DpbDelayOffset
} else
  DpbOutputTime[ n ] = AuCpbRemovalTime[ n ] + ClockSubTick *
    picSptDpbOutputDuDelay
``` where picDpbOutputDelay is the value of pic_dpb_output_delay and picDpbOutputDelta is the value of picDpbOutputDelta[Htid] derived according to cpb_removal_delay_minus1[Htid], and cpb_removal_delay_delta_idx[Htid] in the PT SEI message associated with AU n, and cpb_removal_delay_delta[cpb_removal_delay_delta_idx[Htid] ] in the BP SEI message associated with AU n, and picSptDpbOutputDuDelay is the value of pic_spt_dpb_output_du_delay, when present, in the DU information SET messages associated with AU n, or the value of pic_dpb_output_du_delay in the PT SET message associated with AU n when there is no DU information SET message associated with AU n or no DU information SEI message associated with AU n has pic_spt_dpb_output_du_delay present.

NOTE—When the syntax element pic_spt_dpb_output_du_delay is not present in any DU information SEI message associated with AU n, the value is inferred to be equal to pic_dpb_output_du_delay in the PT SEI message associated with AU n.

The output of the current picture is specified as follows:

If PictureOutputFlag is equal to 1 and DpbOutputTime[n] is equal to CpbRemovalTime[n], the current picture is output.

Otherwise, if PictureOutputFlag is equal to 0, the current picture is not output, but will be stored in the DPB as specified in the clause below.

Otherwise (PictureOutputFlag is equal to 1 and DpbOutputTime[n] is greater than CpbRemovalTime[n]), the current picture is output later and will be stored in the DPB (as specified below) and is output at time DpbOutputTime[n] unless indicated not to be output by NoOutputOfPriorPicsFlag equal to 1.

When output, the picture is cropped, using the conformance cropping window for the picture. When picture n is a picture that is output and is not the last picture of the bitstream that is output, the value of the variable DpbOutputInterval[n] is derived as follows:

$DpbOutputInterval[n]=DpbOutputTime[nextPicInOutputOrder]-DpbOutputTime[n]$ where nextPicInOutputOrder is the picture that follows picture n in output order and has PictureOutputFlag equal to 1.

The current decoded picture is stored in the DPB in an empty picture storage buffer, the DPB fullness is incremented by one, and the current picture is marked as "used for short-term reference".

NOTE—Unless more memory than required by the level limit is available for storage of decoded pictures, decoders should start storing decoded parts of the current picture into the DPB when the first slice is decoded and continue storing more decoded samples as the decoding process proceeds.

The signaling of syntax elements pic_dpb_output_du_delay and pic_spt_dpb_output_du_delay in JVET-P2001 is less than ideal. In particular, if DU level HRD parameters are present (i.e., bp_decoding_unit_hrd_params_present_flag is equal to 1), picture dpb output delay information (i.e. pic_dpb_output_du_delay) is always signalled in picture timing SEI message. Additionally, the picture dpb output delay information can be signalled in each of the one or more DU information SEI messages in syntax element pic_spt_dpb_output_du_delay, if dpb_output_du_delay_present_flag is equal to 1. If the picture dpb output delay information is signaled in DU information SEI messages, the value signalled shall be the same. It is asserted that this way of information signalling about picture DPB output delay is unnecessarily redundant and overly complicated. According to the techniques herein, simplification is proposed for signalling picture DPB output delay information. In one example, according to the techniques herein, if DU level HRD parameters are present, a flag is signalled in Buffering period SEI message (or picture timing SEI message) to control if DU level picture DPB output delay information is signalled only in picture timing SEI message or in DU information SEI message. In addition, in one example, an additional flag is signaled in picture timing SEI message (or in buffering period SEI message) to indicate that when DU level picture DPB output delay information is signalled in picture timing SEI message it may be updated in DU information SEI message. In one example, a flag is signalled in buffering period SEI message (or in picture timing SEI message) specifying if DU level picture DPB output delay information is signalled or is inferred to be same as the information for AU level.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
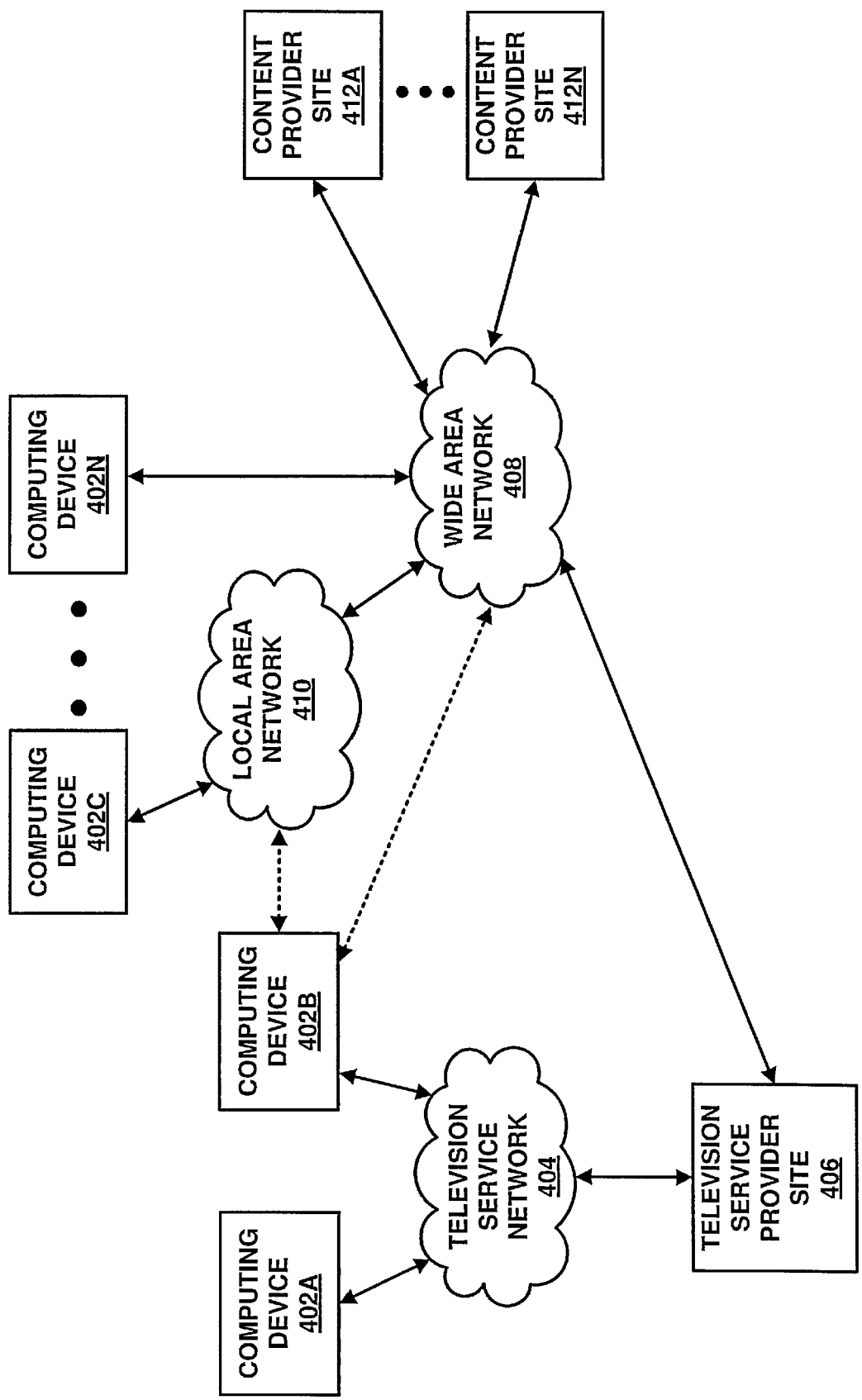
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
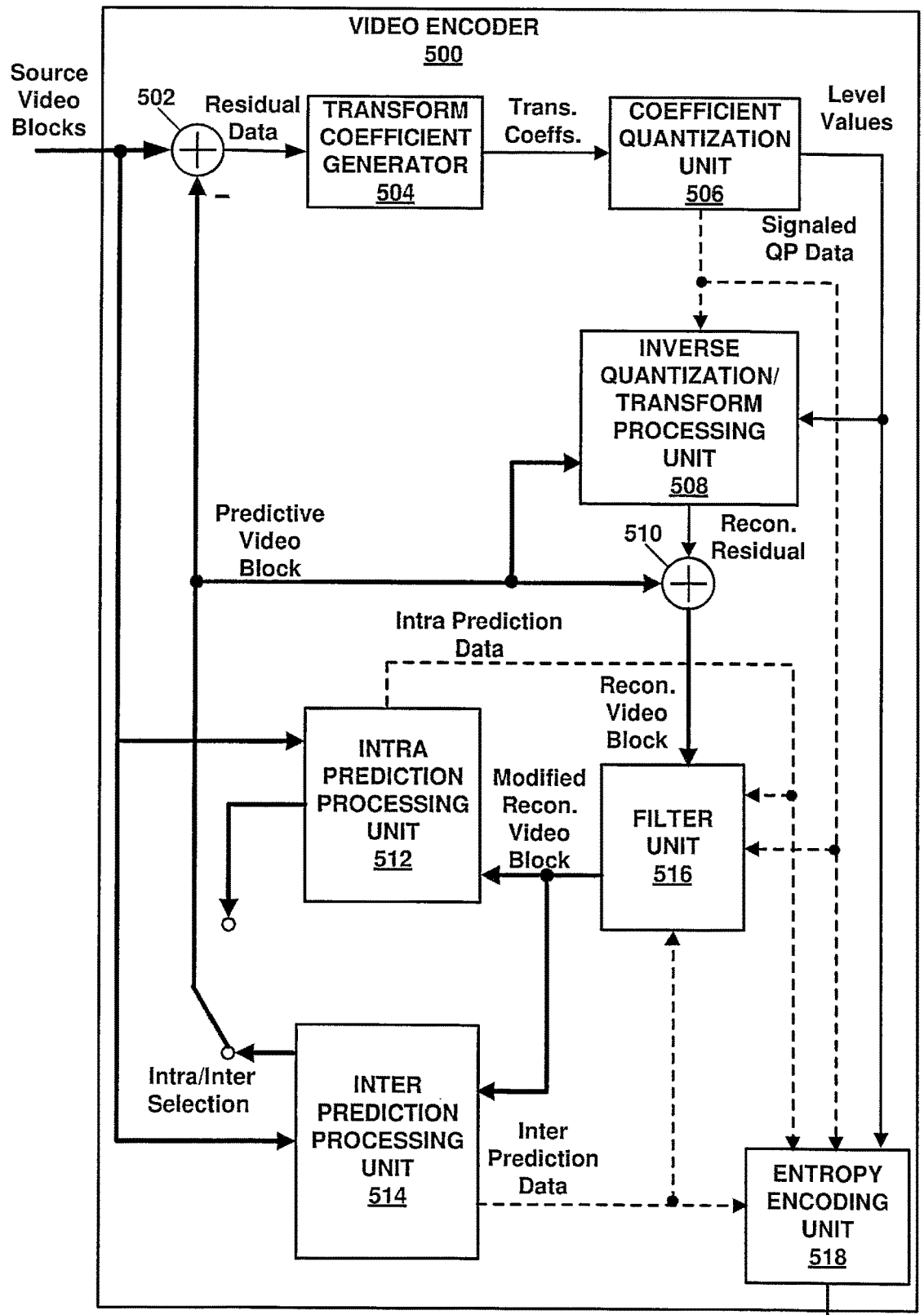
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional subdivisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessarily be located in the same physical device as video encoder 106. For example, functions described as being performed by video encoder 106 and data encapsulator 107 may be distributed among devices illustrated in FIG. 4.

As described above, the signaling of syntax elements pic_dpb_output_du_delay and pic_spt_dpb_output_du_delay in JVET-P2001 is less than ideal. As described above, in one example, according to the techniques herein, if DU level HRD parameters are present, a flag is signaled in Buffering period SEI message (or picture timing SEI message or some other location, for example a parameter set such as sequence parameter set) to control and specify if DU level picture DPB output delay information is signalled only in picture timing SEI message or in DU information SEI message. It is asserted that in JVET-P2001, if it is desired to signal the DU level picture DPB output delay information in the DU information SEI message, a DU level picture DPB output delay value is still needed to be signalled in picture timing SEI message even when it is ignored. On the other hand, when DU level picture DPB output delay information is known at the time of creation of PT SEI message, an additional flag is unnecessarily signalled in every DU Information SET message. Table 11 illustrates an example of a buffering_period( ) syntax structure, Table 12 illustrates an example of a pic_timing( ) syntax structure, and Table 13 illustrates an example of a decoding_unit_info( ) syntax structure, where if DU level HRD parameters are present, a flag is signalled in Buffering period SET message to control if DU level picture DPB output delay information is signaled only in picture timing SET message or in DU information SEI message, according to the techniques herein.

TABLE 11

| | Descriptor |
|---|---|
| buffering_period( payloadSize ) { | |
|   bp_nal_hrd_parameters_present_flag | u(1) |
|   bp_vcl_hrd_parameters_present_flag | u(1) |
|   initial_cpb_removal_delay_length_minus1 | u(5) |
|   cpb_removal_delay_length_minus1 | u(5) |
|   dpb_output_delay_length_minus1 | u(5) |
|   alt_cpb_params_present_flag | u(1) |
|   bp_decoding_unit_hrd_params_present_flag | u(1) |
|   if( bp_decoding_unit_hrd_params_present_flag ) { | |
|     du_cpb_removal_delay_increment_length_minus1 | u(5) |

TABLE 11-continued

| | Descriptor |
|---|---|
|     dpb_output_delay_du_length_minus1 | u(5) |
|     decoding_unit_cpb_params_in_pic_timing_sei_flag | u(1) |
|     decoding_unit_dpb_du_params_in_pic_timing_sei_flag | u(1) |
| } | |
| concatenation_flag | u(1) |
| additional_concatenation_info_present_flag | u(1) |
| if( additional_concatenation_info_present_flag ) | |
|     max_initial_removal_delay_for_concatination | u(v) |
| cpb_removal_delay_delta_minus1 | u(v) |
| cpb_removal_delay_deltas_present_flag | u(1) |
| if( cpb_removal_delay_deltas_present_flag ) { | |
|     num_cpb_removal_delay_deltas_minus1 | ue(v) |
|     for( i = 0; i <= num_cpb_removal_delay_deltas_minus1; i++ ) | |
|         cpb_removal_delay_delta[ i ] | u(v) |
| } | |
| bp_max_sub_layers_minus1 | u(3) |
| sub_layer_initial_cpb_removal_delay_present_flag | u(1) |
| for( i = ( sub_layer_initial_cpb_removal_delay_present_flag ? | |
|         0 : bp_max_sub_layers_minus1 ); i <= bp_max_sub_layers_minus1; i++ ) { | |
|     bp_cpb_cnt_minus1[ i ] | ue(v) |
|     if( bp_nal_hrd_parameters_present_flag ) | |
|         for( j = 0; j < bp_cpb_cnt_minus1[ i ] + 1; j++ ) { | |
|             nal_initial_cpb_removal_delay[ i ][ j ] | u(v) |
|             nal_initial_cpb_removal_offset[ i ][ j ] | u(v) |
|             if( bp_decoding_unit_hrd_params_present_flag ) { | |
|                 nal_initial_alt_cpb_removal_delay[ i ][ j ] | u(v) |
|                 nal_initial_alt_cpb_removal_offset[ i ][ j ] | u(v) |
|             } | |
|         } | |
|     if( bp_vcl_hrd_parameters_present_flag ) | |
|         for( j = 0; j < bp_cpb_cnt_minus1[ i ] + 1; j++ ) { | |
|             vcl_initial_cpb_removal_delay[ i ][ j ] | u(v) |
|             vcl_initial_cpb_removal_offset[ i ][ j ] | u(v) |
|             if( bp_decoding_unit_hrd_params_present_flag ) { | |
|                 vcl_initial_alt_cpb_removal_delay[ i ][ j ] | u(v) |
|                 vcl_initial_alt_cpb_removal_offset[ i ][ j ] | u(v) |
|             } | |
|         } | |
| } | |
| if( alt_cpb_params_present_flag ) | |
|     use_alt_cpb_params_flag | u(1) |
| } | |

TABLE 12

| | Descriptor |
|---|---|
| pic_timing( payloadSize ) { | |
|     cpb_removal_delay_minus1[ bp_max_sub_layers_minus1 ] | u(v) |
|     if( alt_cpb_params_present_flag ) { | |
|         cpb_alt_timing_info_present_flag | u(1) |
|         if( cpb_alt_timing_info_present_flag ) { | |
|             for( i = 0; i < bp_cpb_cnt_minus1[ bp_max_sub_layers_minus1 ] + 1; i++ ) { | |
|                 cpb_alt_initial_cpb_removal_delay_delta[ i ] | u(v) |
|                 cpb_alt_initial_cpb_removal_offset_delta[ i ] | u(v) |
|             } | |
|             cpb_delay_offset | u(v) |
|             dpb_delay_offset | u(v) |
|         } | |
|     } | |
|     for( i = TemporalId; i <bp_max_sub_layers_minus1; i++ ) { | |
|         pt_sub_layer_delays_present_flag[ i ] | u(1) |
|         if( pt_sub_layer_delays_present_flag[ i ] ) { | |
|             if( cpb_removal_delay_deltas_present_flag ) | |
|                 cpb_removal_delay_delta_enabled_flag[ i ] | u(1) |
|             if( cpb_removal_delay_delta_enabled_flag[ i ] ) | |
|                 cpb_removal_delay_delta_idx[ i ] | u(v) |
|             else | |
|                 cpb_removal_delay_minus1[ i ] | u(v) |
|         } | |
|     } | |
|     pic_dpb_output_delay | u(v) |
|     if( bp_decoding_unit_hrd_params_present_flag && | |
|         decoding_unit_dpb_du_params_in_pic_timing_sei_flag ) | |

TABLE 12-continued

| | Descriptor |
|---|---|
|   pic_dpb_output_du_delay | u(v) |
| if( bp_decoding_unit_hrd_params_present_flag && | |
|     decoding_unit_cpb_params_in_pic_timing_sei_flag ) { | |
|   num_decoding_units_minus1 | ue(v) |
|   du_common_cpb_removal_delay_flag | u(1) |
|   if( du_common_cpb_removal_delay_flag ) | |
|     for( i = TemporalId; i <= bp_max_sub_layers_minus1; i++ ) | |
|       if( pt_sub_layer_delays_present_flag[ i ] ) | |
|         du_common_cpb_removal_delay_increment_minus1[ i ] | u(v) |
|   for( i = 0; i <= num_decoding_units_minus1; i++ ) { | |
|     num_nalus_in_du_minus1[ i ] | ue(v) |
|     if( !du_common_cpb_removal_delay_flag && i < num_decoding_units_minus1 ) | |
|       for( j = TemporalId; j <= bp_max_sub_layers_minus1; j++ ) | |
|         if( pt_sub_layer_delays_present_flag[ j ] ) | |
|           du_cpb_removal_delay_increment_minus1[ i ][ j ] | u(v) |
|   } | |
| } | |
| if( additional_concatenation_info_present_flag ) | |
|   delay_for_concatenation_ensured_flag | u(1) |
| } | |

TABLE 13

| | Descriptor |
|---|---|
| decoding_unit_info( payloadSize ) { | |
|   decoding_unit_idx | ue(v) |
|   if( !decoding_unit_cpb_params_in_pic_timing_sei_flag ) | |
|     for( i = TemporalId; i <= bp_max_sub_layers_minus1; i++ ) { | |
|       dui_sub_layer_delays_present_flag[ i ] | u(1) |
|       if( dui_sub_layer_delays_present_flag[ i ] ) | |
|         du_spt_cpb_removal_delay_increment[ i ] | u(v) |
|     } | |
|   if(!decoding_unit_dpb_du_params_in_pic_timing_sei_flag ) | |
|     dpb_output_du_delay_present_flag | u(1) |
|   if( dpb_output_du_delay_present_flag ) | |
|     pic_spt_dpb_output_du_delay | u(v) |
| } | |

With respect to Tables 11-13, the semantics may be based on the semantics provided above, with the following the semantics for syntax elements decoding_unit_dpb_du_params_in_pic_timing_sei_flag and pic_dpb_output_delay in one example, based on the following:

decoding_unit_dpb_du_params_in_pic_timing_sei_flag equal to 1 specifies that DU level picture dpb output delay information (i.e. syntax element pic_dpb_output_du_delay) is present only in picture timing SEI message when bp_decoding_unit_hrd_params_present_flag is equal to 1. decoding_unit_dpb_du_params_in_pic_timing_sei_flag equal to 0 specifies that DU level picture dpb output delay information (i.e. syntax element pic_spt_dpb_output_du_delay) is (or may be) present in DU information SEI message when bp_decoding_unit_hrd_params_present_flag is equal to 1. When the decoding_unit_dpb_du-params_in_pic_timing_sei_flag syntax element is not present, it is inferred to be equal to 0.

It should be noted that decoding_unit_dpb_du_params_in_pic_timing_sei_flag may instead be named decoding_unit_dpb_params_in_pic_timing_sei_flag or some other name may be used for it.

pic_dpb_output_delay is used to compute the DPB output time of the picture. It specifies how many clock ticks to wait after removal of an AU from the CPB before the decoded picture is output from the DPB.

NOTE—A picture is not removed from the DPB at its output time when it is still marked as "used for short-term reference" or "used for long-term reference".

The length of dpb_output_delay is dpb_output_delay_length_minus1+1 bits.

When max_dec_pic_buffering_minus1[Htid] is equal to 0, the value of pic_dpb_output_delay shall be equal to 0.

The output time derived from the dpb_output_delay of any picture that is output from an output timing conforming decoder shall precede the output time derived from the dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from dpb_output_delay shall be increasing with increasing value of PicOrderCntVal relative to all pictures within the same CVS.

Further, the may following apply for the DU information SEI message syntax and semantics:
  The syntax elements bp_decoding_unit_hrd_params_present_flag, decoding_unit_cpb_params_in_pic_timing_sei_flag and dpb_output_delay_du_length_minus1 are found in the BP SEI message that is applicable to at least one of the operation points to which the DU information SET message applies.
  The bitstream (or a part thereof) refers to the bitstream subset (or a part thereof) associated with any of the operation points to which the DU information SEI message applies.
The presence of DU information SEI messages for an operation point is specified as follows:
  If CpbDpbDelaysPresentFlag is equal to 1, bp_decoding_unit_hrd_params_present_flag is equal to 1 and decoding_unit_cpb_params_in_pic_timing_sei_flag is equal to 0 and/or decoding_unit_dpb_du_params_in_pic_timing_sei_flag is equal to 0, one or more DU information SEI messages applicable to the operation point shall be associated with each DU in the CVS.
  Otherwise, in the CVS there shall be no DU that is associated with a DU information SEI message applicable to the operation point.
In one example:
When DU information SEI message is present at least one of decoding_unit_cpb_params_in_pic_timing_sei_flag or decoding_unit_dpb_du_params_in_pic_timing_sei_flag shall be equal to 0.
In a variant:
The presence of DU information SEI messages for an operation point is specified as follows:
  If CpbDpbDelaysPresentFlag is equal to 1, bp_decoding_unit_hrd_params_present_flag is equal to 1 and decoding_unit_cpb_params_in_pic_timing_sei_flag is equal to 0 and/or decoding unit_dpb_du_params_in_pic_timing_sei_flag is equal to 0, one or more DU information SEI messages applicable to the operation point shall be associated with each DU in the CVS.
  Otherwise, if CpbDpbDelaysPresentFlag is equal to 1, bp_decoding_unit_hrd_params_present_flag is equal to 1 and decoding_unit_cpb_params_in_pic_timing_sei_flag is equal to 1 and decoding_unit_dpb_du_params_in_pic_timing_sei_flag is equal to 1, one or more DU information SEI messages applicable to the operation point may or may not be associated with each DU in the CVS.
  Otherwise (CpbDpbDelaysPresentFlag is equal to 0 or bp_decoding_unit_hrd_params_present_flag is equal to 0), in the CVS there shall be no DU that is associated with a DU information SEI message applicable to the operation point.
dpb_output_du_delay_present_flag equal to 1 specifies the presence of the pic_spt_dpb_output_du_delay syntax element in the DU information SEI message. dpb_output_du_delay_present_flag equal to 0 specifies the absence of the pic_spt_dpb_output_du_delay syntax element in the DU information SEI message.
In one example: When not present dpb_output_du_delay_present_flag is inferred to be equal to 0.
pic_spt_dpb_output_du_delay is used to compute the DPB output time of the picture when DecodingUnitHrdFlag is equal to 1 and decoding_unit_dpb_du_params_in_pic_timing_sei_flag equal to 0. It specifies how many sub clock ticks to wait after removal of the last DU in an AU from the CPB before the decoded picture is output from the DPB.
In one example:
When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.
It is a requirement of bitstream conformance that all DU information SEI messages that are associated with the same AU, apply to the same operation point, and have (in one variant do not remove this strikeout) decoding_unit_dpb_du_params_in_pic_timing_sei_flag equal to 0 shall have the same value of pic_spt_dpb_output_du_delay.
The output time derived from the pic_spt_dpb_output_du_delay of any picture that is output from an output timing conforming decoder shall precede the output time derived from the pic_spt_dpb_output_du_delay of all pictures in any subsequent CVS in decoding order.
The picture output order established by the values of this syntax element shall be the same order as established by the values of PicOrderCntVal.
For pictures that are not output by the "bumping" process because they precede, in decoding order, a CLVSS picture that has no_output_of_prior_pics_flag equal to 1 or inferred to be equal to 1, the output times derived from pic_spt_dpb_output_du_delay shall be increasing with increasing value of PicOrderCntVal relative to all pictures within the same CVS.
For any two pictures in the CVS, the difference between the output times of the two pictures when DecodingUnitHrdFlag is equal to 1 shall be identical to the same difference when DecodingUnitHrdFlag is equal to 0.
Further, according to the techniques herein, the following for picture output process may be used for a decoding picture buffer:
The processes specified in this clause happen instantaneously at the CPB removal time of AU n, CpbRemovalTime[n].
When picture n has PictureOutputFlag equal to 1, its DPB output time DpbOutputTime[n] is derived as follows, where the variable firstPicInBufferingPeriodFlag is equal to 1 if AU n is the first AU of a BP and 0 otherwise:

```
if( !DecodingUnitHrdFlag ) {
  DpbOutputTime[ n ] = CpbRemovalTime[ n ] + ClockTick *
    ( picDpbOutputDelay –
      picDpbOutputDelta )
  if( firstPicInBufferingPeriodFlag )
    DpbOutputTime[ n ] –= ClockTick * DpbDelayOffset
} else
  DpbOutputTime[ n ] = AuCpbRemovalTime[ n ] + ClockSubTick *
    picSptDpbOutputDuDelay
``` where picDpbOutputDelay is the value of pic_dpb_output_delay and picDpbOutputDelta is the value of picDpbOutputDelta[Htid] derived according to cpb_removal_delay_minus1[Htid], and cpb_removal_delay_delta_idx[Htid] in the PT SEI message associated with AU n, and cpb_removal_delay_delta[cpb_removal_delay_delta_idx[Htid] ] in the BP SEI message associated with AU n, and picSptDpbOutputDuDelay is the value of pic_spt_dpb_output_du_delay, when decoding_unit_dpb_du_params_in_pic_timing_sei_flag is equal to 0, in the DU information SEI messages associated with AU n, or the value of pic_dpb_output_du_delay in the PT SEI message associated with AU n when decoding_unit_dpb_du_params_in_pic_timing_sei_flag is equal to 1.

NOTE—When the syntax element pic_spt_dpb_output_du_delay is not present in any DU information SEI message associated with AU n, the value is inferred to be equal to pic_dpb_output_du_delay in the PT SEI message associated with AU n.

The output of the current picture is specified as follows:
If PictureOutputFlag is equal to 1 and DpbOutputTime[n] is equal to CpbRemovalTime[n], the current picture is output.

Otherwise, if PictureOutputFlag is equal to 0, the current picture is not output, but will be stored in the DPB as specified above.

Otherwise (PictureOutputFlag is equal to 1 and DpbOutputTime[n] is greater than CpbRemovalTime[n]), the current picture is output later and will be stored in the DPB (as specified above) and is output at time DpbOutputTime[n] unless indicated not to be output by NoOutputOfPriorPicsFlag equal to 1.

When output, the picture is cropped, using the conformance cropping window for the picture.

When picture n is a picture that is output and is not the last picture of the bitstream that is output, the value of the variable DpbOutputInterval[n] is derived as follows:

$DpbOutputInterval[n] = DpbOutputTime[nextPicInOutputOrder] - DpbOutputTime[n]$ where nextPicInOutputOrder is the picture that follows picture n in output order and has PictureOutputFlag equal to 1.

With respect to Tables 11-13 it should be noted that in some examples, syntax element decoding_unit_cpbduparams_in_pic_timing_sei_flag may be referred to as du_cpb_params_in_pic_timing_sei_flag and have semantics based on the following semantics provided above with respect to Table 8. Further, syntax element decoding_unit_dpb_du_params_in_pic_timing_sei_flag may be referred to as du_dpb_params_in_pic_timing_sei_flag and have semantics based on the following:

du_dpb_params_in_pic_timing_sei_flag equal to 1 specifies that DU level DPB output delay parameters are present in PT SEI messages and not in DU information SEI messages. du_dpb_params_in_pic_timing_sei_flag equal to 0 specifies that DU level DPB output delay parameters are present in DU information SEI messages and not in PT SEI messages. When the du_dpb_params_in_pic_timing_sei_flag syntax element is not present, it is inferred to be equal to 0.

It should be noted that with respect to the example illustrated in Table 13, in some cases, it may be unnecessary to signal the syntax element dui_sublayer_delays_present_flag[bp_max_sublayers_minus1] and its value may instead be inferred. This is because the syntax element du_spt_cpb_removal_delay_increment[bp_max_sublayers_minus1] is used for the inference of du_spt_cpb_removal_delay_increment[i], for i in the range of 0 to bp_max_sublayers_minus1−1, when the respective dui_sublayer_delays_present_flag[i] is equal to 0. Thus, in one example, according to the techniques herein, an example of a decoding_unit_info( ) syntax structure may be as provided in Table 13A, where dui_sublayer_delays_present_flag[i] is conditionally present, and inferred when not present, based on bp_max_sublayers_minus1.

TABLE 13A

| | Descriptor |
|---|---|
| decoding_unit_info( payloadSize ) { | |
|   decoding_unit_idx | ue(v) |
|   if( !du_cpb_params_in_pic_timing_sei_flag ) | |
|     for( i = TemporalId; i <= bp_max_sublayers_minus1; i++ ) { | |
|       if( i < bp_max_sublayers_minus1 ) | |
|         dui_sublayer_delays_present_flag[ i ] | u(1) |
|       if( dui_sublayer_delays_present_flag[ i ] ) | |
|         du_spt_cpb_removal_delay_increment[ i ] | u(v) |
|     } | |
|   if( !du_dpb_params_in_pic_timing_sei_flag ) | |
|     dpb_output_du_delay_present_flag | u(1) |
|   if( dpb_output_du_delay_present_flag ) | |
|     pic_spt_dpb_output_du_delay | u(v) |
| } | |

With respect to Table 13A, the semantics may be based on the semantics provided above, with the semantics for syntax elements dui_sublayer_delays_present_flag[i] and du_spt_cpb_removal_delay_increment[i], in one example, based on the following:

dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When du_cpb_params_in_pic_timing_sei_flag is equal to 0, the value of dui_sublayer_delays_present_flag[bp_max_sublayers_minus1] is inferred to be equal to 1. Otherwise, when not present, the value of dui_sublayer_delays_present_flag[i] is inferred to be equal to 0.

du_spt_cpb_removal_delay_increment[i] specifies the duration, in units of clock sub-ticks, between the nominal CPB times of the last DU in decoding order in the current AU and the DU associated with the DU information SEI message when Htid is equal to i. This value is also used to calculate an earliest possible time of arrival of DU data into the CPB for the HSS, as specified. The length of this syntax element is du_cpb_removal_delay_increment_length_minus1+1. When the DU associated with the DU information SEI message is the last DU in the current AU, the value of du_spt_cpb_removal_delay_increment[i] shall be equal to 0. When du_spt_cpb_removal_delay_increment[i] is not present for any value of i less than bp_max_sublayers_minus1, its value is inferred to be equal to du_spt_cpb_removal_delay_increment[bp_max_sublayers_minus1].

In another example, the flag dui_sublayer_delays_present_flag[bp_max_sublayers_minus1] may be signaled and the following conformance constraint may be required: The value of dui_sublayer_delays_present_flag[bp_max_sublayers_minus1] shall be equal to 1.

In another example the constraint may be specified as:
When du_cpb_params_in_pic_timing_sei_flag is equal to 0, the value of dui_sublayer_delays_present_flag[bp_max_sublayers_minus1] shall be equal to 1.

Or as:

When present the value of dui_sublayer_delays_present_flag[bp_max_sublayers_minus1] shall be equal to 1. This requires that the syntax element dui_sublayer_delays_present_flag[bp_max_sublayers_minus1] must be signalled when du_cpb_params_in_pic_timing_sei_flag is equal to 0. Thus dui_sublayer_delays_present_flag[bp_max_sublayers_minus1] must be signalled when decoding unit CPB parameters are signalled in decoding unit information SEI message.

In a variant, the condition

```
if( i < bp_max_sublayers_minus1)
    dui_sublayer_delays_present_flag[ i ]      u(1)
``` may instead be written as

```
if( i != bp_max_sublayers_minus1)
    dui_sublayer_delays_present_flag[ i ]      u(1)
```

In another variant, the condition may be written as provided in Table 13B.

TABLE 13B

| | Descriptor |
|---|---|
| decoding_unit_info( payloadSize ) { | |
|   decoding_unit_idx | ue(v) |
|   if( !du_cpb_params_in_pic_timing_sei_flag ) { | |
|     for( i = TemporalId; i < bp_max_sublayers_minus1; i++ ) { | |
|       dui_sublayer_delays_present_flag[ i ] | u(1) |
|       if( dui_sublayer_delays_present_flag[ i ] ) | |
|         du_spt_cpb_removal_delay_increment[ i ] | u(v) |
|     } | |
|     du_spt_cpb_removal_delay_increment[ bp_max_sublayers_minus1 ] | u(v) |
|   } | |
|   if( !du_dpb_params_in_pic_timing_sei_flag ) | |
|     dpb_output_du_delay_present_flag | u(1) |
|   if( dpb_output_du_delay_present_flag ) | |
|     pic_spt_dpb_output_du_delay | u(v) |
| } | |

With respect to Table 13B, the semantics may be based on the semantics provided above, with the semantics for syntax element dui_sublayer_delays_present_flag[i], in one example, based on the following:

dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When du_cpb_params_in_pic_timing_sei_flag is equal to 0, the value of dui_sublayer_delays_present_flag[bp_max_sublayers_minus1] is inferred to be equal to 1. Otherwise when not present, the value of dui_sublayer_delays_present_flag[i] is inferred to be equal to 0.

In another example the semantics in this case may be as follows: dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When not present, the value of dui_sublayer_delays_present_flag[i] is inferred to be equal to 0.

It should be noted that since the inference for du_spt_cpb_removal_delay_increment[i] when i is less than bp_max_sublayers_minus1 uses the value of du_spt_cpb_removal_delay_increment[bp_max_sublayers_minus1], in one example, the for loop for syntax elements dui_sublayer_delays_present_flag[i] and du_spt_cpb_removal_delay_increment[i] may be signaled in the reverse order. This will allows the value of du_spt_cpb_removal_delay_increment[bp_max_sublayers_minus1] to be determined before the other values du_spt_cpb_removal_delay_increment[i] (which may or may not be present) for i less than bp_max_sublayers_minus1, which need to use this value for their inference (if one or more of them are not present based on the value of the dui_sublayer_delays_present_flag[i]). Thus, in one example, according to the techniques herein, an example of a decoding_unit_info( ) syntax structure may be as provided in Table 13C.

TABLE 13C

| | Descriptor |
|---|---|
| decoding_unit_info( payloadSize ) { | |
|   decoding_unit_idx | ue(v) |
|   if( !du_cpb_params_in_pic_timing_sei_flag ) | |
|     for( i = bp_max_sublayers_minus1; i >= TemporalId ; i-- ) { | |
|       dui_sublayer_delays_present_flag[ i ] | u(1) |
|       if( dui_sublayer_delays_present_flag[ i ] ) | |
|         du_spt_cpb_removal_delay_increment[ i ] | u(v) |
|     } | |
|   if( !du_dpb_params_in_pic_timing_sei_flag ) | |
|     dpb_output_du_delay_present_flag | u(1) |
|   if( dpb_output_du_delay_present_flag ) | |
|     pic_spt_dpb_output_du_delay | u(v) |
| } | |

With respect to Table 13C, the semantics may be based on the semantics provided above, with the semantics for syntax element dui_sublayer_delays_present_flag[i], in one example, based on the following:

dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When du_cpb_params_in_pic_timing_sei_flag is equal to 0, the value of dui_sublayer_delays_present_flag[bp_max_sublayers_minus1] shall be equal to 1. When not present, the value of dui_sublayer_delays_present_flag[i] is inferred to be equal to 0.

In one example, according to the techniques herein, an example of a decoding_unit_info( ) syntax structure may be as provided in Table 13D.

TABLE 13D

| | Descriptor |
|---|---|
| decoding_unit_info( payloadSize ) { | |
|   decoding_unit_idx | ue(v) |
|   if( !du_cpb_params_in_pic_timing_sei_flag ) | |
|     for( i = bp_max_sublayers_minus1; i >= TemporalId ; i-- ) { | |
|       if( i != bp_max_sublayers_minus1 ) | |

TABLE 13D-continued

| | Descriptor |
|---|---|
|         dui_sublayer_delays_present_flag[ i ] | u(1) |
|         if( dui_sublayer_delays_present_flag[ i ] ) | |
|            du_spt_cpb_removal_delay_increment[ i ] | u(v) |
|     } | |
|   if( !du_dpb_params_in_pic_timing_sei_flag ) | |
|     dpb_output_du_delay_present_flag | u(1) |
|   if( dpb_output_du_delay_present_flag ) | |
|     pic_spt_dpb_output_du_delay | u(v) |
| } | |

With respect to Table 13D, the semantics may be based on the semantics provided above. Or in another example the semantics for dui_sublayer_delays_present_flag[i] in this case may be as follows:

dui_sublayer_delays_present_flag[i] equal to 1 specifies that du_spt_cpb_removal_delay_increment[i] is present for the sublayer with TemporalId equal to i. dui_sublayer_delays_present_flag[i] equal to 0 specifies that du_spt_cpb_removal_delay_increment[i] is not present for the sublayer with TemporalId equal to i. When du_cpb_params_in_pic_timing_sei_flag is equal to 0, the value of dui_sublayer_delays_present_flag[bp_max_sublayers_minus1] is inferred to be equal to 1. Otherwise when not present, the value of dui_sublayer_delays_present_flag[i] is inferred to be equal to 0.

In one example, according to the techniques herein, an example of a decoding_unit_info( ) syntax structure may be as provided in Table 13E.

TABLE 13E

| | Descriptor |
|---|---|
| decoding_unit_info( payloadSize ) { | |
|   decoding_unit_idx | ue(v) |
|   if( !du_cpb_params_in_pic_timing_sei_flag ) { | |
|     du_spt_cpb_removal_delay_increment[ bp_max_sublayers_minus1 ] | u(v) |
|     for( i = TemporalId; i < bp_max_sublayers_minus1; i++ ) { | |
|       dui_sublayer_delays_present_flag[ i ] | u(1) |
|       if( dui_sublayer_delays_present_flag[ i ] ) | |
|         du_spt_cpb_removal_delay_increment[ i ] | u(v) |
|     } | |
|   } | |
|   if( !du_dpb_params_in_pic_timing_sei_flag ) | |

TABLE 13E-continued

| | Descriptor |
|---|---|
|     dpb_output_du_delay_present_flag | u(1) |
|   if( dpb_output_du_delay_present_flag ) | |
|     pic_spt_dpb_output_du_delay | u(v) |
| } | |

With respect to Table 13E, the semantics may be based on the semantics provided above.

In one example, the condition "When du_cpb_params_in_pic_timing_sei_flag is equal to 0" may be removed from one or more of the inferences above.

It should be noted that in one example, according to the techniques herein,

When DecodingUnitHrdFlag is equal to 1, the following applies:
  The variable duCpbRemovalDelayInc is derived as follows:
    If du_cpb_params_in_pic_timing_sei_flag is equal to 0, duCpbRemovalDelayInc is set equal to the value of du_spt_cpb_removal_delay_increment[Htid] in the DU information SEI message, selected as specified, associated with DU m.
    Otherwise, if du_common_cpb_removal_delay_flag is equal to 0, duCpbRemovalDelayInc is set equal to the value of du_cpb_removal_delay_increment_minus1[i][Htid]+1 for DU m in the PT SET message, selected as specified, associated with AU n, where the value of i is 0 for the first num_nalus_in_du_minus1[0]+1 consecutive NAL units in the AU that contains DU m, 1 for the subsequent num_nalus_in_du_minus1[1]+1 NAL units in the same AU, 2 for the subsequent num_nalus_in_du_minus1[2]+1 NAL units in the same AU, etc.
    Otherwise, duCpbRemovalDelayInc is set equal to the value of du_common_cpb_removal_delay_increment_minus1[Htid]+1 in the PT SEI message, selected as specified, associated with AU n.

Table 14 illustrates an example of a pic_timing( ) syntax structure where if DU level HRD parameters are present, a flag is signalled in a picture timing SEI message to control if DU level picture DPB output delay information is signaled only in picture timing SEI message or in DU information SEI message according to the techniques herein.

TABLE 14

| | Descriptor |
|---|---|
| pic_timing( payloadSize ) { | |
|   cpb_removal_delay_minus1[ bp_max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       for( i = 0; i < bp_cpb_cnt_minus1[ bp_max_sub_layers_minus1 ] + 1; i++ ) { | |
|         cpb_alt_initial_cpb_removal_delta[ i ] | u(v) |
|         cpb_alt_initial_cpb_removal_offset_delta[ i ] | u(v) |
|       } | |
|       cpb_delay_offset | u(v) |
|       dpb_delay_offset | u(v) |
|     } | |
|   } | |
|   for( i = TemporalId; i <bp_max_sub_layers_minus1; i++ ) { | |
|     pt_sub_layer_delays_present_flag[ i ] | u(1) |
|     if( pt_sub_layer_delays_present_flag[ i ] ) { | |
|       if( cpb_removal_delay_deltas_present_flag ) | |
|         cpb_removal_delay_delta_enabled_flag[ i ] | u(1) |
|       if( cpb_removal_delay_delta_enabled_flag[ i ] ) | |

TABLE 14-continued

|  | Descriptor |
|---|---|
|         cpb_removal_delay_delta_idx[ i ] | u(v) |
|       else |  |
|         cpb_removal_delay_minus1[ i ] | u(v) |
|     } |  |
| } |  |
| pic_dpb_output_delay | u(v) |
| if( bp_decoding_unit_hrd_params_present_flag) { |  |
|   decoding_unit_dpb_du_params_in_pic_timing_sei_flag | u(1) |
|   if(decoding_unit_dpb_du_params_in_pic_timing_sei_flag ) |  |
|     pic_dpb_output_du_delay | u(v) |
| } |  |
| if( bp_decoding_unit_hrd_params_present_flag && |  |
|     decoding_unit_cpb_params_in_pic_timing_sei_flag ) { |  |
|   num_decoding_units_minus1 | ue(v) |
|   du_common_cpb_removal_delay_flag | u(1) |
|   if( du_common_cpb_removal_delay_flag ) |  |
|     for( i = TemporalId; i <= bp_max_sub_layers_minus1; i++ ) |  |
|       if( pt_sub_layer_delays_present_flag[ i ] ) |  |
|         du_common_cpb_removal_delay_increment_minus1[ i ] | u(v) |
|   for( i = 0; i <= num_decoding_units_minus1; i++ ) { |  |
|     num_nalus_in_du_minus1[ i ] | ue(v) |
|     if( !du_common_cpb_removal_delay_flag && i < num_decoding_units_minus1 ) |  |
|       for( j = TemporalId; j <= bp_max_sub_layers_minus1; j++ ) |  |
|         if( pt_sub_layer_delays_present_flag[ j ] ) |  |
|           du_cpb_removal_delay_increment_minus1[ i ][ j ] | u(v) |
|   } |  |
| } |  |
| if( additional_concatenation_info_present_flag ) |  |
|   delay_for_concatenation_ensured_flag | u(1) |
| } |  |

With respect to Table 14, the semantics may be based on the semantics provided above.

In addition to the signaling provided above, in one example, an additional flag is signaled in picture timing SEI message (or in buffering period SEI message) to indicate that when DU level picture DPB output delay information is signaled in picture timing SEI message it may be updated in DU information SEI message. Table 15 illustrates an example of a pic_timing( ) syntax structure and Table 16 illustrates an example of a decoding_unit_info( ) syntax structure, where an additional flag is signaled in picture timing SEI message to indicate that when DU level picture DPB output delay information is signaled in picture timing SEI message it may be updated in DU information SEI message, according to the techniques herein.

TABLE 15

|  | Descriptor |
|---|---|
| pic_timing( payloadSize ) { |  |
|   cpb_removal_delay_minus1[ bp_max_sub_layers_minus1 ] | u(v) |
|   if( alt_cpb_params_present_flag ) { |  |
|     cpb_alt_timing_info_present_flag | u(1) |
|     if( cpb_alt_timing_info_present_flag ) { |  |
|       for( i = 0; i < bp_cpb_cnt_minus1[ bp_max_sub_layers_minus1 ] + 1; i++ ) { |  |
|         cpb_alt_initial_cpb_removal_delta[ i ] | u(v) |
|         cpb_alt_initial_cpb_removal_offset_delta[ i ] | u(v) |
|       } |  |
|       cpb_delay_offset | u(v) |
|       dpb_delay_offset | u(v) |
|     } |  |
|   } |  |
|   for( i = TemporalId; i <bp_max_sub_layers_minus1; i++ ) { |  |
|     pt_sub_layer_delays_present_flag[ i ] | u(1) |
|     if( pt_sub_layer_delays_present_flag[ i ] ) { |  |
|       if( cpb_removal_delay_deltas_present_flag ) |  |
|         cpb_removal_delay_delta_enabled_flag[ i ] | u(1) |
|       if( cpb_removal_delay_delta_enabled_flag[ i ]) |  |
|         cpb_removal_delay_delta_idx[ i ] | u(v) |
|       else |  |
|         cpb_removal_delay_minus1[ i ] | u(v) |
|     } |  |
|   } |  |
|   pic_dpb_output_delay | u(v) |
|   if( bp_decoding_unit_hrd_params_present_flag && |  |
|     decoding_unit_dpb_du_params_in_pic_timing_sei_flag ) { |  |

TABLE 15-continued

| | Descriptor |
|---|---|
|     pic_dpb_output_du_delay | u(v) |
|     decoding_unit_dpb_du_params_in_update_du_sei_flag | u(1) |
|   } | |
|   if( bp_decoding_unit_hrd_params_present_flag && | |
|       decoding_unit_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|       for( i = TemporalId; i <= bp_max_sub_layers_minus1; i++ ) | |
|         if( pt_sub_layer_delays_present_flag[ i ] ) | |
|           du_common_cpb_removal_delay_increment_minus1[ i ] | u(v) |
|     for( i = 0; i <= num_decoding_units_minus1; i++ ) { | |
|       num_nalus_in_du_minus1[ i ] | ue(v) |
|       if( !du_common_cpb_removal_delay_flag && i < num_decoding_units_minus1 ) | |
|         for( j = TemporalId; j <= bp_max_sub_layers_minus1; j++ ) | |
|           if( pt_sub_layer_delays_present_flag[ j ] ) | |
|             du_cpb_removal_delay_increment_minus1[ i ][ j ] | u(v) |
|     } | |
|   } | |
|   if( additional_concatenation_info_present_flag ) | |
|     delay_for_concatenation_ensured_flag | u(1) |
| } | |

TABLE 16

| | Descriptor |
|---|---|
| decoding_unit_info( payloadSize ) { | |
|   decoding_unit_idx | ue(v) |
|   if( !decoding_unit_cpb_params_in_pic_timing_sei_flag ) | |
|     for( i = TemporalId; i <= bp_max_sub_layers_minus1; i++ ) { | |
|       dui_sub_layer_delays_present_flag[ i ] | u(1) |
|       if( dui_sub_layer_delays_present_flag[ i ] ) | |
|         du_spt_cpb_removal_delay_increment[ i ] | u(v) |
|     } | |
|   if(!decoding_unit_dpb_du_params_in_pic_timing_sei_flag || decoding_unit_dpb_du_params_in_update_du_sei_flag) | |
|     dpb_output_du_delay_present_flag | u(1) |
|   if( dpb_output_du_delay_present_flag) | |
|     pic_spt_dpb_output_du_delay | u(v) |
| } | |

With respect to Tables 15 and 16, the semantics may be based on the semantics provided above, with the semantics of syntax element decoding_unit_dpb_du_params_in_update_du_sei_flag, in one example based on the following:

decoding_unit_dpb_du_params_in_update_du_sei_flag equal to 1 specifies that DU level picture DPB output information (dpb_output_du_delay_present_flag and if present pic_spt_dpb_output_du_delay) may be signalled in DU information SEI message). decoding_unit_dpb_du_params_in_update_du_sei_flag equal to 0 specifies that DU level picture DPB output information (dpb_output_du_delay_present_flag and if present pic_spt_dpb_output_du_delay) is not signalled in DU information SEI message and is (or may be) only present in picture timing SET message.

When bp_decoding_unit_hrd_params_present_flag is equal to 1 and when decoding_unit_dpb_du_params_in_update_du_sei_flag is not present:
  If decoding_unit_dpb_du_params_in_pic_timing_sei_flag is equal to 0 decoding_unit_dpb_du_params_in_update_du_sei_flag is inferred to be equal to 1.

When bp_decoding_unit_hrd_params_present_flag is equal to 0 and when decoding_unit_dpb_du_params_in_update_du_sei_flag is not present: decoding_unit_dpb_du_params_in_update_du_sei_flag is inferred to be equal to 1. (or 0)

In another example: when not present decoding_unit_dpb_du_params_in_update_du_sei_flag is inferred to be equal to 0.

Further, the following may apply for the DU information SET message syntax and semantics:

The syntax elements bp_decoding_unit_hrd_params_present_flag, decoding_unit_cpb_params_in_pic_timing_sei_flag and dpb_output_delay_du_length_minus1 are found in the BP SEI message that is applicable to at least one of the operation points to which the DU information SEI message applies.

The bitstream (or a part thereof) refers to the bitstream subset (or a part thereof) associated with any of the operation points to which the DU information SEI message applies.

The presence of DU information SET messages for an operation point is specified as follows:
  If CpbDpbDelaysPresentFlag is equal to 1, bp_decoding_unit_hrd_params_present_flag is equal to 1 and decoding_unit_cpb_params_in_pic_timing_sei_flag is equal to 0 and/or decoding_unit_dpb_du_params_in_pic_timing_sei_flag is equal to 0 or decoding_unit_dpb_du_params_in_pic_timing_sei_flag is equal to 1 and decoding_unit_dpb_du_params_in_update_du_sei_flag is equal to 1, one or more DU information SET messages applicable to the operation point shall be associated with each DU in the CVS.

Otherwise, in the CVS there shall be no DU that is associated with a DU information SET message applicable to the operation point.

In one example:

When DU information SET message is present at least one of decoding_unit_cpb_params_in_pic_timing_sei_flag or decoding_unit_dpb_du_params_in_pic_timing_sei_flag shall be equal to 0 or decoding_unit_dpb_du_params_in_update_du_sei_flag shall be equal to 1.

In a variant example:

The presence of DU information SET messages for an operation point is specified as follows:

If CpbDpbDelaysPresentFlag is equal to 1, bp_decoding_unit_hrd_params_present_flag is equal to 1 and decoding_unit_cpb_params_in_pic_timing_sei_flag is equal to 0 and/or decoding_unit_dpb_du_params_in_pic_timing_sei_flag is equal to 0 or decoding_unit_dpb_du_params_in_pic_timing_sei_flag is equal to 1 and decoding_unit_dpb_du_params_in_update_du_sei_flag is equal to 1, one or more DU information SET messages applicable to the operation point shall be associated with each DU in the CVS.

Otherwise, if CpbDpbDelaysPresentFlag is equal to 1, bp_decoding_unit_hrd_params_present_flag is equal to 1 and decoding_unit_cpb_params_in_pic_timing_sei_flag is equal to 1 and decoding_unit_dpb_du_params_in_pic_timing_sei_flag is equal to 1, one or more DU information SEI messages applicable to the operation point may or may not be associated with each DU in the CVS.

Otherwise (CpbDpbDelaysPresentFlag is equal to 0 or bp_decoding_unit_hrd_params_present_flag is equal to 0), in the CVS there shall be no DU that is associated with a DU information SET message applicable to the operation point.

dpb_output_du_delay_present_flag equal to 1 specifies the presence of the pic_spt_dpb_output_du_delay syntax element in the DU information SEI message. dpb_output_du_delay_present_flag equal to 0 specifies the absence of the pic_spt_dpb_output_du_delay syntax element in the DU information SET message.

In one example: When not present dpb_output_du_delay_present_flag is inferred to be equal to 0.

pic_spt_dpb_output_du_delay is used to compute the DPB output time of the picture when DecodingUnitHrdFlag is equal to 1 and decoding_unit_dpb_du_params_in_pic_timing_sei_flag equal to 0 or decoding_unit_dpb_du_params_in_update_du_sei_flag is equal to 1. It specifies how many sub clock ticks to wait after removal of the last DU in an AU from the CPB before the decoded picture is output from the DPB.

In one example:

When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.

It is a requirement of bitstream conformance that all DU information SEI messages that are associated with the same AU, apply to the same operation point, and have (in one variant do not remove this strikeout) decoding_unit_dpb_du_params_in_pic_timing_sei_flag equal to 0 or decoding_unit_dpb_du_params_in_update_du_sei_flag is equal to 1 shall have the same value of pic_spt_dpb_output_du_delay.

The output time derived from the pic_spt_dpb_output_du_delay of any picture that is output from an output timing conforming decoder shall precede the output time derived from the pic_spt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_spt_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

Further, according to the techniques herein, the following for picture output process may be used for a decoding picture buffer:

The processes specified in this clause happen instantaneously at the CPB removal time of AU n, CpbRemovalTime[n].

When picture n has PictureOutputFlag equal to 1, its DPB output time DpbOutputTime[n] is derived as follows, where the variable firstPicInBufferingPeriodFlag is equal to 1 if AU n is the first AU of a BP and 0 otherwise:

```
if( !DecodingUnitHrdFlag ) {
  DpbOutputTime[ n ] = CpbRemovalTime[ n ] + ClockTick *
  ( picDpbOutputDelay −
    picDpbOutputDelta )
  if( firstPicInBufferingPeriodFlag )
    DpbOutputTime[ n ] −= ClockTick * DpbDelayOffset
} else
  DpbOutputTime[ n ] = AuCpbRemovalTime[ n ] + ClockSubTick *
  picSptDpbOutputDuDelay
``` where picDpbOutputDelay is the value of pic_dpb_output_delay and picDpbOutputDelta is the value of picDpbOutputDelta[Htid] derived according to cpb_removal_delay_minus1[Htid], and cpb_removal_delay_delta_idx[Htid] in the PT SEI message associated with AU n, and cpb_removal_delay_delta[cpb_removal_delay_delta_idx[Htid] ] in the BP SEI message associated with AU n, and picSptDpbOutputDuDelay is the value of pic_spt_dpb_output_du_delay, when present in the DU information SEI messages associated with AU n, or the value of pic_dpb_output_du_delay in the PT SEI message associated with AU n when decoding_unit_dpb_du_params_ in_pic_timing_sei_flag is equal to 1 and decoding_unit_dpb_du_params_in_update_du_sei_flag is equal to 0.
  NOTE—When the syntax element pic_spt_dpb_output_du_delay is not present in any DU information SEI message associated with AU n, the value is inferred to be equal to pic_dpb_output_du_delay in the PT SEI message associated with AU n.
The output of the current picture is specified as follows:
  If PictureOutputFlag is equal to 1 and DpbOutputTime[n] is equal to CpbRemovalTime[n], the current picture is output.
  Otherwise, if PictureOutputFlag is equal to 0, the current picture is not output, but will be stored in the DPB as specified above.
  Otherwise (PictureOutputFlag is equal to 1 and DpbOutputTime[n] is greater than CpbRemovalTime[n]), the current picture is output later and will be stored in the DPB (as specified in above) and is output at time DpbOutputTime[n] unless indicated not to be output by NoOutputOfPriorPicsFlag equal to 1.
When output, the picture is cropped, using the conformance cropping window for the picture.
When picture n is a picture that is output and is not the last picture of the bitstream that is output, the value of the variable DpbOutputInterval[n] is derived as follows:

$$DpbOutputInterval[n] = DpbOutputTime[nextPicInOutputOrder] - DpbOutputTime[n]$$

where nextPicInOutputOrder is the picture that follows picture n in output order and has PictureOutputFlag equal to 1.
In another example:
Instead of using a new flag decoding_unit_dpb_du_params_in_pic_timing_sei_flag, the flag decoding_unit_cpb_params_in_pic_timing_sei_flag may be used instead for the proposed conditional signalling. In this case the flag may be called decoding_unit_cpb_dpb_params_in_pic_timing_sei_flag.
In another example:
It may be a requirement of bitstream conformance that when decoding_unit_cpb_params_in_pic_timing_sei_flag is equal to 1, decoding_unit_dpb_du_params_in_pic_timing_sei_flag shall be equal to 1. In another example: It may be a requirement of bitstream conformance that when decoding_unit_dpb_du_params_in_pic_timing_sei_flag is equal to 1, decoding_unit_cpb_params_in_pic_timing_sei_flag shall be equal to 1.
It should be noted in the example syntax shown above in Table 15, the flag, decoding_unit_dpb_du_params_in_update_du_sei_flag, is used with syntax element decoding_unit_dpb_du_params_in_pic_timing_sei_flag signaled in a buffering period SEI message. However, in other examples, the flag, decoding_unit_dpb_du_params_in_update_du_sei_flag, may be also used with a decoding_unit_dpb_du_params_in_pic_timing_sei_flag flag signalled in a picture timing SEI message.
  As described above, in one example, according to the techniques herein a flag may be signalled in buffering period SEI message (or in picture timing SEI message) specifying if DU level picture DPB output delay information is signaled or is inferred to be same as the information for AU level. Table 17 illustrates an example of the relevant portion of a buffering_period( ) syntax structure, where a flag in buffering period SEI message specifies if DU level picture DPB output delay information is signaled or is inferred to be same as the information for AU level, according to the techniques herein.

TABLE 17

|  | Descriptor |
|---|---|
| buffering_period( payloadSize ) { |  |
|   bp_nal_hrd_parameters_present_flag | u(1) |
|   bp_vcl_hrd_parameters_present_flag | u(1) |
|   initial_cpb_removal_delay_length_minus1 | u(5) |
|   cpb_removal_delay_length_minus1 | u(5) |
|   dpb_output_delay_length_minus1 | u(5) |
|   alt_cpb_params_present_flag | u(1) |
|   bp_decoding_unit_hrd_params_present_flag | u(1) |
|   if( bp_decoding_unit_hrd_params_present_flag ) { |  |
|     du_cpb_removal_delay_increment_length_minus1 | u(5) |
|     dpb_output_delay_du_length_minus1 | u(5) |
|     decoding_unit_cpb_params_in_pic_timing_sei_flag | u(1) |
|     decoding_unit_dpb_du_info_signalled_flag | u(1) |
|   } |  |
|   concatenation_flag | u(1) |
| ... |  |
| } |  |

With respect to Table 17, the semantics may be based on the semantics provided above, with the semantics of syntax element decoding_unit_dpb_du_info_signalled_flag, in one example based on the following:
decoding_unit_dpb_du_info_signalled_flag equal to 1 specifies the presence of the DU level picture DPB output information (i.e pic_spt_dpb_output_du_delay syntax element in the DU information SET message and/or pt_pic_spt_dpb_output_du_delay syntax element in the picture timing SET message). decoding_unit_dpb_du_info_signalled_flag equal to 0 specifies the absence of the DU level picture DPB output information (i.e pic_spt_dpb_output_du_delay syntax element in the DU information SET message and/or pt_pic_spt_dpb_output_du_delay syntax element in the picture timing SET message). When decoding_unit_dpb_du_info_signalled_flag equal to 0 the DU level picture DPB output information is inferred to be same as the AU level picture DPB output information (e.g. pic_spt_dpb_output_du_delay is inferred to be equal to pic_dpb_output_delay and/or pt_pic_spt_dpb_output_du_delay is inferred to be equal to pic_dpb_output_delay).
Or in one example,
decoding_unit_dpb_du_info_signalled_flag equal to 1 specifies the presence of the DU level picture DPB output information (i.e pic_spt_dpb_output_du_delay syntax element in the DU information SET message and/or pt_pic_spt_dpb_output_du_delay syntax element in the picture timing SET message or pic_dpb_output_du_delay syntax element in the picture timing SEI message). decoding_unit_dpb_du_info_signalled_flag equal to 0 specifies the absence of the DU level picture DPB output information (i.e pic_spt_dpb_output_du_delay syntax element in the DU information SET message and/or pt_pic_spt_dpb_output_du_delay syntax element in the picture timing SET message or pic_dpb_output_du_delay syntax element in the picture timing SET message). When decoding_unit_dpb_du_info_signalled_flag equal to 0 the DU level picture DPB output information is inferred to be same as the AU level picture DPB output information (e.g. pic_spt_dpb_output_du_delay is inferred to be equal to pic_dpb_output_delay and/or pt_pic_spt_dpb_output_du_delay is inferred to be equal to pic_dpb_output_delay and/or pic_dpb_output_du_delay is inferred to be equal to pic dpb_output_delay).

Table 18 illustrates a decoding unit syntax structure that may be used in conjunction with the syntax provided in Table 17, according to the techniques herein.

TABLE 18

| | Descriptor |
|---|---|
| decoding_unit_info( payloadSize ) { | |
|   decoding_unit_idx | ue(v) |
|   if( | |
| !decoding_unit_cpb_params_in_pic_timing_sei_flag ) | |
|     for( i = TemporalId; i <= | |
| bp_max_sub_layers_minus1; i++ ) { | |
|       dui_sub_layer_delays_present_flag[ i ] | u(1) |
|       if( dui_sub_layer_delays_present_flag[ i ] ) | |
|         du_spt_cpb_removal_delay_increment[ i ] | u(v) |
|     } | |
|   if(decoding_unit_dpb_du_info_signalled_flag) | |
|     pic_spt_dpb_output_du_delay | u(v) |
| } | |

With respect to Table 18, the semantics may be based on the semantics provided above.

Table 19 illustrates an example of the relevant portion of a buffering_period( ) syntax structure, where a flag in buffering period SEI message specifies if DU level picture DPB output delay information is signaled or is inferred to be same as the information for AU level, according to the techniques herein.

TABLE 19

| | Descriptor |
|---|---|
| buffering_period( payloadSize ) { | |
|   bp_nal_hrd_parameters_present_flag | u(1) |
|   bp_vcl_hrd_parameters_present_flag | u(1) |
|   initial_cpb_removal_delay_length_minus1 | u(5) |
|   cpb_removal_delay_length_minus1 | u(5) |
|   dpb_output_delay_length_minus1 | u(5) |
|   alt_cpb_params_present_flag | u(1) |
|   bp_decoding_unit_hrd_params_present_flag | u(1) |
|   if( bp_decoding_unit_hrd_params_present_flag ) { | |
|     du_cpb_removal_delay_increment_length_minus1 | u(5) |
|     dpb_output_delay_du_length_minus1 | u(5) |
|     decoding_unit_cpb_params_in_pic_timing_sei_flag | u(1) |
|     decoding_unit_dpb_du_info_signalled_flag | u(1) |
|     if(decoding_unit_dpb_du_info_signalled_flag) | |
|     decoding_unit_dpb_du_params_in_pic_timing_sei_flag | u(1) |
|   } | |
|   concatenation_flag | u(1) |
| ... | |
| } | |

With respect to Table 19, the semantics may be based on the semantics provided above, with the semantics of syntax elements decoding_unit_dpb_du_info_signalled_flag, in one example, based on the following:

decoding_unit_dpb_du_info_signalled_flag equal to 1 specifies the presence of the DU level picture DPB output information (i.e decoding_unit_dpb_du_params_in_pic_timing_sei_flag in buffering period SEI message and/or pic_spt_dpb_output_du_delay syntax element in the DU information SEI message and/or pic_dpb_output_du_delay syntax element in the picture timing SEI message). decoding_unit_dpb_du_info_signalled_flag equal to 0 specifies the absence of the DU level picture DPB output information (i.e decoding_unit_dpb_du_params_in_pic_timing_sei_flag in buffering period SEI message and/or pic_spt_dpb_output_du_delay syntax element in the DU information SEI message and/or pic_dpb_output_du_delay syntax element in the picture timing SEI message). When decoding_unit_dpb_du_info_signalled_flag equal to 0 the DU level picture DPB output information is inferred to be same as the AU level picture DPB output information (e.g. pic_spt_dpb_output_du_delay is inferred to be equal to pic_dpb_output_delay and/or pt_pic_spt_dpb_output_du_delay is inferred to be equal to pic_dpb_output_delay). In one example: When not present decoding_unit_dpb_du_params_in_pic_timing_sei_flag is inferred to be equal to 1. In one example: When not present decoding unit_dpb_du_params_in_pic_timing_sei_flag is inferred to be equal to 0.

Table 20 illustrates a picture timing syntax structure and Table 21 illustrates a decoding unit syntax structure that may be used in conjunction with the syntax provided in Table 19, according to the techniques herein.

TABLE 20

| | Descriptor |
|---|---|
| pic_timing( payloadSize ) { | |
|   cpb_removal_delay_minus1[ bp_max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       for( i = 0; i < bp_cpb_cnt_minus1[ bp_max_sub_layers_minus1 ] + 1; i++ ) { | |
|         cpb_alt_initial_cpb_removal_delay_delta[ i ] | u(v) |
|         cpb_alt_initial_cpb_removal_offset_delta[ i ] | u(v) |
|       } | |
|       cpb_delay_offset | u(v) |
|       dpb_delay_offset | u(v) |
|     } | |
|   } | |
|   for( i = TemporalId; i <bp_max_sub_layers_minus1; i++ ) { | |
|     pt_sub_layer_delays_present_flag[ i ] | u(1) |
|     if( pt_sub_layer_delays_present_flag[ i ]) { | |
|       if( cpb_removal_delay_deltas_present_flag ) | |

TABLE 20-continued

| | Descriptor |
|---|---|
|       cpb_removal_delay_delta_enabled_flag[ i ] | u(1) |
|       if( cpb_removal_delay_delta_enabled_flag[ i ] ) | |
|         cpb_removal_delay_delta_idx[ i ] | u(v) |
|       else | |
|         cpb_removal_delay_minus1[ i ] | u(v) |
|     } | |
| } | |
| pic_dpb_output_delay | u(v) |
| if( bp_decoding_unit_hrd_params_present_flag && | |
| decoding_unit_dpb_du_info_signalled_flag && | |
| decoding_unit_dpb_du_params_in_pic_timing_sei_flag) | |
|     pic_dpb_output_du_delay | u(v) |
| if( bp_decoding_unit_hrd_params_present_flag && | |
|     decoding_unit_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|       for( i = TemporalId; i <= bp_max_sub_layers_minus1; i++ ) | |
|         if( pt_sub_layer_delays_present_flag[ i ] ) | |
|           du_common_cpb_removal_delay_increment_minus1[ i ] | u(v) |
|     for( i = 0; i <= num_decoding_units_minus1; i++ ) { | |
|       num_nalus_in_du_minus1[ i ] | ue(v) |
|       if( !du_common_cpb_removal_delay_flag && i < num_decoding_units_minus1 ) | |
|         for( j = TemporalId; j <= bp_max_sublayers_minus1; j++ ) | |
|           if( pt_sub_layer_delays_present_flag[ j ] ) | |
|             du_cpb_removal_delay_increment_minus1[ i ][ j ] | u(v) |
|     } | |
| } | |
| if( additional_concatenation_info_present_flag) | |
|     delay_for_concatenation_ensured_flag | u(1) |
| } | |

TABLE 21

| | Descriptor |
|---|---|
| decoding_unit_info( payloadSize ) { | |
|   decoding_unit_idx | ue(v) |
|   if( | |
|   !decoding_unit_cpb_params_in_pic_timing_sei_flag ) | |
|     for( i = TemporalId; i <= | |
|   bp_max_sub_layers_minus1; i++ ) { | |
|     dui_sub_layer_delays_present_flag[ i ] | u(1) |
|     if( dui_sub_layer_delays_present_flag[ i ] ) | |
|       du_spt_cpb_removal_delay_increment[ i ] | u(v) |
|   } | |
|   if(bp_decoding_unit_hrd_params_present_flag && - | |
| decoding_unit_dpb_du_info_signalled_flag | |
| && !decoding_unit_dpb_param_in_pic_timing_sei_flag) | |
|     pic_spt_dpb_output_du_delay | u(v) |
| } | |

With respect to Tables 20 and 21, the semantics may be based on the semantics provided above, with the following inference rules:

In one example:

When not present and decoding_unit_dpb_du_info_signalled_flag is equal to 0, pic_spt_dpb_output_du_delay is inferred to be equal to pic_dpb_output_delay.

In another example:

When decoding_unit_dpb_du_info_signalled_flag is equal to 0, pic_spt_dpb_output_du_delay is inferred to be equal to pic_dpb_output_delay.

As described above, JVET-P2001, provides a picture output process for a decoding picture buffer. Further, JVET-P2001, provides the following for determining removal delays for a coded picture buffer:

If DecodingUnitHrdFlag is equal to 0, the variable decodingUnitParamsFlag is set equal to 0 and the process specified in the remainder of this clause is invoked with a DU being considered as an AU, for derivation of the initial and final CPB arrival times for AU n.

Otherwise (DecodingUnitHrdFlag is equal to 1), the process specified in the remainder of this clause is first invoked with the variable decodingUnitParamsFlag set equal to 0 and a DU being considered as an AU, for derivation of the initial and final CPB arrival times for AU n, and then invoked with decodingUnitParamsFlag set equal to 1 and a DU being considered as a subset of an AU, for derivation of the initial and final CPB arrival times for the DUs in AU n. The process specified in the remainder of this clause is invoked for derivation of the initial and final CPB arrival times for AU n.

The variables InitCpbRemovalDelay[Htid][ScIdx] and InitCpbRemovalDelayOffset[Htid][ScIdx] are derived as follows:

If one or more of the following conditions are true, InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx] minus the values of the PT SEI message syntax elements cpb_alt_initial_removal_delay_delta and cpb_alt_initial_removal_offset_delta of AU 1, respectively, when NalHrdModeFlag is equal to 1, or vcl_initial_cpb_removal_delay[Htid][ScIdx] and vcl_initial_cpb_removal_offset[Htid][ScIdx] minus the values of the PT SEI message syntax elements cpb_alt_initial_removal_delay_delta and cpb_alt_initial_removal_offset_delta of AU 1, respectively, when NalHrdModeFlag is equal to 0, where the BP SEI message containing the syntax elements is selected as specified below:
UseAltCpbParamsFlag for AU 0 is equal to 1. DefaultInitCpbParamsFlag is equal to 0.

Otherwise, if the value of decodingUnitParamsFlag is equal to 1, InitCpbRemovalDelay[Htid][ScIdx] and InitCpbRemovalDelayOffset[Htid][ScIdx] are set equal to the values of the BP SEI message syntax elements nal_initial_alt_cpb_removal_delay[Htid][ScIdx] and nal_initial_alt_cpb_removal_offset[Htid][ScIdx], respectively, when NalHrdModeFlag is equal to 1 or vcl_initial_alt_cpb_removal_delay[Htid][ScIdx] and vcl_initial_alt_cpb_removal_offset[Htid][ScIdx], respectively, when NalHrdModeFlag is equal to 0, where the BP SEI message syntax elements are selected as specified below.

Otherwise (DecodingUnitHrdFlag is equal to 0), InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx], respectively, when NalHrdModeFlag is equal to 1, or vcl_initial_cpb_removal_delay[Htid][ScIdx] and vcl_initial_cpb_removal_offset[Htid][ScIdx], respectively, when NalHrdModeFlag is equal to 0, where the BP SEI message syntax elements are selected as specified below.

When the BP SEI message associated with AU 0 has cpb_alt_timing_info_present_flag equal to 1, either of the following applies for selection of the initial CPB removal delay and delay offset:

If NalHrdModeFlag is equal to 1, the default initial CPB removal delay and delay offset represented by nal_initial_cpb_removal_delay[Htid][ScIdx] and nal_initial_cpb_removal_offset[Htid][ScIdx], respectively, in the selected BP SEI message are selected. Otherwise, the default initial CPB removal delay and delay offset represented by vcl_initial_cpb_removal_delay[Htid][ScIdx] and vcl_initial_cpb_removal_offset[Htid][ScIdx], respectively, in the selected BP SEI message are selected. The variable DefaultInitCpbParamsFlag is set equal to 1.

If NalHrdModeFlag is equal to 1, the alternative initial CPB removal delay and delay offset represented by nal_initial_cpb_removal_delay[Htid][ScIdx] and nal_initial_cpb_removal_offset[Htid][ScIdx], respectively, in the selected BP SET message and cpb_alt_initial_removal_delay_delta[Htid][ScIdx] and cpb_alt_initial_removal_offset_delta[Htid][ScIdx], respectively, in the PT SET message associated with the AU following AU 0 in decoding order are selected. Otherwise, the alternative initial CPB removal delay and delay offset represented by vcl_initial_cpb_removal_delay[Htid][ScIdx] and vcl_initial_cpb_removal_offset[Htid][ScIdx], respectively, in the selected BP SET message and cpb_alt_initial_removal_delay_delta[Htid][ScIdx] and cpb_alt_initial_removal_offset_delta[Htid][ScIdx], respectively, in the PT SET message associated with the AU following AU 0 in decoding order are selected. The variable DefaultInitCpbParamsFlag is set equal to 0, and one of the following applies:

The RASL AUs associated with AU 0 are discarded from BitstreamToDecode and the remaining bitstream is assigned to BitstreamToDecode.

All AUs following AU 0 in decoding order up to an AU associated with a DRAP indication SET message are discarded from BitstreamToDecode and the remaining bitstream is assigned to BitstreamToDecode.

Referring to Table 8, it should be noted that in JVET-P2001, the initial buffering delay parameters can be different for VCL HRD and NAL HRD. Further, referring to Table 9, JVET-P2001 provides for a set of alternate buffering delay parameters to be signaled via a picture timing SET, as initial CPB removal delay offsets (i.e., cpb_alt_initial_cpb_removal_delay_delta[i], and cpb_alt_initial_cpb_removal_offset_delta[i]). However, in the picturing timing SET, only a single set of delay offsets are signaled. It should be noted that the syntax elements cpb_alt_initial_cpb_removal_delay_delta[i], and cpb_alt_initial_cpb_removal_offset_delta[i] may instead be called by some other name. In one example, according to the techniques herein, a separate set of alternate buffering delay parameters may be signaled for VCL HRD and for NAL HRD. Table 22 illustrates an example of the relevant portion of a picture timing message according to the techniques herein.

TABLE 22

|  | Descriptor |
| --- | --- |
| pic_timing( payloadSize ) { | |
|   cpb_removal_delay_minus1[ bp_max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       if( bp_nal_hrd_params_present_flag ) { | |
|         for( i = 0; i < bp_cpb_cnt_minus1 + 1; i++ ) { | |
|           nal_cpb_alt_initial_cpb_removal_delay_delta[ i ] | u(v) |
|           nal_cpb_alt_initial_cpb_removal_offset_delta[ i ] | u(v) |
|         } | |
|       } | |
|       if( bp_vcl_hrd_params_present_flag ) { | |
|         for( i = 0; i < bp_cpb_cnt_minus1 + 1; i++ ) { | |
|           vcl_cpb_alt_initial_cpb_removal_delay_delta[ i ] | u(v) |
|           vcl_cpb_alt_initial_cpb_removal_offset_delta[ i ] | u(v) |
|         } | |
|       } | |
|       cpb_delay_offset | u(v) |
|       dpb_delay_offset | u(v) |
|     } | |
|   } | |
|   ... | |
| } | |

With respect to Table 22, the semantics may be based on the semantics provided above and the following:

cpb_alt_timing_info_present_flag equal to 1 specifies the presence of the syntax elements nal_cpb_alt_initial_cpb_removal_delay_delta[i], nal_cpb_alt_initial_cpb_removal_offset_delta[i], vcl_cpb_alt_initial_cpb_removal_delay_delta[i], vcl_cpb_alt_initial_cpb_removal_offset_delta[i], cpb_delay_offset, and dpb_delay_offset. When the associated picture is a RASL picture, the value of cpb_alt_timing_info_present_flag shall be equal to 0.

cpb_alt_initial_cpb_removal_delay_delta[i], cpb_delay_offset, and dpb_delay_offset. When the associated picture is a RASL picture, the value of cpb_alt_timing_info_present_flag shall be equal to 0.

NOTE—The value of cpb_alt_timing_info_present_flag might be equal to 1 for more than one AU following an IRAP picture in decoding order. However, the alternative timing is only applied to the first AU that has cpb_alt_timing_info_present_flag equal to 1 and follows the IRAP picture in decoding order.

nal_cpb_alt_initial_cpb_removal_delay_delta[i] specifies the alternative initial CPB removal delay delta for the i-th CPB for the NAL HRD in units of a 90 kHz clock. The length of nal_cpb_alt_initial_cpb_removal_delay_delta[i] is initial_cpb_removal_delay_length_minus1+1 bits.

nal_cpb_alt_initial_cpb_removal_offset_delta[i] specifies the alternative initial CPB removal offset delta for the i-th CPB for the NAL HRD in units of a 90 kHz clock. The length of nal_cpb_alt_initial_cpb_removal_offset_delta[i] is initial_cpb_removal_delay_length_minus1+1 bits.

vcl_cpb_alt_initial_cpb_removal_delay_delta[i] specifies the alternative initial CPB removal delay delta for the i-th CPB for the VCL HRD in units of a 90 kHz clock. The length of nal_cpb_alt_initial_cpb_removal_delay_delta[i] is initial_cpb_removal_delay_length_minus1+1 bits.

vcl_cpbalt_initial_cpb_removal_offset_delta[i] specifies the alternative initial CPB removal offset delta for the i-th CPB for the VCL HRD in units of a 90 kHz clock. The length of vcl_cpb_alt_initial_cpb_removal_offset_delta[i] is initial_cpb_removal_delay_length_minus1+1 bits.

In one example, the unit for one or more of the nal_cpb_alt_initial_cpb_removal_delay_delta[i], nal_cpb_alt_initial_cpb_removal_offset_delta[i], vcl_cpb_alt_initial_cpb_removal_delay_delta[i], vcl_cpb_alt_initial_cpb_removal_offset_delta[i] may be different than "in units of a 90 kHz clock". Also for example one or more the semantics for these syntax elements may be defined omitting the words "in units of a 90 kHz clock".

In one example, instead of using bp_nal_hrd_params_present_flag to conditionally signal nal_cpb_alt_initial_cpb_removal_delay_delta[i] and nal_cpb_alt_initial_cpb_removal_offset_delta[i], a separate new flag may be used. In one example, instead of using bp_vcl_hrd_params_present_flag to conditionally signal vcl_cpb_alt_initial_cpb_removal_delay_delta[i] and vcl_cpb_alt_initial_cpb_removal_offset_delta[i], a separate new flag may be used.

With respect to Table 22, in one example a process for determining removal delays for a coded picture buffer may be as follows:

The variables InitCpbRemovalDelay[Htid][ScIdx] and InitCpbRemovalDelayOffset[Htid][ScIdx] are derived as follows:

If one or more of the following conditions are true, InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx] minus the values of the PT SEI message syntax elements nal_cpb_alt_initial_removal_delay_delta[ScIdx] and nal_cpb_alt_initial_removal_offset_delta[ScIdx] of AU 1, respectively, when NalHrdModeFlag is equal to 1, or vcl_initial_cpb_removal_delay[Htid][ScIdx] and vcl_initial_cpb_removal_offset[Htid][ScIdx] minus the values of the PT SET message syntax elements vcl_cpb_alt_initial_removal_delay_delta[ScIdx] and vcl_cpb_alt_initial_removal_offset_delta[ScIdx] of AU 1, respectively, when NalHrdModeFlag is equal to 0, where the BP SET message containing the syntax elements is selected as specified below:
UseAltCpbParamsFlag for AU 0 is equal to 1.
DefaultInitCpbParamsFlag is equal to 0.

Otherwise, if the value of decodingUnitParamsFlag is equal to 1, InitCpbRemovalDelay[Htid][ScIdx] and InitCpbRemovalDelayOffset[Htid][ScIdx] are set equal to the values of the BP SEI message syntax elements nal_initial_alt_cpb_removal_delay[Htid][ScIdx] and nal_initial_alt_cpb_removal_offset[Htid][ScIdx], respectively, when NalHrdModeFlag is equal to 1 or vcl_initial_alt_cpb_removal_delay[Htid][ScIdx] and vcl_initial_alt_cpb_removal_offset[Htid][ScIdx], respectively, when NalHrdModeFlag is equal to 0, where the BP SET message syntax elements are selected as specified below.

Otherwise (DecodingUnitHrdFlag is equal to 0), InitCpbRemovalDelay[Htid][ScIdx] and InitCpbRemovalDelayOffset[Htid][ScIdx] are set equal to the values of the BP SET message syntax elements nal_initial_cpb_removal_delay[Htid][ScIdx] and nal_initial_cpb_removal_offset[Htid][ScIdx], respectively, when NalHrdModeFlag is equal to 1, or vcl_initial_cpb_removal_delay[Htid][ScIdx] and vcl_initial_cpb_removal_offset[Htid][ScIdx], respectively, when NalHrdModeFlag is equal to 0, where the BP SET message syntax elements are selected as specified below.

When the BP SEI message associated with AU 0 has cpb_alt_timing_info_present_flag equal to 1, either of the following applies for selection of the initial CPB removal delay and delay offset:

If NalHrdModeFlag is equal to 1, the default initial CPB removal delay and delay offset represented by nal_initial_cpb_removal_delay[Htid][ScIdx] and nal_initial_cpb_removal_offset[Htid][ScIdx], respectively, in the selected BP SEI message are selected. Otherwise, the default initial CPB removal delay and delay offset represented by vcl_initial_cpb_removal_delay[Htid][ScIdx] and vcl_initial_cpb_removal_offset[Htid][ScIdx], respectively, in the selected BP SEI message are selected. The variable DefaultInitCpbParamsFlag is set equal to 1.

If NalHrdModeFlag is equal to 1, the alternative initial CPB removal delay and delay offset represented by nal_initial_cpb_removal_delay[Htid][ScIdx] and nal_initial_cpb_removal_offset[Htid][ScIdx], respectively, in the selected BP SEI message and nal_cpb_alt_initial_removal_delay_delta[ScIdx] and nal_cpb_alt_initial_removal_offset_delta[ScIdx], respectively, in the PT SEI message associated with the AU following AU 0 in decoding order are selected. Otherwise, the alternative initial CPB removal delay and delay offset represented by vcl_initial_cpb_removal_delay[Htid][ScIdx] and vcl_initial_cpb_removal_offset[Htid][ScIdx], respectively, in the selected BP SEI message and vcl_cpb_alt_initial_removal_delay_delta[ScIdx] and vcl_cpb_alt_initial_removal_offset_delta[ScIdx], respectively, in the PT SEI message associated with the AU following AU 0 in decoding order are selected. The variable DefaultInitCpbParamsFlag is set equal to 0, and one of the following applies:

The RASL AUs associated with AU 0 are discarded from BitstreamToDecode and the remaining bitstream is assigned to BitstreamToDecode.

All AUs following AU 0 in decoding order up to an AU associated with a DRAP indication SEI message are discarded from BitstreamToDecode and the remaining bitstream is assigned to BitstreamToDecode.

In another example, additionally cpb_delay_offset and/or dpb_delay_offset syntax elements may be signaled in picture timing SET separately for VCL HRD and for NAL HRD. Table 23 illustrates an example of the relevant portion of a picture timing message according to the techniques herein

TABLE 23

| | Descriptor |
|---|---|
| pic_timing( payloadSize ) { | |
|   cpb_removal_delay_minus1[ | u(v) |
|   bp_max_sub_layers_minus1 ] | |
|   if( alt_cpb_params_present_flag ) { | |
|     cpb_alt_timing_info_present_flag | u(1) |
|     if( cpb_alt_timing_info_present_flag ) { | |
|       if( bp_nal_hrd_params_present_flag ) { | |
|         for( i = 0; i < bp_cpb_cnt_minus1 + 1; i++ ) { | |
|           nal_cpb_alt_initial_cpb_removal_delay_delta[ i ] | u(v) |
|           nal_cpb_alt_initial_cpb_removal_offset_delta[ i ] | u(v) |
|         } | |
|       } | |
|       if( bp_vcl_hrd_params_present_flag ) { | |
|         for( i = 0; i < bp_cpb_cnt_minus1 + 1; i++ ) { | |
|           vcl_cpb_alt_initial_cpb_removal_delay_delta[ i ] | u(v) |
|           vcl_cpb_alt_initial_cpb_removal_offset_delta[ i ] | u(v) |
|         } | |
|       } | |
|       if( bp_nal_hrd_params_present_flag ) { | |
|         nal_cpb_delay_offset | u(v) |
|         nal_dpb_delay_offset | u(v) |
|       } | |
|       if( bp_vcl_hrd_params_present_flag ) { | |
|         vcl_cpb_delay_offset | u(v) |
|         vcl_dpb_delay offset | u(v) |
|       } | |
|     } | |
|   } | |
| ... | |
| } | |

With respect to Table 23, the semantics may be based on the semantics provided above and the following:

nal_cpb_delay_offset specifies for the NAL HRD an offset to be used in the derivation of the nominal CPB removal times of the AU associated with the PT SET message and of the AUs following in decoding order, when the AU associated with the PT SET message directly follows in decoding order the AU associated with the BP SET message. The length of nal_cpb_delay_offset is au_cpb_removal_delay_length_minus1+1 bits. When not present, the value of nal_cpb_delay_offset is inferred to be equal to 0.

nal_dpb_delay_offset specifies for the NAL HRD an offset to be used in the derivation of the DPB output times of the TRAP AU associated with the BP SET message when the AU associated with the PT SET message directly follows in decoding order the IRAP AU associated with the BP SET message. The length of nal_dpb_delay_offset is dpb_output_delay_length_minus1+1 bits. When not present, the value of nal_dpb_delay_offset is inferred to be equal to 0.

vcl_cpb_delay_offset specifies for the VCL HRD an offset to be used in the derivation of the nominal CPB removal times of the AU associated with the PT SET message and of the AUs following in decoding order, when the AU associated with the PT SET message directly follows in decoding order the AU associated with the BP SET message. The length of vcl_cpb_delay_offset is au_cpb_removal_delay_length_minus1+1 bits. When not present, the value of vcl_cpb_delay_offset is inferred to be equal to 0.

vcl_dpb_delay_offset specifies for the VCL HRD an offset to be used in the derivation of the DPB output times of the TRAP AU associated with the BP SET message when the AU associated with the PT SET message directly follows in decoding order the TRAP AU associated with the BP SET message. The length of vcl_dpb_delay_offset is dpb_output_delay_length_minus1+1 bits. When not present, the value of vcl_dpb_delay_offset is inferred to be equal to 0.

The variable BpResetFlag of the current picture is derived as follows:
- If the current picture is associated with a BP SET message, BpResetFlag is set equal to 1.
- Otherwise, BpResetFlag is set equal to 0.

With respect to Table 23, in one example, a process for deriving variables DpbDelayOffset and CpbDelayOffset may be as follows:

The variables DpbDelayOffset and CpbDelayOffset are derived as follows with k being the AU associated with the BP SEI message:
- If one or more of the following conditions are true, DpbDelayOffset is set equal to the value of the PT SEI message syntax element nal_dpb_delay_offset if NalHrdModeFlag is equal to 1 or vcl_dpb_delay_offset if NalHrdModeFlag is equal to 0 of AU k+1, and CpbDelayOffset is set equal to the value of the PT SEI message syntax element nal_cpb_delay_offset if NalHrdModeFlag is equal to 1 or vcl_dpb_delay_offset if NalHrdModeFlag is equal to 0 of AU k+1, where the PT SEI message containing the syntax elements is selected as specified herein:
  - UseAltCpbParamsFlag for AU 0 is equal to 1.
  - DefaultInitCpbParamsFlag is equal to 0.
- Otherwise, DpbDelayOffset and CpbDelayOffset are set equal to 0.

Further, it should be noted that in JVET-P2001, for the initial CPB removal delay offsets (i.e. cpb_alt_initial_cpb_removal_delay_delta[i], and cpb_alt_initial_cpb_removal_offset_delta[i]), only a single set of parameters are signaled without considering the temporal scalability. In one example, according to the techniques herein, a separate set of parameters may be signaled for different temporal sub-layer representations. Table 24 illustrates an example of the relevant portion of a picture timing message according to the techniques herein.

TABLE 24

| | Descriptor |
|---|---|
| pic_timing( payloadSize ) { | |
|   cpb_removal_delay_minus1[ | u(v) |
|   bp_max_sub_layers_minus1 ] | |
|   if( alt_cpb_params_present_flag ) { | |
|     cpb_alt_timing_info_present_flag | u(1) |
|     if( cpb_alt_timing_info_present_flag ) { | |
|       for( i = ( | |

TABLE 24-continued

| | Descriptor |
|---|---|
| sub_layer_initial_cpb_removal_delay_present_flag ? 0 : bp_max_sub_layers_minus1 ); i <= bp_max_sub_layers_minus1; i++) { | |
|    for( j = 0; j < bp_cpb_cnt_minus1 + 1; j++ ) { | |
|       cpb_alt_initial_cpb_removal_delay_delta[ i ][ j ] | u(v) |
|       cpb_alt_initial_cpb_removal_offset_delta[ i ][ j ] | u(v) |
|    } | |
|  } | |
|   cpb_delay_offset | u(v) |
|   dpb_delay_offset | u(v) |
|  } | |
| } | |
| ... | |
| } | |

With respect to Table 24, the semantics may be based on the semantics provided above and the following:

cpb_alt_timing_info_present_flag equal to 1 specifies the presence of the syntax elements cpb_alt_initial_cpb_removal_delay_delta[i][j], cpb_alt_initial_cpb_removal_offset_delta[i][j], cpb_delay_offset, and dpb_delay_offset. When the associated picture is a RASL picture, the value of cpb_alt_timing_info_present_flag shall be equal to 0.

NOTE—The value of cpb_alt_timing_info_present_flag might be equal to 1 for more than one AU following an IRAP picture in decoding order. However, the alternative timing is only applied to the first AU that has cpb_alt_timing_info_present_flag equal to 1 and follows the IRAP picture in decoding order.

cpb_alt_initial_cpb_removal_delay_delta[i][j] specifies the alternative initial CPB removal delay delta for the i-th temporal sub-layer for the j-th CPB schedule. The length of cpb_alt_initial_cpb_removal_delay_delta[i][j] is initial_cpb_removal_delay_length_minus1+1 bits.

cpb_alt_initial_cpb_removal_offset_delta[i][j] specifies the alternative initial CPB removal offset delta for the i-th CPB. The length of cpb_alt_initial_cpb_removal_offset_delta[i][j] is initial_cpb_removal_delay_length_minus1+1 bits.

It should be noted that in one example the array indices [i][j] may instead be flipped as indices [j][i].

In one example, the words "for the i-th temporal sub-layer" may be replaced with the words "for the i-th temporal sub-layer representation."

With respect to Table 24, in one example a process for the following for determining removal delays for a coded picture buffer may be as follows:

The variables InitCpbRemovalDelay[Htid][ScIdx] and InitCpbRemovalDelayOffset[Htid][ScIdx] are derived as follows:

If one or more of the following conditions are true, InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx] minus the values of the PT SET message syntax elements cpb_alt_initial_removal_delay_delta[Htid][ScIdx] and cpb_alt_initial_removal_offset_delta[Htid][ScIdx] of AU 1, respectively, when NalHrdModeFlag is equal to 1, or vcl_initial_cpb_removal_delay[Htid][ScIdx] and vcl_initial_cpb_removal_offset[Htid][ScIdx] minus the values of the PT SEI message syntax elements cpb_alt_initial_removal_delay_delta[Htid][ScIdx] and cpb_alt_initial_removal_offset_delta[Htid][ScIdx] of AU 1, respectively, when NalHrdModeFlag is equal to 0, where the BP SEI message containing the syntax elements is selected as specified below.

UseAltCpbParamsFlag for AU 0 is equal to 1.
  DefaultInitCpbParamsFlag is equal to 0.

Otherwise, if the value of decodingUnitParamsFlag is equal to 1, InitCpbRemovalDelay[Htid][ScIdx] and InitCpbRemovalDelayOffset[Htid][ScIdx] are set equal to the values of the BP SEI message syntax elements nal_initial_alt_cpb_removal_delay[Htid][ScIdx] and nal_initial_alt_cpb_removal_offset[Htid][ScIdx], respectively, when NalHrdModeFlag is equal to 1 or vcl_initial_alt_cpb_removal_delay[Htid][ScIdx] and vcl_initial_alt_cpb_removal_offset[Htid][ScIdx], respectively, when NalHrdModeFlag is equal to 0, where the BP SEI message syntax elements are selected as specified below.

Otherwise (DecodingUnitHrdFlag is equal to 0), InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx], respectively, when NalHrdModeFlag is equal to 1, or vcl_initial_cpb_removal_delay[Htid][ScIdx] and vcl_initial_cpb_removal_offset[Htid][ScIdx], respectively, when NalHrdModeFlag is equal to 0, where the BP SET message syntax elements are selected as specified below.

When the BP SET message associated with AU 0 has cpb_alt_timing_info_present_flag equal to 1, either of the following applies for selection of the initial CPB removal delay and delay offset:

If NalHrdModeFlag is equal to 1, the default initial CPB removal delay and delay offset represented by nal_initial_cpb_removal_delay[Htid][ScIdx] and nal_initial_cpb_removal_offset[Htid][ScIdx], respectively, in the selected BP SET message are selected. Otherwise, the default initial CPB removal delay and delay offset represented by vcl_initial_cpb_removal_delay[Htid][ScIdx] and vcl_initial_cpb_removal_offset[Htid][ScIdx], respectively, in the selected BP SET message are selected. The variable DefaultInitCpbParamsFlag is set equal to 1.

If NalHrdModeFlag is equal to 1, the alternative initial CPB removal delay and delay offset represented by nal_initial_cpb_removal_delay[Htid][ScIdx] and nal_initial_cpb_removal_offset[Htid][ScIdx], respectively, in the selected BP SET message and cpb_alt_initial_removal_delay_delta[Htid][ScIdx] and cpb_alt_initial_removal_offset_delta[Htid][ScIdx], respectively, in the PT SET message associated with the AU following AU 0 in decoding order are selected. Otherwise, the alternative initial CPB removal delay and delay offset represented by vcl_initial_cpb_removal_delay[Htid][ScIdx] and vcl_initial_cpb_removal_offset[Htid][ScIdx], respectively, in the selected BP SET message and cpb_alt_initial_removal_delay_delta[Htid][ScIdx] and cpb_alt_initial_removal_offset_delta[Htid][ScIdx], respectively, in the PT SET message associated with the AU following AU 0 in decoding order are selected. The variable DefaultInitCpbParamsFlag is set equal to 0, and one of the following applies:

The RASL AUs associated with AU 0 are discarded from BitstreamToDecode and the remaining bitstream is assigned to BitstreamToDecode.

All AUs following AU 0 in decoding order up to an AU associated with a DRAP indication SEI message are discarded from BitstreamToDecode and the remaining bitstream is assigned to BitstreamToDecode.

In one example, instead of using sub_layer_initial_cpb_removal_delay_present_flag to conditionally signal cpb_alt_initial_cpb_removal_delay_delta[i][j] and cpb_alt_initial_cpb_removal_offset_delta[i][j], a separate new flag may be used.

In one example, additionally cpb_delay_offset and/or dpb_delay_offset syntax elements in picture timing SEI may be signalled separately for each temporal sub-layer representation and/or for each HRD schedule. Table 25 illustrates an example of the relevant portion of a picture timing message according to the techniques herein.

TABLE 25

| | Descriptor |
|---|---|
| pic_timing( payloadSize ) { | |
|   cpb_removal_delay_minus1[ bp_max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       for( i = ( sub_layer_initial_cpb_removal_delay_present_flag ? 0 : bp_max_sub_layers_minus1 ); i <= bp_max_sub_layers_minus1; i++ ) { | |
|         for( j = 0; j < bp_cpb_cnt_minus1 + 1; j++ ) { | |
|           cpb_alt_initial_cpb_removal_delay_delta[ i ][ j ] | u(v) |
|           cpb_alt_initial_cpb_removal_offset_delta[ i ][ j ] | u(v) |
|         } | |
|         cpb_delay_offset[ i ] | u(v) |
|         dpb_delay_offset[ i ] | u(v) |
|       } | |
|     } | |
|   } | |
| ... | |
| } | |

With respect to Table 25, the semantics may be based on the semantics provided above and the following:

cpb_delay_offset[i] specifies for the i-th temporal sublayer an offset to be used in the derivation of the nominal CPB removal times of the AU associated with the PT SET message and of the AUs following in decoding order, when the AU associated with the PT SET message directly follows in decoding order the AU associated with the BP SET message. The length of cpb_delay_offset[i] is au_cpb_removal_delay_length_minus1+1 bits. When not present, the value of cpb_delay_offset[i] is inferred to be equal to 0.

dpb_delay_offset[i] specifies for the i-th temporal sublayer an offset to be used in the derivation of the DPB output times of the TRAP AU associated with the BP SET message when the AU associated with the PT SET message directly follows in decoding order the IRAP AU associated with the BP SET message. The length of dpb_delay_offset[i] is dpb_output_delay_length_minus1+1 bits. When not present, the value of dpb_delay_offset[i] is inferred to be equal to 0.

The variable BpResetFlag of the current picture is derived as follows:
If the current picture is associated with a BP SEI message, BpResetFlag is set equal to 1.
Otherwise, BpResetFlag is set equal to 0.

With respect to Table 25, in one example, a process for deriving variables DpbDelayOffset and CpbDelayOffset may be as follows:

The variables DpbDelayOffset and CpbDelayOffset are derived as follows with k being the AU associated with the BP SEI message:
If one or more of the following conditions are true, DpbDelayOffset is set equal to the value of the PT SET message syntax element dpb_delay_offset[Htid] of AU k+1, and CpbDelayOffset is set equal to the value of the PT SEI message syntax element cpb_delay_offset[Htid] of AU k+1, where the PT SEI message containing the syntax elements is selected as specified herein:
UseAltCpbParamsFlag for AU 0 is equal to 1.
DefaultInitCpbParamsFlag is equal to 0.
Otherwise, DpbDelayOffset and CpbDelayOffset are set equal to 0.

With respect to Table 24 and Table 25, in one example, the semantics of syntax elements cpb_alt_initial_removal_delay_delta, cpb_alt_initial_removal_offset_delta, cpb_delay_offset, and dpb_delay_offset may be based on the following:

cpb_alt_initial_removal_delay_delta[i][j] specifies the alternative initial CPB removal delay delta for the i-th sublayer for the j-th CPB. The length of cpb_alt_initial_removal_delay_delta[i][j] is initial_cpb_removal_delay_length_minus1+1 bits.

When cpb_alt_timing_info_present_flag is equal to 1 and cpb_alt_initial_removal_delay_delta[i][j] is not present for any value of i less than bp_max_sublayers_minus1, its value is inferred to be equal to cpb_alt_initial_removal_delay_delta[bp_max_sublayers_minus1][j].

In variant example, the inference rule may be expressed as follows:
When cpb_alt_timing_info_present_flag is equal to 1 and cpb_alt_initial_removal_delay_delta[i][j] is not present for any value of i less than bp_max_sublayers_minus1, its value is inferred to be equal to 0.
In this case the CPB buffer will be completely filled during initial buffering.

In another variant example, the inference rule may be expressed as follows:
When cpb_alt_timing_info_present_flag is equal to 1 and cpb_alt_initial_removal_delay_delta[i][j] is not present for any value of i less than bp_max_sublayers_minus1, its value is inferred to be equal to cpb_alt_initial_removal_delay_delta[i+1][j].

cpb_alt_initial_removal_offset_delta[i][j] specifies the alternative initial CPB removal offset delta for the i-th sublayer for the j-th CPB. The length of cpb_alt_initial_removal_offset_delta[i][j] is initial_cpb_removal_delay_length_minus1+1 bits.

When cpb_alt_timing_info_present_flag is equal to 1 and cpb_alt_initial_removal_offset_delta[i][j] is not present for any value of i less than bp_max_sublayers_minus1, its value is inferred to be equal to cpb_alt_initial_removal_offset_delta[bp_max_sublayers_minus1][j].

In another variant example, the inference rule may be expressed as follows:

When cpb_alt_timing_info_present_flag is equal to 1 and cpb_alt_initial_removal_offset_delta[i][j] is not present for any value of i less than bp_max_sublayers_minus1, its value is inferred to be equal to 0.

In this case the CPB buffer will be completely filled during initial buffering.

In another variant the inference rule may be expressed as follows:

When cpb_alt_timing_info_present_flag is equal to 1 and cpb_alt_initial_removal_offset_delta[i][j] is not present for any value of i less than bp_max_sublayers_minus1, its value is inferred to be equal to cpb_alt_initial_removal_offset_delta[i+1][j].

cpb_delay_offset[i] specifies, for the i-th sublayer, an offset to be used in the derivation of the nominal CPB removal times of the AU associated with the PT SET message and of the AUs following in decoding order, when the AU associated with the PT SEI message directly follows in decoding order the AU associated with the BP SEI message. The length of cpb_delay_offset[i] is au_cpb_removal_delay_length_minus1+1 bits.

When cpb_alt_timing_info_present_flag is equal to 1 and when not present, the value of cpb_delay_offset[i] is inferred to be equal to cpb_delay_offset [bp_max_sublayers_minus1].

In variant example, the inference rule may be expressed as follows:

When cpb_alt_timing_info_present_flag is equal to 1 and cpb_delay_offset[i] is not present for any value of i less than bp_max_sublayers_minus1, its value is inferred to be equal to cpb_delay_offset[bp_max_sublayers_minus1]. Otherwise when not present, the value of cpb_delay_offset[i] is inferred to be equal to 0.

In another variant example, the inference rule may be expressed as follows: No change to inference rule for cpb_delay_offset[i], i.e., infer it to be equal to 0 when not present.

dpb_delay_offset[i] specifies, for the i-th sublayer, an offset to be used in the derivation of the DPB output times of the TRAP AU associated with the BP SET message when the AU associated with the PT SEI message directly follows in decoding order the TRAP AU associated with the BP SET message. The length of dpb_delay_offset[i] is dpb_output_delay_length_minus1+1 bits. When cpb_alt_timing_info_present_flag is equal to 1 and when not present, the value of dpb_delay_offset[i] is inferred to be equal to dpb_delay_offset [bp_max_sublayers_minus1].

In variant example, the inference rule may be expressed as follows:

When cpb_alt_timing_info_present_flag is equal to 1 and dpb_delay_offset[i] is not present for any value of i less than bp_max_sublayers_minus1, its value is inferred to be equal to dpb_delay_offset[bp_max_sublayers_minus1]. Otherwise, when not present, the value of dpb_delay_offset[i] is inferred to be equal to 0.

In another variant example, the inference rule may be expressed as follows:

No change to inference rule, i.e. infer it to be equal to 0 when not present.

It should be noted that in one example one or more inference conditions above which includes "When cpb_alt_timing_info_present_flag is equal to 1" may be modified as "When cpb_alt_timing_info_present_flag is equal to 1 and sublayer_initial_cpb_removal_delay_present_flag is equal to 0"

With respect to syntax element cpb_alt_initial_removal_delay_delta[i][j], it should be noted that, one or more of the inference rules may be especially useful if instead of a single flag (sublayer_initial_cpb_removal_delay_present_flag), separate flags (sublayer_initial_cpb_removal_delay_present_flag[i]) are used to control the presence of syntax elements for each i-th temporal sublayer. Additionally, in this case it may be required to apply the inference rules in descending order of i values starting at i equal to bp_max_sublayers_minus1-1.

With respect to syntax element cpb_alt_initial_removal_offset_delta[i][j], it should be noted that, one or more of the inference rules may be especially useful if instead of a single flag (sublayer_initial_cpb_removal_delay_present_flag), separate flags (sublayer_initial_cpb_removal_delay_present_flag[i]) are used to control the presence of syntax elements for each i-th temporal sublayer. Additionally in this case it may be required to apply the inference rules in descending order of i values starting at i equal to bp_max_sublayers_minus1−1.

Further, with respect to a buffering_period( ) syntax structure, in one example, the semantics of syntax elements initial_cpb_removal_delay_length_minus1, cpb_removal_delay_length_minus1, and dpb_output_delay_length_minus1 may be based on the following:

initial_cpb_removal_delay_length_minus1 plus 1 specifies the length, in bits, of the syntax elements nal_initial_cpb_removal_delay[i][j], nal_initial_cpb_removal_offset[i][j], vcl_initial_cpb_removal_delay[i][j], and vcl_initial_cpb_removal_offset[i][j] of the BP SET messages and the syntax elements cpb_alt_initial_removal_delay_delta[i][j], cpb_alt_initial_removal_offset_delta[i][j] in the PT SET messages in the current buffering period. When not present, the value of initial_cpb_removal_delay_length_minus1 is inferred to be equal to 23.

cpb_removal_delay_length_minus1 plus 1 specifies the length, in bits, of the syntax elements cpb_removal_delay_delta_minus1 and cpb_removal_delay_delta[i] in the BP SEI message and the syntax element cpb_removal_delay_minus1[i] and cpb_delay_offset[i] in the PT SET messages in the current buffering period. When not present, the value of cpb_removal_delay_length_minus1 is inferred to be equal to 23.

dpb_output_delay_length_minus1 plus 1 specifies the length, in bits, of the syntax elements dpb_output_delay and dpb_delay_offset[i] in the PT SET messages in the current buffering period. When not present, the value of dpb_output_delay_length_minus1 is inferred to be equal to 23.

It should be noted that these semantics provide lengths of syntax elements cpb_delay_offset[i], cpb_alt_initial_removal_delay_delta[i][j], cpb_alt_initial_removal_offset_delta[i][j] in a picture timing SET message.

In one example, according to the techniques herein, the syntax structures illustrated in Table 22 and Table 24 may be combined for signaling alternative timing HRD parameters for VCL HRD and NAL HRD for temporal sub-layers. Table 26A illustrates an example of the relevant portion of a picture timing message according to the techniques herein.

TABLE 26A

| | Descriptor |
|---|---|
| pic_timing( payloadSize ) { | |
|   cpb_removal_delay_minus1[ bp_max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       if( bp_nal_hrd_params_present_flag ) { | |
|         for( i = ( sub_layer_initial_cpb_removal_delay_present_flag ? 0 : bp_max_sub_layers_minus1 ); i <= bp_max_sub_layers_minus1; i++ ) { | |
|           for( j = 0; j < bp_cpb_cnt_minus1 + 1; j++ ) { | |
|             nal_cpb_alt_initial_cpb_removal_delay_delta[ i ][ j ] | u(v) |
|             nal_cpb_alt_initial_cpb_removal_offset_delta[ i ][ j ] | u(v) |
|           } | |
|         } | |
|       } | |
|       f( bp_vcl_hrd_params_present_flag ) { | |
|         for( i = ( sub_layer_initial_cpb_removal_delay_present_flag ? 0 : bp_max_sub_layers_minus1 ); i <= bp_max_sub_layers_minus1; i++ ){ | |
|           for(j = 0; j < bp_cpb_cnt_minus1 + 1; j++) { | |
|             vcl_cpb_alt_initial_cpb_removal_delay_delta[ i ][ j ] | u(v) |
|             vcl_cpb_alt_initial_cpb_removal_offset_delta[ i ][ j ] | u(v) |
|           } | |
|         } | |
|       } | |
|       cpb_delay_offset | u(v) |
|       dpb_delay_offset | u(v) |
|     } | |
|   } | |
| ... | |
| } | |

With respect to Table 26A, the semantics may be based on the semantics provided above and the following:

cpb_alt_timing_info_present_flag equal to 1 specifies the presence of the syntax elements nal_cpb_alt_initial_cpb_removal_delay_delta[i][j], nal_cpb_alt_initial_cpb_removal_offset_delta[i][j], vcl_cpb_alt_initial_cpb_removal_delay_delta[i][j], vcl_cpb_alt_initial_cpb_removal_offset_delta[i][j], cpb_delay_offset, and dpb_delay_offset. When the associated picture is a RASL picture, the value of cpb_alt_timing_info_present_flag shall be equal to 0.

NOTE—The value of cpb_alt_timing_info_present_flag might be equal to 1 for more than one AU following an IRAP picture in decoding order. However, the alternative timing is only applied to the first AU that has cpb_alt_timing_info_present_flag equal to 1 and follows the IRAP picture in decoding order.

nal_cpb_alt_initial_cpb_removal_delay_delta[i][j] specifies the alternative initial CPB removal delay delta for the i-th temporal sub-layer for the j-th CPB schedule for the NAL HRD in units of a 90 kHz clock. The length of nal_cpb_alt_initial_cpb_removal_delay_delta[i][j] is initial_cpb_removal_delay_length_minus1+1 bits.

nal_cpb_alt_initial_cpb_removal_offset_delta[i][j] specifies the alternative initial CPB removal offset delta for the i-th temporal sub-layer for the j-th CPB schedule for the NAL HRD in units of a 90 kHz clock. The length of nal_cpb_alt_initial_cpb_removal_offset_delta[i][j] is initial_cpb_removal_delay_length_minus1+1 bits.

vcl_cpb_alt_initial_cpb_removal_delay_delta[i][j] specifies the alternative initial CPB removal delay delta for the i-th temporal sub-layer for the j-th CPB schedule for the VCL HRD in units of a 90 kHz clock. The length of nal_cpb_alt_initial_cpb_removal_delay_delta[i][j] is initial cpb_removal_delay_length_minus1+1 bits.

vcl_cpb_alt_initial_cpb_removal_offset_delta[i][j] specifies the alternative initial CPB removal offset delta for the i-th temporal sub-layer for the j-th CPB schedule for the VCL HRD in units of a 90 kHz clock. The length of vcl_cpb_alt_initial_cpb_removal_offset_delta[i][i] is initial_cpb_removal_delay_length_minus1+1 bits.

Table 26B illustrates another example of the relevant portion of a picture timing message according to the techniques herein.

TABLE 26B

| | Descriptor |
|---|---|
| pic_timing( payloadSize ) { | |
|   cpb_removal_delay_minus1[ bp max_sub_layers_minus1 ] | u(v) |
|   if( alt_cpb_params_present_flag ) { | |
|     cpb_alt_timing_info_present_flag | u(1) |
|     if( cpb_alt_timing_info_present_flag ) { | |
|       if( bp_nal_hrd_params_present_flag ) { | |
|         for( i = ( sublayer_initial_cpb_removal_delay_present_flag ? 0 : bp_max_sublayers_minus1 ); i <= bp_max_sublayers_minus1; i++ ) { | |
|           for( j = 0; j < bp_cpb_cnt_minus1 + 1; j++ ) { | |
|             nal_cpb_alt_initial_removal_delay_delta[ i ][ j ] | u(v) |
|             nal_cpb_alt_initial_removal_offset_delta[ i ][ j ] | u(v) |
|           } | |

TABLE 26B-continued

| | Descriptor |
|---|---|
|       nal_cpb_delay_offset[ i ] | u(v) |
|       nal_dpb_delay_offset[ i ] | u(v) |
|      } | |
|     } | |
|     if( bp_vcl_hrd_params_present_flag ) { | |
|       for( i = ( sublayer_initial_cpb_removal_delay_present_flag ? 0 : | |
|         bp_max_sublayers_minus1 ); i <= bp_max_sublayers_minus1; i++ ) { | |
|         for( j = 0; j < bp_cpb_cnt_minus1 + 1; j++ ) { | |
|           vcl_cpb_alt_initial_removal_delay_delta[ i ][ j ] | u(v) |
|           vcl_cpb_alt_initial_removal_offset_delta[i][j] | u(v) |
|         } | |
|         vcl_cpb_delay_offset[ i ] | u(v) |
|         vcl_dpb_delay_offset[ i ] | u(v) |
|       } | |
|     } | |
|   } | |
| } | |

...

With respect to Table 26B, the semantics may be based on the semantics provided above and the following:

cpb_alt_timing_info_present_flag equal to 1 specifies the presence of the syntax elements nal_cpb_alt_initial_cpb_removal_delay_delta[i][j], nal_cpb_alt_initial_cpb_removal_offset_delta[i][j], vcl_cpb_alt_initial_cpb_removal_delay_delta[i][j], vcl_cpb_alt_initial_cpb_removal_offset_delta[i][j], nal_cpb_delay_offset[i], vcl_cpb_delay_offset[i], vcl_dpb_delay_offset[i], and vcl_dpb_delay_offset[i]. When the associated picture is a RASL picture, the value of cpb_alt_timing_info_present_flag shall be equal to 0.

NOTE—The value of cpb_alt_timing_info_present flag might be equal to 1 for more than one AU following an IRAP picture in decoding order. However, the alternative timing is only applied to the first AU that has cpb_alt_timing_info_present_flag equal to 1 and follows the IRAP picture in decoding order. nal_cpb_alt_initial_removal_delay_delta[i][j] specifies the alternative initial CPB removal delay delta for the i-th sub-layer for the j-th CPB for the NAL HRD in units of a 90 kHz clock. The length of nal_cpb_alt_initial_cpb_removal_delay_delta[i] is initial_cpb_removal_delay_length_minus1+1 bits. When cpb_alt_timing_info_present_flag is equal to 1 and nal_cpb_alt_initial_removal_delay_delta[i][j] is not present for any value of i less than bp_max_sublayers_minus1, its value is inferred to be equal to 0.

In another example: When cpb_alt_timing_info_present_flag is equal to 1 and nal_cpb_alt_initial_removal_delay_delta[i][j] is not present for any value of i less than bp_max_sublayers_minus1, its value is inferred to be equal to nal_cpb_alt_initial_removal_delay_delta[bp_max_sublayers_minus1][j]. In another example: When not present, nal_cpb_alt_initial_removal_delay_delta[i][j] is inferred to be equal to 0.

nal_cpb_alt_initial_removal_offset_delta[i][j] specifies the alternative initial CPB removal offset delta for the i-th sub-layer for the j-th CPB for the NAL HRD in units of a 90 kHz clock. The length of nal_cpb_alt_initial_cpb_removal_offset_delta[i] is initial_cpb_removal_delay_length_minus1+1 bits. When cpb_alt_timing_info_present_flag is equal to 1 and nal_cpb_alt_initial_removal_offset[i][j] is not present for any value of i less than bp_max_sublayers_minus1, its value is inferred to be equal to 0.

In another example: When cpb_alt_timing_info_present_flag is equal to 1 and nal_cpb_alt_initial_removal_offset_delta[i][j] is not present for any value of i less than bp_max_sublayers_minus1, its value is inferred to be equal to nal_cpb_alt_initial_removal_offset_delta[bp_max_sublayers_minus1][j].

In another example: When not present, nal_cpb_alt_initial_removal_offset_delta[i][j] is inferred to be equal to 0.

vcl_cpb_alt_initial_cpb_removal_delay_delta[i][j] specifies the alternative initial CPB removal delay delta for the i-th sub-layer for the j-th CPB for the VCL HRD in units of a 90 kHz clock. The length of vcl_cpb_alt_initial_cpb_removal_delay_delta[i] is initial_cpb_removal_delay_length_minus1+1 bits. When cpb_alt_timing_info_present_flag is equal to 1 and vcl_cpb_alt_initial_removal_delay_delta[i][j] is not present for any value of i less than bp_max_sublayers_minus1, its value is inferred to be equal to 0.

In another example: When cpb_alt_timing_info_present_flag is equal to 1 and vcl_cpb_alt_initial_removal_delay_delta[i][j] is not present for any value of i less than bp_max_sublayers_minus1, its value is inferred to be equal to vcl_cpb_alt_initial_removal_delay_delta[bp_max_sublayers_minus1][j].

In another example: When not present, vcl_cpb_alt_initial_removal_delay_delta[i][j] is inferred to be equal to 0.

vcl_cpb_alt_initial_cpb_removal_offset_delta[i][j] specifies the alternative initial CPB removal offset delta for the i-th sub-layer for the j-th CPB for the VCL HRD in units of a 90 kHz clock. The length of vcl_cpb_alt_initial_cpb_removal_offset_delta[i] is initial_cpb_removal_delay_length_minus1+1 bits. When cpb_alt_timing_info_present_flag is equal to 1 and vcl_cpb_alt_initial_removal_offset[i][j] is not present for any value of i less than bp_max_sublayers_minus1, its value is inferred to be equal to 0.

In another example: When cpb_alt_timing_info_present_flag is equal to 1 and vcl_cpb_alt_initial_removal_offset_delta[i][j] is not present for any value of i less than bp_max_sublayers_minus1, its value is inferred to be equal to vcl_cpb_alt_initial_removal_offset_delta[bp_max_sublayers_minus1][j].

In another example: When not present, vcl_cpb_alt_initial_removal_offset_delta[i][j] is inferred to be equal to 0.

nal_cpb_delay_offset[i] specifies for the NAL HRD an offset to be used in the derivation of the nominal CPB removal times of the AU associated with the PT SET message and of the AUs following in decoding order, when the AU associated with the PT SET message directly follows in decoding order the AU associated with the BP SET message. The length of nal_cpb_delay_offset[i] is au_cpb_removal_delay_length_minus1+1 bits. When not present, the value of nal_cpb_delay_offset[i] is inferred to be equal to 0.

nal_dpb_delay_offset[i] specifies for the NAL HRD an offset to be used in the derivation of the DPB output times of the TRAP AU associated with the BP SET message when the AU associated with the PT SET message directly follows in decoding order the TRAP AU associated with the BP SET message. The length of nal_dpb_delay_offset[i] is dpb_output_delay_length_minus1+1 bits. When not present, the value of nal_dpb_delay_offset[i] is inferred to be equal to 0.

vcl_cpb_delay_offset [i] specifies for the VCL HRD an offset to be used in the derivation of the nominal CPB removal times of the AU associated with the PT SET message and of the AUs following in decoding order, when the AU associated with the PT SET message directly follows in decoding order the AU associated with the BP SEI message. The length of vcl_cpb_delay_offset[i] is au_cpb_removal_delay_length_minus1+1 bits. When not present, the value of vcl_cpb_delay_offset[i] is inferred to be equal to 0.

vcl_dpb_delay_offset[i] specifies for the VCL HRD an offset to be used in the derivation of the DPB output times of the TRAP AU associated with the BP SET message when the AU associated with the PT SET message directly follows in decoding order the IRAP AU associated with the BP SEI message. The length of vcl_dpb_delay_offset[i] is dpb_output_delay_length_minus1+1 bits. When not present, the value of vcl_dpb_delay_offset[i] is inferred to be equal to 0.

With respect to Table 24, in one example a process for the following for determining removal delays for a coded picture buffer may be as follows:

The variables InitCpbRemovalDelay[Htid][ScIdx] and InitCpbRemovalDelayOffset[Htid][ScIdx] are derived as follows:

- If one or more of the following conditions are true, InitCpbRemovalDelay[Htid] [ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx] minus the values of the PT SEI message syntax elements nal_cpb_alt_initial_removal_delay_delta[Htid][ScIdx] and nal_cpb_alt_initial_removal_offset_delta[Htid][ScIdx] of AU 1, respectively, when NalHrdModeFlag is equal to 1, or vcl_initial_cpb_removal_delay[Htid][ScIdx] and vcl_initial_cpb_removal_offset[Htid][ScIdx] minus the values of the PT SEI message syntax elements vcl_cpb_alt_initial_removal_delay_delta[Htid][ScIdx] and vcl_cpb_alt_initial_removal_offset_delta[Htid][ScIdx] of AU 1, respectively, when NalHrdModeFlag is equal to 0, where the BP SEI message containing the syntax elements is selected as specified below:
  UseAltCpbParamsFlag for AU 0 is equal to 1.
  DefaultInitCpbParamsFlag is equal to 0.
- Otherwise, if the value of decodingUnitParamsFlag is equal to 1, InitCpbRemovalDelay[Htid][ScIdx] and InitCpbRemovalDelayOffset[Htid][ScIdx] are set equal to the values of the BP SEI message syntax elements nal_initial_alt_cpb_removal_delay[Htid][ScIdx] and nal_initial_alt_cpb_removal_offset[Htid][ScIdx], respectively, when NalHrdModeFlag is equal to 1 or vcl_initial_alt_cpb_removal_delay[Htid][ScIdx] and vcl_initial_alt_cpb_removal_offset[Htid][ScIdx], respectively, when NalHrdModeFlag is equal to 0, where the BP SEI message syntax elements are selected as specified below.
- Otherwise (DecodingUnitHrdFlag is equal to 0), InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx], respectively, when NalHrdModeFlag is equal to 1, or vcl_initial_cpb_removal_delay[Htid][ScIdx] and vcl_initial_cpb_removal_offset[Htid][ScIdx], respectively, when NalHrdModeFlag is equal to 0, where the BP SEI message syntax elements are selected as specified below.

When the BP SET message associated with AU 0 has cpb_alt_timing_info_present_flag equal to 1, either of the following applies for selection of the initial CPB removal delay and delay offset:

- If NalHrdModeFlag is equal to 1, the default initial CPB removal delay and delay offset represented by nal_initial_cpb_removal_delay[Htid][ScIdx] and nal_initial_cpb_removal_offset[Htid][ScIdx], respectively, in the selected BP SEI message are selected. Otherwise, the default initial CPB removal delay and delay offset represented by vcl_initial_cpb_removal_delay[Htid][ScIdx] and vcl_initial_cpb_removal_offset[Htid][ScIdx], respectively, in the selected BP SEI message are selected. The variable DefaultInitCpbParamsFlag is set equal to 1.
- If NalHrdModeFlag is equal to 1, the alternative initial CPB removal delay and delay offset represented by nal_initial_cpb_removal_delay[Htid][ScIdx] and nal_initial_cpb_removal_offset[Htid][ScIdx], respectively, in the selected BP SET message and nal_cpb_alt_initial_removal_delay_delta[Htid][ScIdx] and nal_cpb_alt_initial_removal_offset_delta[Htid][ScIdx], respectively, in the PT SET message associated with the AU following AU 0 in decoding order are selected. Otherwise, the alternative initial CPB removal delay and delay offset represented by vcl_initial_cpb_removal_delay[Htid][ScIdx] and vcl_initial_cpb_removal_offset[Htid][ScIdx], respectively, in the selected BP SET message and vcl_cpb_alt_initial_removal_delay_delta[Htid][ScIdx] and vcl_cpb_alt_initial_removal_offset_delta[Htid][ScIdx], respectively, in the PT SET message associated with the AU following AU 0 in decoding order are selected. The variable DefaultInitCpbParamsFlag is set equal to 0, and one of the following applies:

The RASL AUs associated with AU 0 are discarded from BitstreamToDecode and the remaining bitstream is assigned to BitstreamToDecode.

All AUs following AU 0 in decoding order up to an AU associated with a DRAP indication SET message are discarded from BitstreamToDecode and the remaining bitstream is assigned to BitstreamToDecode.

In one example a process for the following for determining removal delays for a coded picture buffer may be as follows:

The variables InitCpbRemovalDelay[Htid][ScIdx] and InitCpbRemovalDelayOffset[Htid][ScIdx] are derived as follows:

If one or more of the following conditions are true, InitCpbRemovalDelay[Htid][ScIdx] and InitCpbRemovalDelayOffset[Htid][ScIdx] are set equal to the values of the BP SEI message syntax elements nal_initial_cpb_removal_delay[Htid][ScIdx] and nal_initial_cpb_removal_offset[Htid][ScIdx] minus the values of the PT SET message syntax elements nal_cpb_alt_initial_removal_delay_delta[Htid][ScIdx] and nal_cpb_alt_initial_removal_offset_delta[Htid][ScIdx] of AU 1, respectively, when NalHrdModeFlag is equal to 1, or vcl_initial_cpb_removal_delay[Htid][ScIdx] and vcl_initial_cpb_removal_offset[Htid][ScIdx] minus the values of the PT SET message syntax elements vcl_cpb_alt_initial_removal_delay_delta[Htid][ScIdx] and vcl_cpb_alt_initial_removal_offset_delta[Htid][ScIdx] of AU 1, respectively, when NalHrdModeFlag is equal to 0, where the BP SET message containing the syntax elements is selected as specified below:
UseAltCpbParamsFlag for AU 0 is equal to 1.
DefaultInitCpbParamsFlag is equal to 0.

Otherwise, if the value of decodingUnitParamsFlag is equal to 1, InitCpbRemovalDelay[Htid][ScIdx] and InitCpbRemovalDelayOffset[Htid][ScIdx] are set equal to the values of the BP SEI message syntax elements nal_initial_alt_cpb_removal_delay[Htid][ScIdx] and nal_initial_alt_cpb_removal_offset[Htid][ScIdx], respectively, when NalHrdModeFlag is equal to 1 or vcl_initial_alt_cpb_removal_delay[Htid][ScIdx] and vcl_initial_alt_cpb_removal_offset[Htid][ScIdx], respectively, when NalHrdModeFlag is equal to 0, where the BP SEI message syntax elements are selected as specified below.

Otherwise (DecodingUnitHrdFlag is equal to 0), InitCpbRemovalDelay[Htid][ScIdx] and InitCpbRemovalDelayOffset[Htid][ScIdx] are set equal to the values of the BP SET message syntax elements nal_initial_cpb_removal_delay[Htid][ScIdx] and nal_initial_cpb_removal_offset[Htid][ScIdx], respectively, when NalHrdModeFlag is equal to 1, or vcl_initial_cpb_removal_delay[Htid][ScIdx] and vcl_initial_cpb_removal_offset[Htid][ScIdx], respectively, when NalHrdModeFlag is equal to 0, where the BP SET message syntax elements are selected as specified below.

The variables DpbDelayOffset and CpbDelayOffset are derived as follows with k being the AU associated with the BP SEI message:
If one or more of the following conditions are true, DpbDelayOffset is set equal to the value of the PT SEI message syntax element nal_dpb_delay_offset[Htid] if NalHrdModeFlag is equal to 1 or vcl_dpb_delay_offset[Htid] if NalHrdModeFlag is equal to 0 of AU k+1, and CpbDelayOffset is set equal to the value of the PT SET message syntax element nal_cpb_delay_offset[Htid] if NalHrdModeFlag is equal to 1 or vcl_dpb_delay_offset[Htid] if NalHrdModeFlag is equal to 0 of AU k+1, where the PT SET message containing the syntax elements is selected as specified below:
UseAltCpbParamsFlag for AU 0 is equal to 1.
DefaultInitCpbParamsFlag is equal to 0.
Otherwise, DpbDelayOffset and CpbDelayOffset are set equal to 0.

When the BP SET message associated with AU 0 has cpb_alt_timing_info_present_flag equal to 1, either of the following applies for selection of the initial CPB removal delay and delay offset:
If NalHrdModeFlag is equal to 1, the default initial CPB removal delay and delay offset represented by nal_initial_cpb_removal_delay[Htid][ScIdx] and nal_initial_cpb_removal_offset[Htid][ScIdx], respectively, in the selected BP SET message are selected. Otherwise, the default initial CPB removal delay and delay offset represented by vcl_initial_cpb_removal_delay[Htid][ScIdx] and vcl_initial_cpb_removal_offset[Htid][ScIdx], respectively, in the selected BP SET message are selected. The variable DefaultInitCpbParamsFlag is set equal to 1.
If NalHrdModeFlag is equal to 1, the alternative initial CPB removal delay and delay offset represented by nal_initial_cpb_removal_delay[Htid][ScIdx] and nal_initial_cpb_removal_offset[Htid][ScIdx], respectively, in the selected BP SET message and nal_cpb_alt_initial_removal_delay_delta[Htid][ScIdx] and nal_cpb_alt_initial_removal_offset_delta[Htid][ScIdx], respectively, in the PT SET message associated with the AU following AU 0 in decoding order are selected. Otherwise, the alternative initial CPB removal delay and delay offset represented by vcl_initial_cpb_removal_delay[Htid][ScIdx] and vcl_initial_cpb_removal_offset[Htid][ScIdx], respectively, in the selected BP SET message and vcl_cpb_alt_initial_removal_delay_delta[Htid][ScIdx] and vcl_cpb_alt_initial_removal_offset_delta[Htid][ScIdx], respectively, in the PT SET message associated with the AU following AU 0 in decoding order are selected. The variable DefaultInitCpbParamsFlag is set equal to 0, and one of the following applies:
The RASL AUs associated with AU 0 are discarded from BitstreamToDecode and the remaining bitstream is assigned to BitstreamToDecode.
All AUs following AU 0 in decoding order up to an AU associated with a DRAP indication SET message are discarded from BitstreamToDecode and the remaining bitstream is assigned to BitstreamToDecode.

As illustrated above, for example, with respect to Tables 9, 12, 14, 15, and 20, pic_timing( ) syntax structure may include syntax elements du_common_cpb_removal_delay_flag, du_common_cpb_removal_delay_increment_minus1[i], num_nalus_in_du_minus1[i], and du_cpb_removal_delay_increment_minus1[i][j]. In one example, according to the techniques herein, syntax elements du_common_cpb_removal_delay_flag, du_common_cpb_removal_delay_increment_minus1 [i], num_nalus_in_du_minus1[i], and du_cpb_removal_delay_increment_minus1[i][i] may be signaled only when there is more than one DU in an AU. Tables 27A-27C illustrate examples of the relevant portion of a picture timing message, according to the techniques herein, where syntax elements du_common_cpb_removal_delay_flag, du_common_cpb_removal_delay_increment_minus1[i], num_nalus_in_du_minus1 [i], and du_cpb_removal_delay_increment_minus1[i][j] are signaled only when there is more than one DU in an AU.

TABLE 27A

| | Descriptor |
|---|---|
| pic_timing( payloadSize ) { | |
| ... | |
|   if( bp_decoding_unit_hrd_params_present_flag && | |
|     decoding_unit_cpb_params_in_pic_timing_sei_flag ) { | |
|     num_decoding_units_minus1 | ue(v) |
|     if( num_decoding_units_minus1 > 0 ) { | |
|       du_common_cpb_removal_delay_flag | u(1) |
|       if( du_common_cpb_removal_delay_flag ) | |
|         for( i = TemporalId; i <= bp_max_sub_layers_minus1; i++ ) | |
|           if( pt_sub_layer_delays_present_flag[ i ] ) | |
|             du_common_cpb_removal_delay_increment_minus1[ i ] | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i < num_decoding_units_minus1 ) | |
|           for( j = TemporalId; j <= bp_max_sub_layers_minus1; j++ ) | |
|             if( pt_sub_layer_delays_present_flag[ j ] ) | |
|               du_cpb_removal_delay_increment_minus1[ i ][ j ] | u(v) |
|       } | |
|     } | |
|   } | |
| ... | |
| } | |

TABLE 27B

| | Descriptor |
|---|---|
| pic_timing( payloadSize ) { | |
| ... | |
|   if( bp_decoding_unit_hrd_params_present_flag && | |
|     decoding_unit_cpb_params_in_pic_timing_sei_flag ) { | |
|     num_decoding_units_minus1 | ue(v) |
|     if( num_decoding_units_minus1 > 0 ) { | |
|     du_common_cpb_removal_delay_flag | u(1) |
|     if( du_common_cpb_removal_delay_flag ) | |
|       for( i = TemporalId; i <= bp_max_sub_layers_minus1; i++ ) | |
|         if( pt_sub_layer_delays_present_flag[ i ] ) | |
|           du_common_cpb_removal_delay_increment_minus1[ i ] | u(v) |
|     for( i = 0; i <= num_decoding_units_minus1 && num_decoding_units_minus1 > 0; i++ ) | |
|     { | |
|     num_nalus_in_du_minus1[ i ] | ue(v) |
|     if( !du_common_cpb_removal_delay_flag && i < num_decoding_units_minus1 ) | |
|       for( j = TemporalId; j <= bp_max_sub_layers_minus1; j++ ) | |
|         if( pt_sub_layer_delay_present_flag[ j ] ) | |
|           du_cpb_removal_delay_increment_minus1[ i ][ j ] | u(v) |
|     } | |
|   } | |
| ... | |
| } | |

TABLE 27C

| | Descriptor |
|---|---|
| pic_timing( payloadSize ) { | |
| ... | |
|   if( bp_decoding_unit_hrd_params_present_flag && | |
|     decoding_unit_cpb_params_in_pic_timing_sei_flag ) { | |

TABLE 27C-continued

|  | Descriptor |
|---|---|
| num_decoding_units_minus1 | ue(v) |
| if( num_decoding_units_minus1 > 0 ) |  |
|     du_common_cpb_removal_delay_flag | u(1) |
| if( du_common_cpb_removal_delay_flag && num_decoding_units_minus1 > 0) |  |
|     for( i = TemporalId; i <= bp_max_sub_layers_minus1; i++ ) |  |
|         if( pt_sub_layer_delays_present_flag[ i ] ) |  |
|             du_common_cpb_removal_delay_increment_minus1[ i ] | u(v) |
| for( i = 0; i <= num_decoding_units_minus1; i++ ) { |  |
|     num_nalus_in_du_minus1[ i ] | ue(v) |
|     if( !du_common_cpb_removal_delay_flag && i < num_decoding_units_minus1 ) |  |
|         for( j = TemporalId; j <= bp_max_sub_layers_minus1; j++ ) |  |
|             if( pt_sub_layer_delays_present_flag[ j ] ) |  |
|                 du_cpb_removal_delay_increment_minus1[ i ][ j ] | u(v) |
|     } |  |
| } |  |
| ... |  |
| } |  |

With respect to Tables 27A-27B, the semantics may be based on the semantics provided above and the following:

du_common_cpb_removal_delay_flag equal to 1 specifies that the syntax elements du_common_cpb_removal_delay_increment_minus1[i] are present. du_common_cpb_removal_delay_flag equal to 0 specifies that the syntax elements du_common_cpb_removal_delay_increment_minus1[i] are not present. When not present du_common_cpb_removal_delay_flag is inferred to be equal to 0.

num_nalus_in_du_minus1[i] plus 1 specifies the number of NAL units in the i-th DU of the AU the PT SEI message is associated with. The value of num_nalus_in_du_minus1[i] shall be in the range of 0 to PicSizeInCtbsY−1, inclusive. When num_decoding_units_minus1 is equal to 0 and when not present, (i.e. when num_nal_us_in_du_minus1[0] is not present), num_nal_us_in_du_minus1[0] is inferred to be equal to the number of NAL units in the AU. (In another example, this inference rule may not be included in the semantics.)

The first DU of the AU consists of the first num_nalus_in_du_minus1[0]+1 consecutive NAL units in decoding order in the AU. The i-th (with i greater than 0) DU of the AU consists of the num_nalus_in_du_minus1[i]+1 consecutive NAL units immediately following the last NAL unit in the previous DU of the AU, in decoding order. There shall be at least one VCL NAL unit in each DU. All non-VCL NAL units associated with a VCL NAL unit shall be included in the same DU as the VCL NAL unit.

With respect to Tables 27C, the semantics may be based on the semantics provided above and the following:

du_common_cpb_removal_delay_flag equal to 1 specifies that the syntax elements du_common_cpb_removal_delay_increment_minus1[i] are present. du_common_cpb_removal_delay_flag equal to 0 specifies that the syntax elements du_common_cpb_removal_delay_increment_minus1[i] are not present. When not present du_common_cpb_removal_delay_flag is inferred to be equal to 1.

It should be noted that in some cases, the value of num_decoding_units_minus1 shall be required to be in the range of 0 to PicSizeInCtbsY−1, inclusive. It is asserted that at least in the following types of situations, num_decoding_units_minus1 may be equal to 0 and DU based parameters may be included in PT SEI message:

Decoding unit based operation is allowed/supported and thus Buffering Period SEI message has set bp_decoding_unit_hrd_params_present_flag equal to 1. In this case, many of the subsequent pictures may have multiple DUs in AU, but one or more pictures may have a single DU in AU (for example, may be due to small size of the compressed picture).

A subpicture sub-bitstream extraction process is applied on a bitstream and the resulting sub-bitstream has a single subpicture which is also a DU (for example, single slice per subpicture mode was used for slices).

In one example, according to the techniques herein, the flag du_common_cpb_removal_delay_flag may be signaled, but required to have a specific value when there is only one DU in AU. Tables 28A and 28B illustrate examples of the relevant portion of a picture timing message, according to the techniques herein, where the flag du_common_cpb_removal_delay_flag is signaled, but required to have a specific value when there is only one DU in AU.

TABLE 28A

|  | Descriptor |
|---|---|
| pic_timing( payloadSize ) { |  |
|   ... |  |
|   if( bp_decoding_unit_hrd_params_present_flag && |  |
|     decoding_unit_cpb_params_in_pic_timing_sei_flag ) { |  |

TABLE 28A-continued

|  | Descriptor |
|---|---|
| num_decoding_units_minus1 | ue(v) |
| du_common_cpb_removal_delay_flag | u(1) |
| if( du_common_cpb_removal_delay_flag && num_decoding_units_minus1 > 0 ) | |
|     for( i = TemporalId; i <= bp_max_sub_layers_minus1; i++ ) | |
|         if( pt_sub_layer_delays_present_flag[ i ] ) | |
|             du_common_cpb_removal_delay_increment_minus1[ i ] | u(v) |
| for( i = 0; i <= num_decoding_units_minus1; i++ ) { | |
|     num_nalus_in_du_minus1[ i ] | ue(v) |
|     if( !du_common_cpb_removal_delay_flag && i < num_decoding_units_minus1 ) | |
|         for( j = TemporalId; j <= bp_max_sub_layers_minus1; j++ ) | |
|             if( pt_sub_layer_delays_present_flag[ j ] ) | |
|                 du_cpb_removal_delay_increment_minus1[ i ][ j ] | u(v) |
|     } | |
| } | |
| ... | |
| } | |

TABLE 28B

|  | Descriptor |
|---|---|
| pic_timing( payloadSize ) { | |
| ... | |
|   if( bp_decoding_unit_hrd_params_present_flag && | |
|       decoding_unit_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|         for( i = TemporalId; i <= bp_max_sub_layers_minus1; i++ ) | |
|             if( pt_sub_layer_delays_present_flag[ i ] ) | |
|                 du_common_cpb_removal_delay_increment_minus1[ i ] | u(v) |
|     for( i = 0; i <= num_decoding_units_minus1 && num_decoding_units_minus1 > 0; i++ ) | |
| { | |
|     num_nalus_in_du_minus1[ i ] | ue(v) |
|     if( !du_common_cpb_removal_delay_flag && i < num_decoding_units_minus1 ) | |
|         for( j = TemporalId; j <= bp_max_sub_layers_minus1; j++ ) | |
|             if( pt_sub_layer_delays_present_flag[ j ] ) | |
|                 du_cpb_removal_delay_increment_minus1[ i ][ j ] | u(v) |
|     } | |
|   } | |
| ... | |
| } | |

With respect to Table 28A, the semantics may be based on the semantics provided above and in this case it may be a requirement of bitstream conformance that: When num_decoding_units_minus1 is equal to 0, du_common_cpb_removal_delay_flag shall be equal to 1.

With respect to Table 28B, the semantics may be based on the semantics provided above and the following:
num_nalus_in_du_minus1[i] plus 1 specifies the number of NAL units in the i-th DU of the AU the PT SEI message is associated with. The value of num_nalus_in_du_minus1[i] shall be in the range of 0 to PicSizeInCtbsY−1, inclusive. When num_decoding_units_minus1 is equal to 0 and when not present, (i.e. when num_nalus_in_du_minus1[0] is not present), num_nalus_in_du_minus1[0] is inferred to be equal to the number of NAL units in the AU. (In another example, this inference rule may not be included in the semantics.)

The first DU of the AU consists of the first num_nalus_in_du_minus1[0]+1 consecutive NAL units in decoding order in the AU. The i-th (with i greater than 0) DU of the AU consists of the num_nalus_in_du_minus1[i]+1 consecutive NAL units immediately following the last NAL unit in the previous DU of the AU, in decoding order. There shall be at least one VCL NAL unit in each DU. All non-VCL NAL units associated with a VCL NAL unit shall be included in the same DU as the VCL NAL unit.

In this case (when using Table 28B) it may be a requirement of conformance that:
When num_decoding_units_minus1 is equal to 0, du_common_cpb_removal_delay_flag shall be equal to 0.

In one example, the condition:
if    (!du_common_cpb_removal_delay_flag   && i<num_decoding_units_minus1) may be expressed as:
if    (!du_common_cpb_removal_delay_flag   && i<num_decoding_units_minus1 && num_decoding_units_minus1>0)

With respect to Tables 27A-28B, in one example, the variable duCpbRemovalDelayInc is derived as follows:
When DecodingUnitHrdFlag is equal to 1, the following applies:
  The variable duCpbRemovalDelayInc is derived as follows:
    If du_cpb_params_in_pic_timing_sei_flag is equal to 0, duCpbRemovalDelayInc is set equal to the value of du_spt_cpb_removal_delay_increment[i]

in the DU information SEI message, selected as specified, associated with DU m.

Otherwise, if du_common_cpb_removal_delay_flag is equal to 0 and num_decoding_units_minus1 is greater than 0, duCpbRemovalDelayInc is set equal to the value of du_cpb_removal_delay_increment_minus1[i][Htid]+1 for DU m in the PT SEI message, selected as specified, associated with AU n, where the value of i is 0 for the first num_nal_us_in_du_minus1[0]+1 consecutive NAL units in the AU that contains DU m, 1 for the subsequent num_nalus_in_du_minus1[1]+1 NAL units in the same AU, 2 for the subsequent num_nalus_in_du_minus1[2]+1 NAL units in the same AU, etc.

Otherwise if du_common_cpb_removal_delay_flag is equal to 1 and num_decoding_units_minus1 is greater than 0, duCpbRemovalDelayInc is set equal to the value of du_common_cpb_removal_delay_increment_minus1[Htid]+1 in the PT SEI message, selected as specified, associated with AU n.

Otherwise duCpbRemovalDelayInc is set equal to 0 (In one example, this condition may not be present in the derivation).

With respect to Tables 27A-28B, in another example, the variable duCpbRemovalDelayInc may be derived as follows:

When DecodingUnitHrdFlag is equal to 1, the following applies:
    When num_decoding_units_minus1 is greater than 0, the variable duCpbRemovalDelayInc is derived as follows:
        If du_cpb_params_in_pic_timing_sei_flag is equal to 0, duCpbRemovalDelayInc is set equal to the value of du_spt_cpb_removal_delay_increment[i] in the DU information SEI message, selected as specified, associated with DU m.

Otherwise, if du_common_cpb_removal_delay_flag is equal to 0, duCpbRemovalDelayInc is set equal to the value of du_cpb_removal_delay_increment_minus1[i][Htid]+1 for DU m in the PT SEI message, selected as specified, associated with AU n, where the value of i is 0 for the first num_nalus_in_du_minus1[0]+1 consecutive NAL units in the AU that contains DU m, 1 for the subsequent num_nalus_in_du_minus1[1]+1 NAL units in the same AU, 2 for the subsequent num_nalus_in_du_minus1 [2]+1 NAL units in the same AU, etc.

Otherwise, duCpbRemovalDelayInc is set equal to the value of du_common_cpb_removal_delay_increment_minus1[Htid]+1 in the PT SEI message, selected as specified, associated with AU n.

In one example, decoding unit mode signaling in PT SEI is only allowed when there is more than one DU in an AU. According to the techniques herein, num_decoding_units_minus1 may be replaced with syntax element num_decoding_units_minus2 having semantics based on the following:

num_decoding_units_minus2 plus 1 specifies the number of DUs in the AU the PT SEI message is associated with. The value of num_decoding_units_minus2 shall be in the range of 0 to PicSizeInCtbsY−2, inclusive.

It should be noted that in this case, the condition
for (i=0; i<=num_decoding_units_minus1; i++)
may be replaced with
for (i=0; i<=num_decoding_units_minus2+1; i++)
AND the condition
if    (!du_common_cpb_removal_delay_flag  &&
    i<num_decoding_units_minus1)
may be replaced with
if    (!du_common_cpb_removal_delay_flag  &&
    i<(num_decoding_units_minus2+1))

It should be noted that the example picture timing message syntax structures described in Tables 22-28B may be combined with the other picture timing message syntax structures described herein.

In this manner, source device 102 represents an example of a device configured to signal a syntax element indicating whether decoding unit parameters are included in a picture timing message and conditionally signal decoding unit parameters in a picture timing message based on the value of the syntax element.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, IC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or subcomponents thereof. For example, video decoder 124 may be configured to output video data to any communication medium, as described herein.

Figure 6:
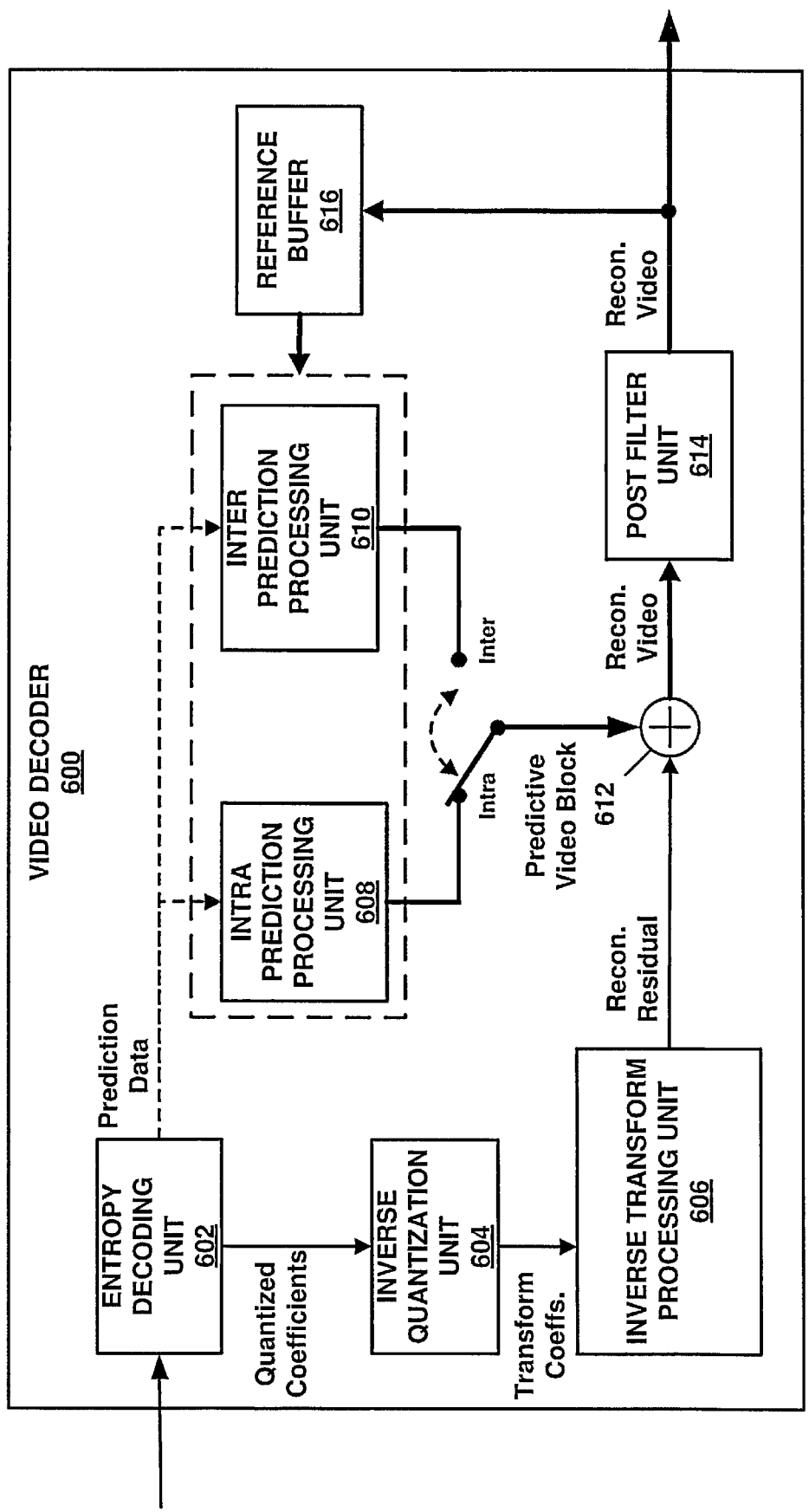
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-28B. Video decoder 600 may decode a picture based on or according to the processes described above, and further based on parsed values in Tables 1-28B.

In the example illustrated in FIG. 6, video decoder 600 includes an entropy decoding unit 602, inverse quantization unit 604, inverse transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverves transform coefficient processing unit 606 receive a quantization parameter, quantized coefficient values, transform data, and prediction data from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a syntax element indicating whether a reference picture list for a picture associated with a picture header is derived based on a reference picture list included in a sequence parameter set and conditionally parse a syntax element indicating an index value associated with a reference picture list included in the sequence parameter set based on the value of the syntax element indicating whether a reference picture list for picture associated with a picture header is derived based on a reference picture list included in a sequence parameter set.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling a decoding unit parameters for video data, the method comprising: signaling a syntax element indicating whether decoding unit parameters are included in a picture timing message; and conditionally signaling decoding unit parameters in a picture timing message based on the value of the syntax element.

In one example, a method of decoding video data, the method comprising: parsing a syntax element indicating whether decoding unit parameters are included in a picture timing message; and conditionally parsing decoding unit parameters in a picture timing message based on the value of the syntax element.

In one example, the method, wherein the syntax element is included in buffering period message.

In one example, the method, wherein decoding unit parameters include decoding unit output delay information.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of receiving a picture timing message, the method comprising: receiving a buffering period message; parsing a flag syntax element, specifying whether decoding unit level decoded picture buffer output delay parameters are present in the picture timing message, in the buffering period message; receiving the picture timing message; and parsing a first syntax element, used to compute a decoded picture buffer output time, in the picture timing message, in a case that a value of the flag syntax element is equal to one.

In one example, the method, further comprising: receiving decoding unit information; and parsing a second syntax element used to compute the decoded picture buffer output time, in the decoding unit information, in a case that the value of the flag syntax element is equal to zero.

In one example, a device of receiving a picture timing message, the device comprising: a processor, and a memory associated with the processor; wherein the processor is configured to perform the following steps: receiving a buffering period message; parsing a flag syntax element, specifying whether decoding unit level decoded picture buffer output delay parameters are present in the picture timing message, in the buffering period message; receiving the picture timing message; and parsing a first syntax element, used to compute a decoded picture buffer output time, in the picture timing message, in a case that a value of the flag syntax element is equal to one.

In one example, a method of signaling a picture timing message, the method comprising: signaling a buffering period message including a flag syntax element specifying whether decoding unit level decoded picture buffer output delay parameters are present in the picture timing message; and signaling the picture timing message including a first syntax element used to compute a decoded picture buffer output time, in a case that a value of the flag syntax element is equal to one.

In one example, a device of signaling a picture timing message, the device comprising: a processor, and a memory associated with the processor; wherein the processor is configured to perform the following steps: signaling a buffering period message including a flag syntax element specifying whether decoding unit level decoded picture buffer output delay parameters are present in the picture timing message; and signaling the picture timing message including a first syntax element used to compute a decoded picture buffer output time, in a case that a value of the flag syntax element is equal to one.

The invention claimed is:

1. A method of decoding a picture timing message, the method comprising:
    receiving a buffering period message;
    parsing a first flag syntax element specifying whether a second flag syntax element and a third flag syntax element are present in the buffering period message;
    parsing the second flag syntax element in the buffering period message based on a value of the first flag syntax element, wherein the second flag syntax element specifies whether decoding unit level decoded picture buffer output delay parameters are present in the picture timing message;
    parsing the third flag syntax element in the buffering period message based on the value of the first flag syntax element, wherein the third flag syntax element specifies whether decoding unit level coded picture buffer removal delay parameters are present in the picture timing message;
    receiving the picture timing message; and
    parsing a first syntax element in the picture timing message in a case that the value of the first flag syntax element is equal to one and a value of the second flag syntax element is equal to one, wherein the first syntax element is used to compute a decoded picture buffer output time and specifies how many clock ticks to wait.

2. The method of claim 1, further comprising:
    receiving decoding unit information; and
    parsing a second syntax element in the decoding unit information in a case that the value of the second flag syntax element is equal to zero, wherein the second syntax element is used to compute the decoded picture buffer output time.

3. A device of decoding a picture timing message, the device comprising:
    a processor, and
    a memory associated with the processor; wherein the processor is configured to:
    receive a buffering period message;
    parse a first flag syntax element specifying whether a second flag syntax element and a third flag syntax element are present in the buffering period message;
    parse the second flag syntax element in the buffering period message based on a value of the first flag syntax element, wherein the second flag syntax element specifies whether decoding unit level decoded picture buffer output delay parameters are present in the picture timing message;
    parse the third flag syntax element in the buffering period message based on the value of the first flag syntax element, wherein the third flag syntax element specifies whether decoding unit level coded picture buffer removal delay parameters are present in the picture timing message;
    receive the picture timing message; and
    parse a first syntax element in the picture timing message in a case that the value of the first flag syntax element is equal to one and a value of the second flag syntax element is equal to one, wherein the first syntax element is used to compute a decoded picture buffer output time and specifies how many clock ticks to wait.

4. A method of signaling a picture timing message, the method comprising:
    signaling a buffering period message, wherein the buffering period message includes: (i) a first flag syntax element specifying whether a second flag syntax element and a third flag syntax element are present and (ii) the second flag syntax element and the third flag syntax element based on a value of the first flag syntax element, wherein the second flag syntax element specifies whether decoding unit level decoded picture buffer output delay parameters are present in the picture timing message and the third flag syntax element specifies whether decoding unit level coded picture buffer removal delay parameters are present in the picture timing message; and
    signaling the picture timing message, wherein the picture timing message includes a first syntax element in a case that the value of the first flag syntax element is equal to one and a value of the second flag syntax element is equal to one, wherein the first syntax element is used to compute a decoded picture buffer output time and specifies how many clock ticks to wait.

5. A device of signaling a picture timing message, the device comprising:
    a processor, and
    a memory associated with the processor; wherein the processor is configured to:
    signal a buffering period message, wherein the buffering period message includes: (i) a first flag syntax element specifying whether a second flag syntax element and a third flag syntax element are present and (ii) the second flag syntax element and the third flag syntax element based on a value of the first flag syntax element, wherein the second flag syntax element specifies whether decoding unit level decoded picture buffer output delay parameters are present in the picture timing message and the third flag syntax element specifies whether decoding unit level coded picture buffer removal delay parameters are present in the picture timing message; and
    signal the picture timing message, wherein the picture timing message includes a first syntax element in a case that the value of the first flag syntax element is equal to one and a value of the second flag syntax element is equal to one, wherein the first syntax element is used to compute a decoded picture buffer output time and specifies how many clock ticks to wait.

6. The device of claim 3, wherein the processor is configured to:
    receive decoding unit information; and
    parse a second syntax element in the decoding unit information in a case that the value of the second flag syntax element is equal to zero, wherein the second syntax element is used to compute the decoded picture buffer output time.

7. The device of claim 3, wherein:
    the processor is configured to parse a third syntax element and a fourth syntax element in the picture timing message in the case that the value of the first flag syntax element is equal to one and the value of the second flag syntax element is equal to one,
    the third syntax element specifies whether the fourth syntax element is present, and
    the fourth syntax element plus one specifies a duration in unit of clock sub-ticks.

* * * * *